US011579344B2

(12) United States Patent
Josell et al.

(10) Patent No.: US 11,579,344 B2
(45) Date of Patent: Feb. 14, 2023

(54) METALLIC GRATING

(71) Applicant: Government of the United States of America, as represented by the Secretary of Commerce, Gaithersburg, MD (US)

(72) Inventors: Daniel Josell, North Potomac, MD (US); Thomas Polk Moffat, Gaithersburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 74 days.

(21) Appl. No.: 16/897,531

(22) Filed: Jun. 10, 2020

(65) Prior Publication Data

US 2020/0301051 A1    Sep. 24, 2020

Related U.S. Application Data

(63) Continuation-in-part of application No. 16/043,358, filed on Jul. 24, 2018, now Pat. No. 10,889,908.
(Continued)

(51) Int. Cl.
*G02B 5/18* (2006.01)

(52) U.S. Cl.
CPC ......... *G02B 5/1852* (2013.01); *G02B 5/1809* (2013.01); *G02B 5/1857* (2013.01)

(58) Field of Classification Search
USPC ........................................................ 359/569
See application file for complete search history.

(56) References Cited

U.S. PATENT DOCUMENTS 3,915,718 A    10/1975 Ludwig et al.
3,917,885 A    11/1975 Baker
(Continued)

FOREIGN PATENT DOCUMENTS

CN    101550572 A    10/2009

OTHER PUBLICATIONS

Wagner, F.T., et al., "Electrochemisty and the future of the automobile", The Journal Physical Chemistry Letters, 2010, p. 2204-2219.

(Continued)

*Primary Examiner* — Collin X Beatty
*Assistant Examiner* — Grant A Gagnon
(74) *Attorney, Agent, or Firm* — Office of Chief Counsel for National Institute of Standards and Technology

(57) ABSTRACT

A metallic grating includes a substrate; a plurality of high aspect ratio trenches disposed in the substrate such that the high aspect ratio trenches are spaced apart from one another by a field surface of the substrate; a metallic superconformal filling formed and disposed in the high aspect ratio trenches; and a grating including a spatial arrangement of the high aspect ratio trenches that are filled with the metallic superconformal filling such that the metallic superconformal filling is void-free, and the high aspect ratio trenches are bottom-up filled with the metallic superconformal filling, wherein a height of the metallic superconformal filling is less than or equal to the height of the high aspect ratio trenches.

7 Claims, 55 Drawing Sheets

Related U.S. Application Data which is a continuation-in-part of application No. 15/489,089, filed on Apr. 17, 2017, now Pat. No. 10,508,358, which is a continuation-in-part of application No. 15/146,888, filed on May 4, 2016, now abandoned, and a continuation-in-part of application No. 14/812,134, filed on Jul. 29, 2015, now abandoned, said application No. 15/146,888 is a continuation-in-part of application No. 14/012,830, filed on Aug. 28, 2013, now Pat. No. 9,580,828.

(60) Provisional application No. 62/194,320, filed on Jul. 20, 2015, provisional application No. 62/165,360, filed on May 22, 2015, provisional application No. 61/701,818, filed on Sep. 17, 2012.

(56) References Cited

U.S. PATENT DOCUMENTS

| | | | |
|---|---|---|---|
| 4,592,807 | A | 6/1986 | Switzer |
| 4,814,048 | A | 3/1989 | Suzuki et al. |
| 5,336,380 | A | 8/1994 | Phan et al. |
| 6,054,037 | A | 4/2000 | Martin |
| 6,258,239 | B1 | 7/2001 | Stab et al. |
| 6,709,564 | B1 | 3/2004 | Tench et al. |
| 6,750,144 | B2 | 6/2004 | Taylor |
| 6,776,891 | B2 | 8/2004 | Chen et al. |
| 6,852,635 | B2 | 2/2005 | Satta et al. |
| 7,507,495 | B2 | 3/2009 | Adzic et al. |
| 7,611,751 | B2 | 11/2009 | Elers |
| 7,632,601 | B2 | 12/2009 | Adzic et al. |
| 7,704,918 | B2 | 4/2010 | Adzic |
| 7,704,919 | B2 | 4/2010 | Adzic et al. |
| 7,867,787 | B2 | 1/2011 | Gardner et al. |
| 7,972,977 | B2 | 7/2011 | Wang et al. |
| 8,048,548 | B2 | 11/2011 | Adzic et al. |
| 8,062,552 | B2 | 11/2011 | Adzic |
| 8,080,280 | B1 | 12/2011 | Grubbs |
| 8,268,409 | B2 | 9/2012 | Elers et al. |
| 8,273,233 | B2 | 9/2012 | Chen et al. |
| 8,283,485 | B2 | 10/2012 | Norman |
| 8,308,989 | B2 | 11/2012 | Adzic et al. |
| 8,404,613 | B2 | 3/2013 | Adzic et al. |
| 8,698,318 | B2 | 4/2014 | Kelly et al. |
| 8,699,207 | B2 | 4/2014 | Adzic |
| 8,992,757 | B2 | 3/2015 | Willey et al. |
| 9,397,345 | B2 | 7/2016 | Xing et al. |
| 9,580,828 | B2 | 2/2017 | Moffat et al. |
| 9,631,292 | B2 | 4/2017 | Roeger-Goepfert et al. |
| 9,758,885 | B2 | 9/2017 | Kienle et al. |
| 2004/0065225 | A1 | 4/2004 | Ruebel et al. |
| 2005/0092616 | A1 | 5/2005 | Hu et al. |
| 2005/0247462 | A1 | 12/2005 | Kokarsky et al. |
| 2005/0266165 | A1 | 12/2005 | Mobius et al. |
| 2006/0175201 | A1 | 8/2006 | Hafezi et al. |
| 2006/0213778 | A1 | 9/2006 | Cheng et al. |
| 2009/0018805 | A1 | 1/2009 | Weber et al. |
| 2010/0099012 | A1 | 4/2010 | Adzic |
| 2010/0123993 | A1 | 5/2010 | Laor |
| 2012/0207944 | A1 | 8/2012 | Finch |
| 2014/0262803 | A1 | 9/2014 | Ahmed et al. |
| 2015/0184307 | A1 | 7/2015 | Hosokawa et al. |
| 2015/0309473 | A1* | 10/2015 | Spadaccini .......... G03H 1/2294 359/3 |

OTHER PUBLICATIONS

Debe, M., "Electrocatalyst approaches and challenges for automotive fuel cells", Nature, 2012, p. 43-51, vol. 486.
Horcas, I., et al., "WSXM: A software for scanning probe microscopy and a tool for nanotechnology", Review of Scientific Insturments, 2007, p. 013705, vol. 78.
Stamenkovic, V.R., et al., "Trends in electrocatalysis on extended and nanoscale Pt-bimetallic alloy surface", Nature Materials, 2007, p. 241-247, vol. 6.
Advic, R.R., et al., "Platinum Monolayer Fuel Cell Electrocatalyst", Top Catal., 2007, p. 249-262, vol. 46.
Bergbreiter, A., et al., "Entropy Effects in Atom Distribution and Electrochemical Properties of AuxPt1Nx/Pt(111) Surface Alloys", ChemPhysChem, 2010, p. 1505-1512, vol. 11.
Waibel, W-F., et al., "Initial stages of Pt deposition on Au(111) and Au(100)", Electrochimica Acta, 2002, p. 1461-1467, vol. 47.
Kondo, T., et al., "Resonance surface X-ray scattering technique to determine the structure of electrodeposited Pt ultrathin layers on Au(1 1 1) surface", Electrochimica Acta, 2010, p. 8302-8306, vol. 55 No. 27.
Bakos, I., et al., "Deposition of platinum monolayers on gold" J. Solid State Electrochem., 2011, p. 2453-2459, vol. 15.
Brankovic, S.R., et al. "Metal monolayer deposition by replacement of metal adlayers on electrode surfaces", Surface Science, 2001, p. L173-L179, vol. 474.
Gokcen,D., et al., "Reaction Kinetics of Metal Deposition via Surface-Limited Red-ox Replacement Reaction of Underpotentially Deposited Metal Monolayers", Electrochim Acta, 2011, p. 5545, vol. 56.
Bergbreiter, A., et al., "Entropy Effects in Atom Distribution and Electrochemical Properties of AuxPt1-x/Pt(111) Surface Alloys", ChemPhysChem, 2010, p. 1505-1512, vol. 11.
Gregory, A.J., et al., "Determination of the Gibbs excess of H absorbed at Pt(111) electrode surface in the presense of co-absorbed chloride", J. Electroanal. Chem., 1995, p. 105-113, vol. 399.
Garcia-Araez, N., et al., "Determination of the Gibbs excess of H adsorbed at a Pt(111) electrode surface in the presence of co-adsorbed chloride", J. Electroanal. Chem., 2005, p. 76, vol. 582.
Strmcnik, D., et al., "Adsorption of hydrogen on Pt(111) and Pt(100) surfaces and its role in the HOR", Electrochemistry Communications, 2008, p. 1602-1605, vol. 10.
Roman, T., et al., "Structure of water layers on hydrogen-covered Pt electrodes", Catalysis Today, 2013, p. 183-190, vol. 202.
Jerkiewicz, G., et al., "Discovery of the Potential of Minimum Mass for Platinum Electrode", Langmuir, 2011, p. 4220-4226, vol. 27.
Cumpson, P.J., et al., "Elastic Scattering Corrections in AES and XPS. II. Estimating Attenuation Lengths and Conditions Required for their Valid Use in Overlayer/Substrate Experiment", Surface and Interface Analysis, 1997, p. 430-446, vol. 25.
Pedersen, M., et al., "How a gold substrate can increase the reactivity of a Pt overlayer", Surface Science, 1999, p. 395-409, vol. 426.
Nagahara, Y., et al., In situ scanning tunneling microscopy examination of molecular adilayers of haloplatinate complexes and electrochemically produced platinum nanoparticles on Au(111), J. Phys. Chem. B., 2004, p. 3224, vol. 108.
Horcas, I., et al., "WSXM: A software for scanning probe microscopy and a tool for nanotechnology", Review of Scientific Instruments, 2007, p. 013705, vol. 78.
Jambunathan, K., et al., "A Multielectrode Electrochemical and Scanning Differential Electrochemical Mass Spectrometry Study of Methanol Oxidation on Electrodeposited PtxRuy", Langmuir, 2004, p. 1856-1863, vol. 20.
Kim, M.J., et al., "Superfilling of Cu—Ag Using Electrodeposition in Cyanide-Based Electrolyte", Journal of The Electrochemical Society, 2012, D656-D658, vol. 159 No 11.
Kim, M.J.,et al., "Fabrication of Cu—Ag Interconnection Using Electrodeposition: The Mechanism of Superfilling and the Properties of Cu—Ag Film", Journal of The Electrochemical Society, 2013, D3126-D3133, vol. 160 No. 12.
Baker, B.C., et al., "Superconformal Electrodeposition of Silver from a KAg (CN) 2 KCN—KSeCN Electrolyte", Journal of The Electrochemical Society, 2003, C61-C66, vol. 150 No. 2.
Thompson, M.R., "Methods of Measuring PH in Alkaline Cyanide Plating Baths", Part of Journal of Research of the National Bureau of Standards, 1940, p. 423-434, vol. 24.
Joi, A., et al., "Additives for Bottom-up Copper Plating from an Alkaline Complexed Electrolyte", Journal of The Electrochemical Society, 2013, p. D3001-D3003, vol. 160 No. 12.

(56) References Cited

OTHER PUBLICATIONS

Josell, D., et al., "Superconformal Copper Electrodeposition in Complexed Alkaline Electrolyte", Journal of The Electrochemical Society, 2014, B287-B292, vol. 161 No. 5.

Liu, Y., et al., "Self-Terminating Growth of Platinum Films by Electrochemical Deposition", Science, 2012, p. 1327-1330, vol. 338.

Lou, H., et al., "Electroplating", Encyclopedia of Chemical Processing, 2006, DOI: 10.1081/E-ECHP-120007747.

Wang, J., et al., "Characterizing interface dislocations by atomically informed Frank-Bilby theory", J. Mater. Res., 2013, p. 1646-1657, vol. 28 No. 13.

Josell, D., et al., "Modeling Extreme Bottom-Up Filling of Through Silicon Vias", Journal of the Electrochemical Society, 2012, p. D570-D576, vol. 159, No. 10.

Kim, H.C., et al., "Bottom-up Filling of TSV-Scaled Trenches by Using Step Current Electrodeposition", ECS Electrochemistry Letters, 2015, p. D31-D34, vol. 4 No. 10.

Kim, S.K., et al., "Electrodeposition of Ni in Submicrometer Trenches", Journal of the Electrochemical Society, 2007, p. D443-D451, vol. 154, No. 9.

Sverdlov, Y., et al., "The electrodeposition of cobalt-nickel-iron high aspect ratio thick film structures for magnetic MEMS applications", Microelectronic Engineering, 2004, p. 258-265, vol. 76.

Lee, C.H., et al., "Magnetic Materials for Three-Dimensional Damascene Metallization: Void-Free Electrodeposition of Ni and Ni70Fe30 Using 2-Mercapto-5-benzimidazolesulfonic Acid", Journal of The Electrochemical Society, 2008, p. D499-D507, vol. 155 No. 7.

Lee, C.H., et al., "Superconformal Electrodeposition of Co and Co—Fe Alloys Using 2-Mercapto-5-benzimidazolesulfonic Acid", Journal of The Electrochemical Society, 2009, p. D301-D309, vol. 156 No. 8.

* cited by examiner

METALLIC GRATING

CROSS REFERENCE TO RELATED APPLICATIONS

The application is a continuation in part of U.S. patent application Ser. No. 16/043,358, filed Jul. 24, 2018, which is a continuation in pan of U.S. patent application Ser. No. 15/489,089, filed Apr. 17, 2017, which is a continuation in part of U.S. patent application Ser. No. 15/146,888, filed May 4,2016, the disclosure of each of which is incorporated herein by reference in its entirety. U.S. patent application Ser. No. 15/146,888 claims priority to U.S. Provisional Patent Application No. 62/165,360, filed May 22, 2015, and is a continuation in part of U.S. patent application Ser. No. 14/012,830, filed Aug. 28, 2013, which claims priority to U.S. Provisional Patent Application No. 61/701,818, filed Sep. 17, 2012, the disclosure of each of which is incorporated herein by reference in its entirety. U.S. patent application Ser. No. 15/489,089 also is a continuation in part of U.S. patent application Ser. No. 14/812,134, filed Jul. 29,2015, which claims priority to U.S. Provisional Patent Application No. 62/194,320, filed Jul. 20,2015, the disclosure of each of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 975-2573; email tpo@nist.gov; reference NIST Docket Number 18-016ICIPI.

BRIEF DESCRIPTION

Disclosed is a metallic grating comprising: a substrate; a plurality of high aspect ratio trenches disposed in the substrate such that the high aspect ratio trenches are spaced apart from one another by a field surface of the substrate; a metallic superconformal filling formed and disposed in the high aspect ratio trenches; and a grating comprising a spatial arrangement of the high aspect ratio trenches that are filled with the metallic superconformal filling such that the metallic superconformal filling is void-free, and the high aspect ratio trenches are bottom-up filled with the metallic superconformal filling, wherein an aspect ratio of the high aspect ratio trenches is from 0.5 to 200, and a height of the high aspect ratio trenches is from 1 µm to 1 mm, and a height of the metallic superconformal filling is less than or equal to the height of the high aspect ratio trenches.

Disclosed is a process for making the metallic grating of claim 1, the process comprising: providing the substrate with the plurality of high aspect ratio trenches disposed in the substrate such that the high aspect ratio trenches are spaced apart from one another by the field surface of the substrate, and each of the high aspect ratio trenches comprising: a bottom member; a sidewall that separates the bottom member from the field surface, an aspect ratio of a depth to a width from 0.5 to 200 before filling the high aspect ratio trench with the metallic superconformal filling, the aspect ratio decreasing during filling the high aspect ratio trench with the metallic superconformal filling; and an overlayer disposed on the bottom member; contacting the overlayer on the bottom member with a superconformal filling composition, the superconformal filling composition having a near-neutral pH and comprising: a plurality of $Au(SO_3)_2^{3-}$ anions as a source of gold that is superconformally deposited as the metallic superconformal filling in the high aspect ratio trenches; a plurality of $SO_3^{2-}$ anions; and a plurality of $Bi^{3+}$ cations as a brightener and an accelerator for superconformally depositing gold in the high aspect ratio trenches; convectively transporting the $Au(SO_3)_2^{3-}$ anions and the $Bi^{3+}$ cations to the bottom member by actively moving the substrate relative to the superconformal filling composition; subjecting the bottom member of the high aspect ratio trenches to an electrical current to superconformally deposit gold from the $Au(SO_3)_2^{3-}$ anions on the bottom member relative to the sidewall and the field surface, the electrical current providing a cathodic voltage, and a first deposition ratio of a first deposition rate of gold on the bottom member relative to a second deposition rate of gold on the sidewall; and increasing the electrical current subjected to the field surface and the high aspect ratio trenches to maintain the cathodic voltage during superconformally depositing gold in the high aspect ratio trenches to form the metallic superconformal filling comprising gold in the high aspect ratio trenches such that the metallic superconformal filling is void-free and seam-free.

Disclosed is a process for superconformally filling a recessed feature of an article with gold, the process comprising: providing the article comprising: a substrate; a field surface disposed on the substrate; the recessed feature disposed on the substrate and surrounded by the field surface, the recessed feature comprising: a bottom member; a sidewall that separates the bottom member from the field surface, the recessed feature having an aspect ratio of a depth to a width from 0.5 to 200 before superconformally filling the recessed feature, the aspect ratio decreasing during superconformally filling the recessed feature; and an overlayer disposed on the article such that the field surface and the recessed feature are fully metallized for contact with a superconformal filling composition; contacting the field surface and the recessed feature with the superconformal filling composition in an absence of cyanide and lead, the superconformal filling composition having a near-neutral pH and comprising: a plurality of $Au(SO_3)_2^{3-}$ anions as a source of gold for superconformally depositing gold in the recessed feature; a plurality of $SO_3^{2-}$ anions; and a plurality of $Bi^{3+}$ cations as a brightener and an accelerator for superconformally depositing gold in the recessed feature; convectively transporting the $Au(SO_3)_2^{3-}$ anions and the $Bi^{3+}$ cations to the bottom member by actively moving the substrate relative to the superconformal filling composition; subjecting the field surface and the recessed feature to an electrical current to superconformally deposit gold from the $Au(SO_3)_2^{3-}$ anions on the bottom member relative to the sidewall and the field surface, the electrical current providing a cathodic voltage ($V_{SSE}$) from −0.6 V to −1.0 V relative to a saturated sulfate electrode (SSE), and a first deposition ratio of a first deposition rate of gold on the bottom member relative to a second deposition rate of gold on the sidewall being front 1.5 to $10^6$; and increasing the electrical current subjected to the field surface and the recessed feature to maintain the $V_{SSE}$ from −0.6 V to −1.0 V relative to the SSE during superconformally depositing gold on the substrate to superconformally fill the recessed feature of the article with gold as a metallic superconformal filling comprising gold, the metallic superconformal filling being void-free and seam-free, such that in a presence of the superconformal filling composition; passivation of the field surface and the recessed feature occurs at the $V_{SSE}$ greater than −0.6 V relative to the SSE, sub-conformal deposition of gold occurs at the $V_{SSE}$ less than −1 V relative to the SSE, and super-conformal deposition of gold occurs at the $V_{SSE}$ from −0.6 V to −1.0 V relative to the SSE.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a metallic grating, articles, and processes herein unexpectedly provided metallic superconformally filled recess members, including high aspect ratio trenches. Beneficially, the metallic superconformal fillings can be arranged to provide a grating in a metallic grating as well as, in some articles, functioning as an interconnect for microelectronics. The process fills recessed features from a bottom of the recessed feature with the metallic superconformal filling that is seam-free and void-free. Gold is deposited within the recessed feature such that little deposition occurs on a field surface of a substrate, subjected to contact with a superconformal filling composition, relative to the bottom of the recessed feature and minimizes waste and reduces time for postdeposition processing. Surprisingly, the superconformal filling composition is an electrolyte that forms the metallic superconformal filling in an absence of a lead additive or a polymer additive and is non-cyanide and can have a near-neutral pH. Superconformal deposition of gold metallic superconformal filling can be performed at room temperature.

Additionally, a process for forming the metallic superconformal filling herein provides filling high aspect ratio trenches (e.g., without limitation to a height-to-width aspect ratio from 0.5 to greater than 200) with gold. Advantageously, such can fabricate diffraction gratings for medical imaging. It is contemplated that the process superconformally fills recessed features, e.g., high aspect ratio trenches, strictly from the bottom of the recessed feature so that the metallic superconformal filling is monolithically seam-free and void-free. Deposition of gold as the metallic superconformal filling outside of the recessed features occurs to a very low extent so that waste and post-deposition processing time is reduced as compared with conventional processes for depositing gold. The electrolyte in the superconformal filling composition from which the gold is deposited as the metallic superconformal filling does not include lead-based additives and does not include polymer additives. The electrolyte is non-cyanide and nearly neutral in pH. Deposition of gold as the metallic superconformal filling occurs at room temperature.

Figure 1:
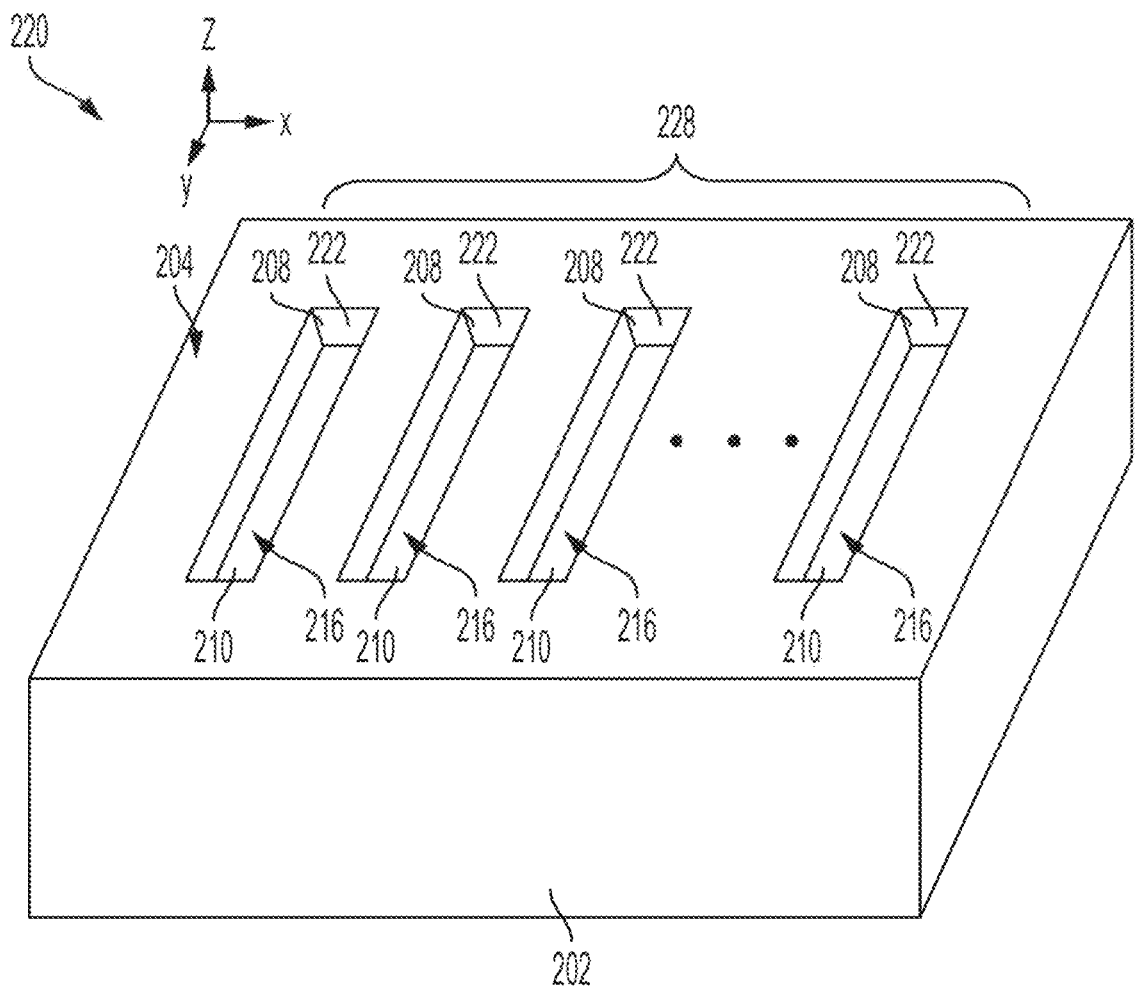
FIG. 1 shows a perspective view of a metallic grating.
Figure 2:
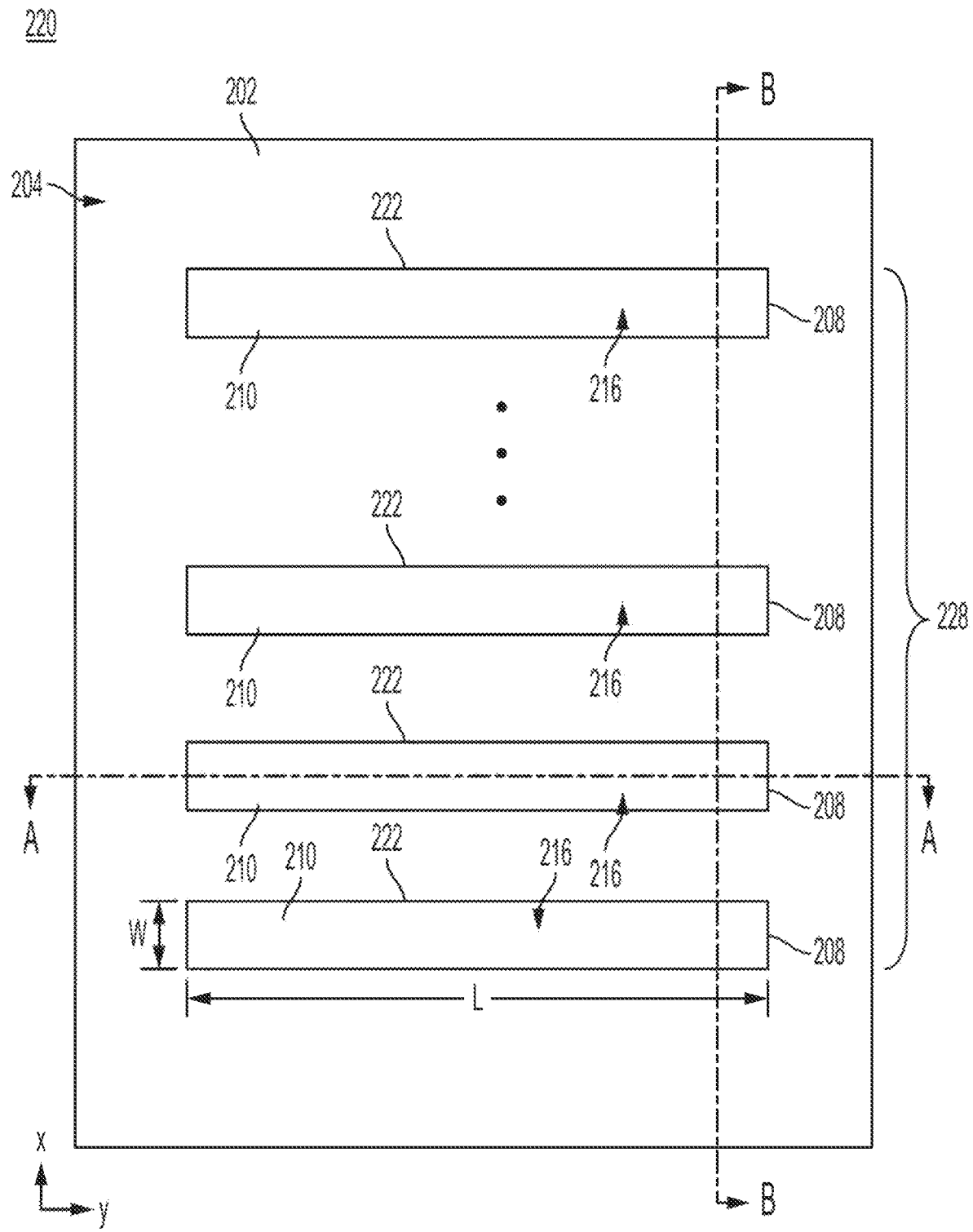
FIG. 2 shows a plan view of the metallic grating shown in FIG. 1.
Figure 3:
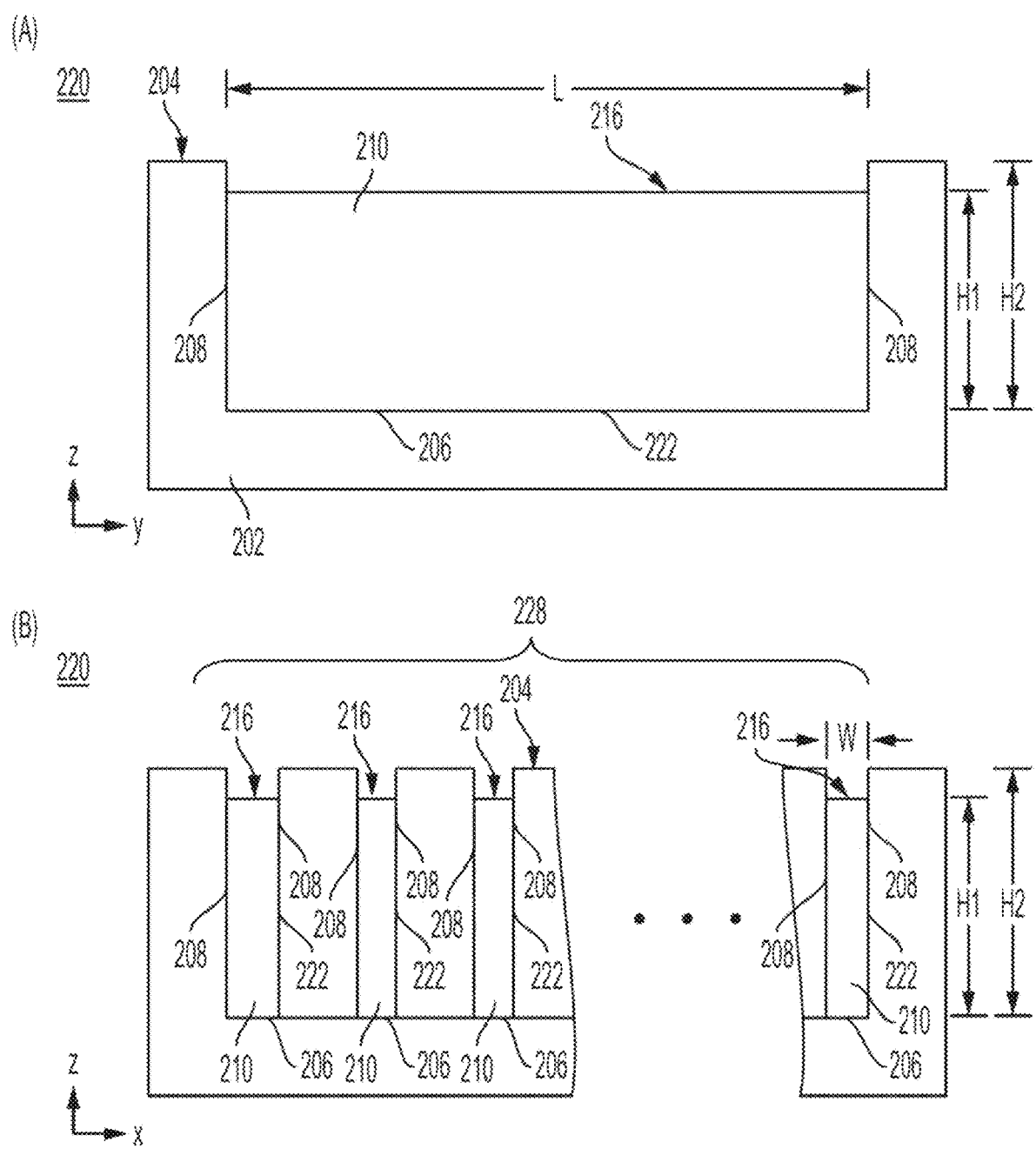
FIG. 3 shows, in panel A, a cross-section along line A-A for the metallic grating shown in FIG. 2 and, in panel B, a cross-section along line B-B for the metallic grating shown in FIG. 2.
Figure 4:
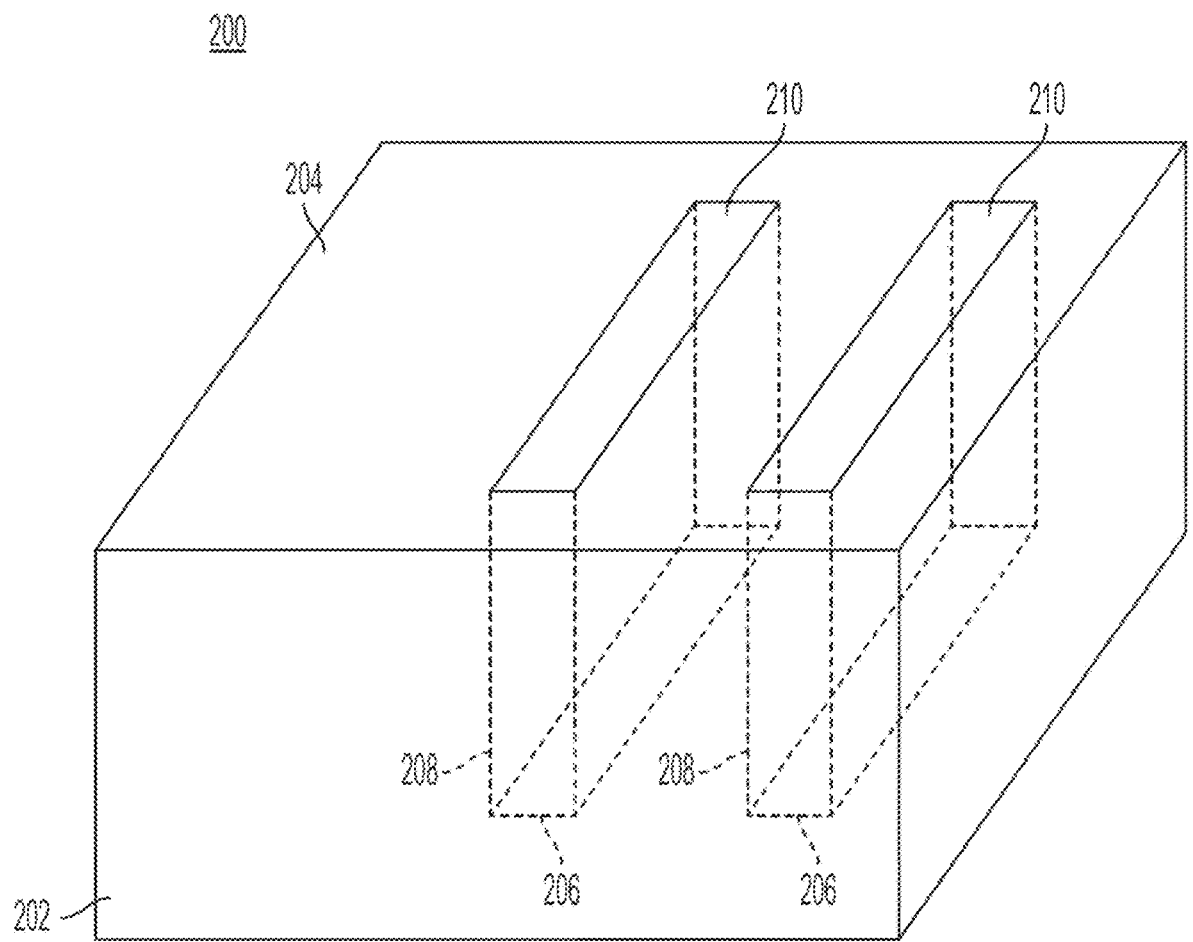
FIG. 4 shows a perspective view of an article that includes a metallic superconformal filling.
Figure 5:
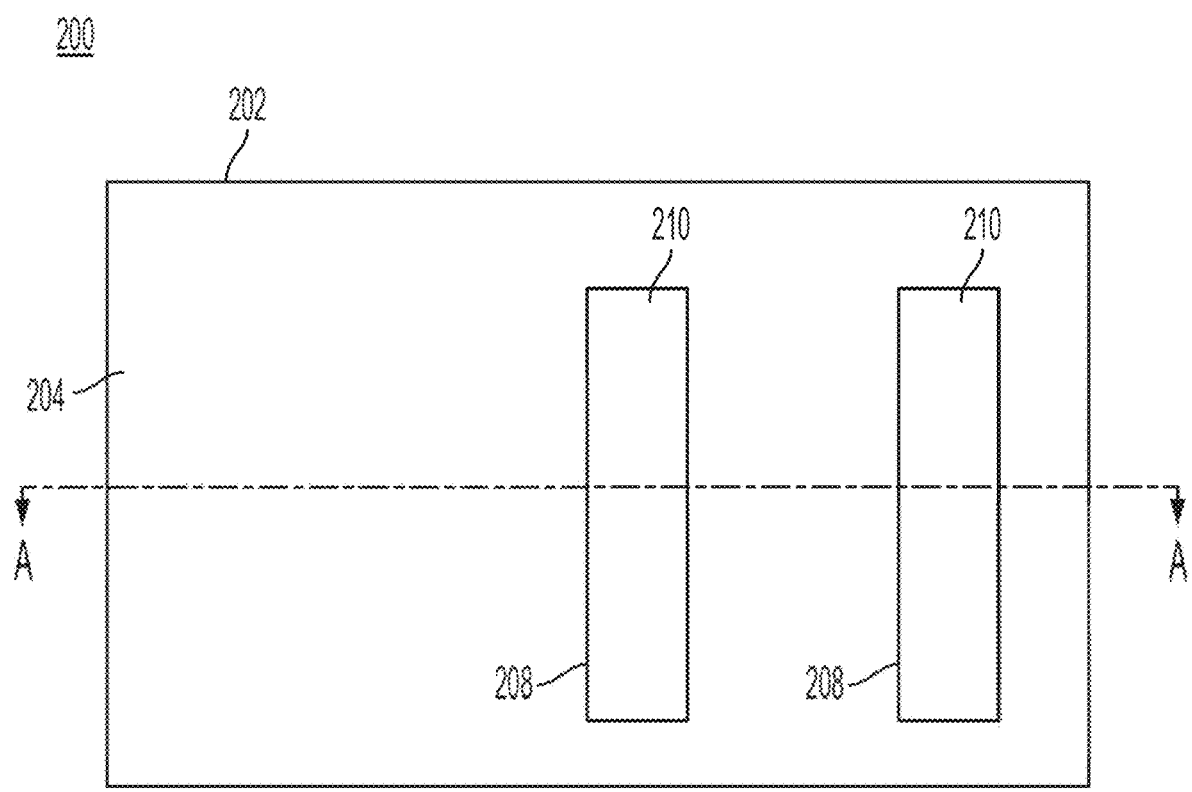
FIG. 5 shows a plan view a top view of the article shown in FIG. 4.
Figure 6:
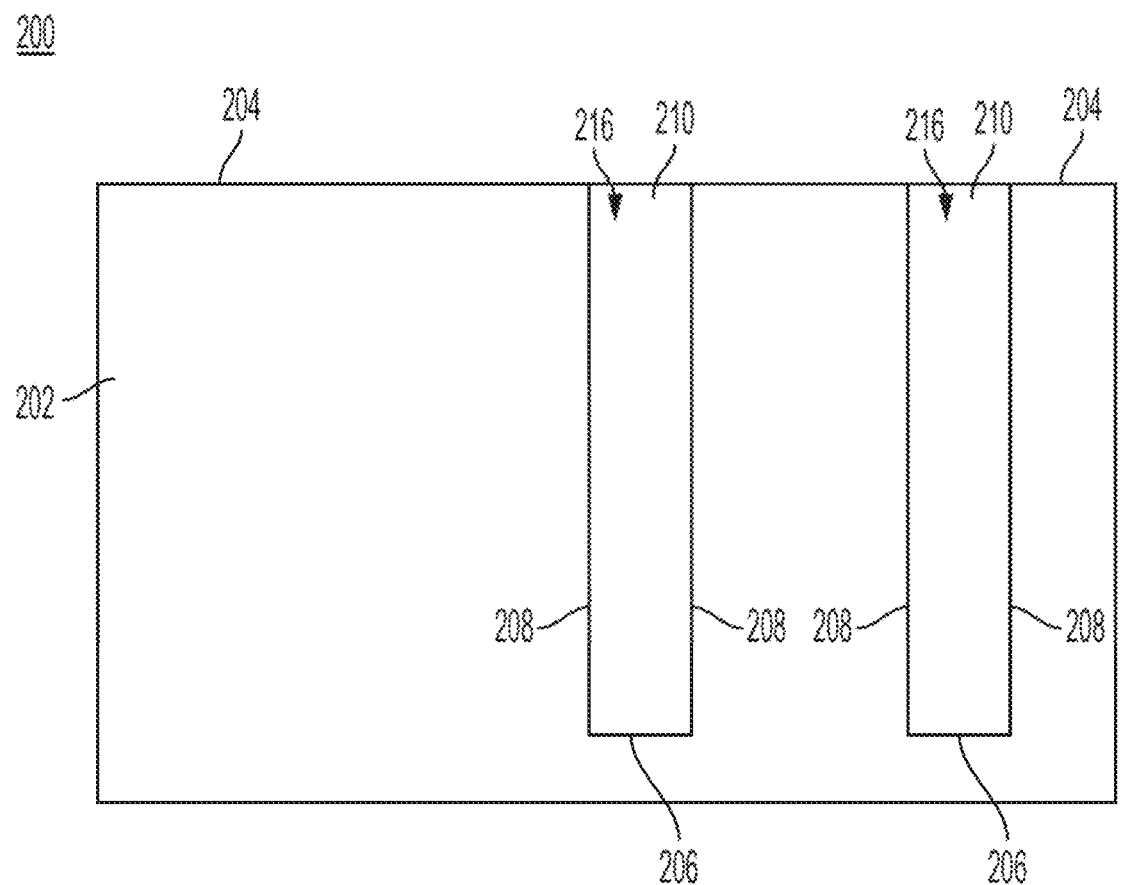
FIG. 6 shows a cross-section along line A-A of the article shown in FIG. 4.

In an embodiment, with reference to FIG. 1, FIG. 2, and FIG. 3, metallic grating 220 includes: substrate 202; a plurality of high aspect ratio trenches 222 disposed in substrate 202 such that high aspect ratio trenches 222 are spaced apart from one another by field surface 204 of substrate 202; metallic superconformal filling 210 formed and disposed in high aspect ratio trenches 222; and grating 228 including a spatial arrangement of high aspect ratio trenches 222 that are filled with metallic superconformal filling 210 such that metallic superconformal 210 is void-free, and high aspect ratio trenches 222 are bottom-up filled with metallic superconformal filling 210. An aspect ratio of high aspect ratio trenches 222 independently can be from 0.5 to 1000, specifically from 5 to 500, and more specifically from 5 to 200. A height of high aspect ratio trenches 222 independently can be from 50 nanometers to mm, specifically from 0.5 µm to 5 mm, and more specifically from 1 µm to 1 mm. A height of metallic superconformal filling 210 is less than or equal to the height of high aspect ratio trenches 222. A width of high aspect ratio trenches 222 independently can be from 5 nm to 100 µm, specifically from 0.1 µm to 50 µm, and more specifically from 0.1 µm to 10 µm. A length of metallic superconformal filling 210 can be from 1 µm to 1 m, specifically from 5 µm to 300 mm, and more specifically from 10 µm to 150 mm. The height of metallic superconformal filling 210 can be from 50 nanometers to 5 mm, specifically from 1 µm to 1 mm, and more specifically from 1 µm to 0.1 mm. In an embodiment, substrate 202 is electrically conductive. In an embodiment, substrate 202 includes silicon and a dopant (e.g., an n-dopant such, as phosphorous or a p-dopant such as boron) that provides electrical conductivity to substrate 202. In an embodiment, metallic superconformal filling 210 includes gold. It is contemplated that trace amounts of another element can be included with the gold, Exemplary trace elements include bismuth. In an embodiment, metallic superconformal filling 210 consists essentially of gold and bismuth. According to an embodiment, metallic superconformal filling 210 includes an alloy of gold, referred to as a gold alloy. Exemplary gold alloys include binary gold alloys such as cobalt-gold or ternary gold alloys such as cobalt-copper-gold.

It should be appreciated that that metallic grating 220 is an embodiment of article 200 described herein. Similarly, it should be appreciated that high aspect ratio trenches 222 is an embodiment of recessed feature 250 described herein.

In an embodiment, with reference to FIG. 4, FIG. 5, FIG. 6, and FIG. 10, article 200 includes substrate 202; field surface 204 disposed on substrate 202; recessed feature 250 disposed on substrate 202; field surface 204 that surrounds recessed feature 250. In some embodiments, overlayer 212 is disposed on article 200 so that field surface 204, recessed feature 250, or a combination thereof are partially or fully metallized during contact with superconformal filling composition 214. Recessed feature 250 includes bottom member 206 and sidewall 208 that separates bottom member 206 from field surface 204. Metallic superconformal filling 210 has exposed surface 216 disposed distal to bottom member 206.

Figure 7:
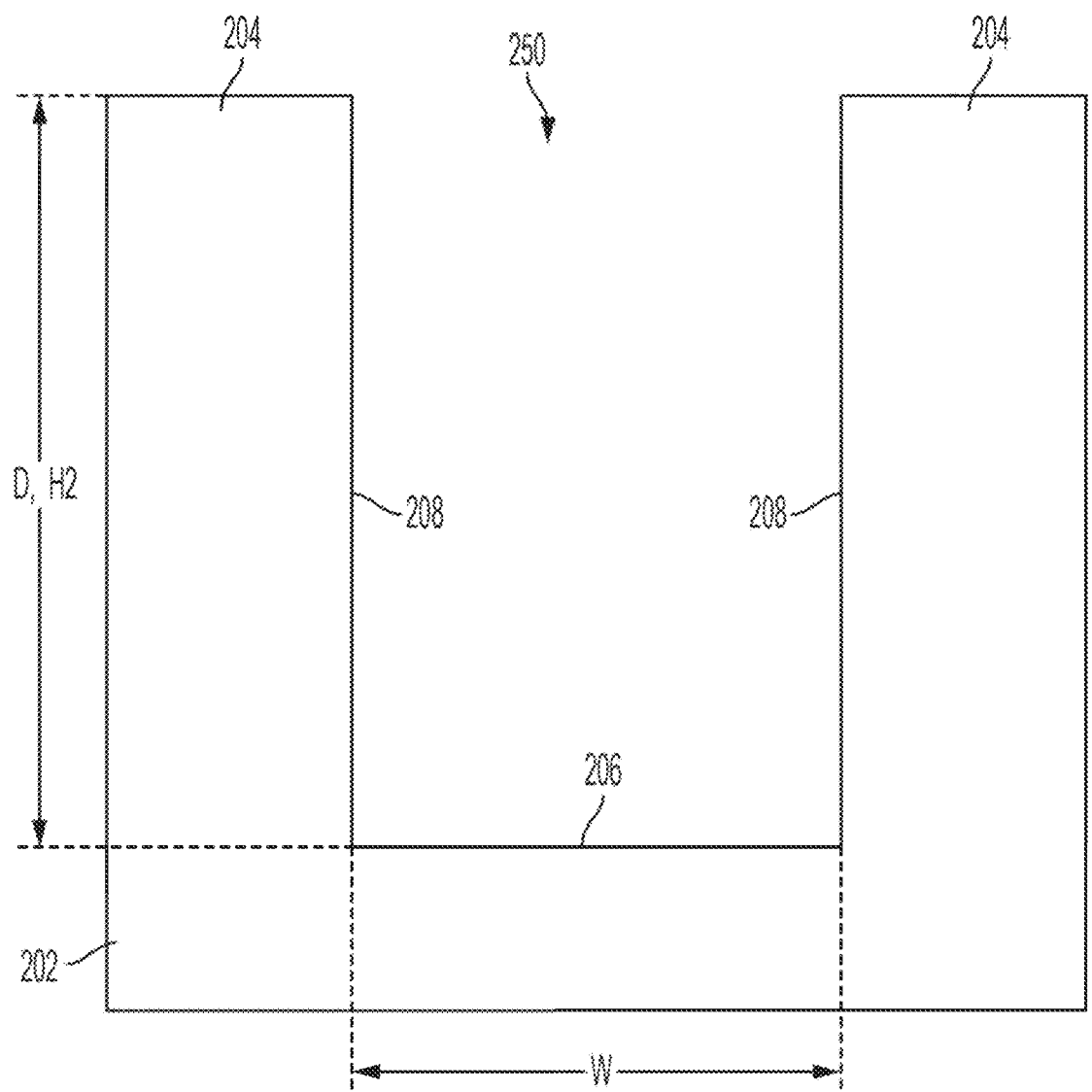
FIG. 7 shows a cross-section view of a substrate that includes a field surface and a recessed feature.
Figure 8:
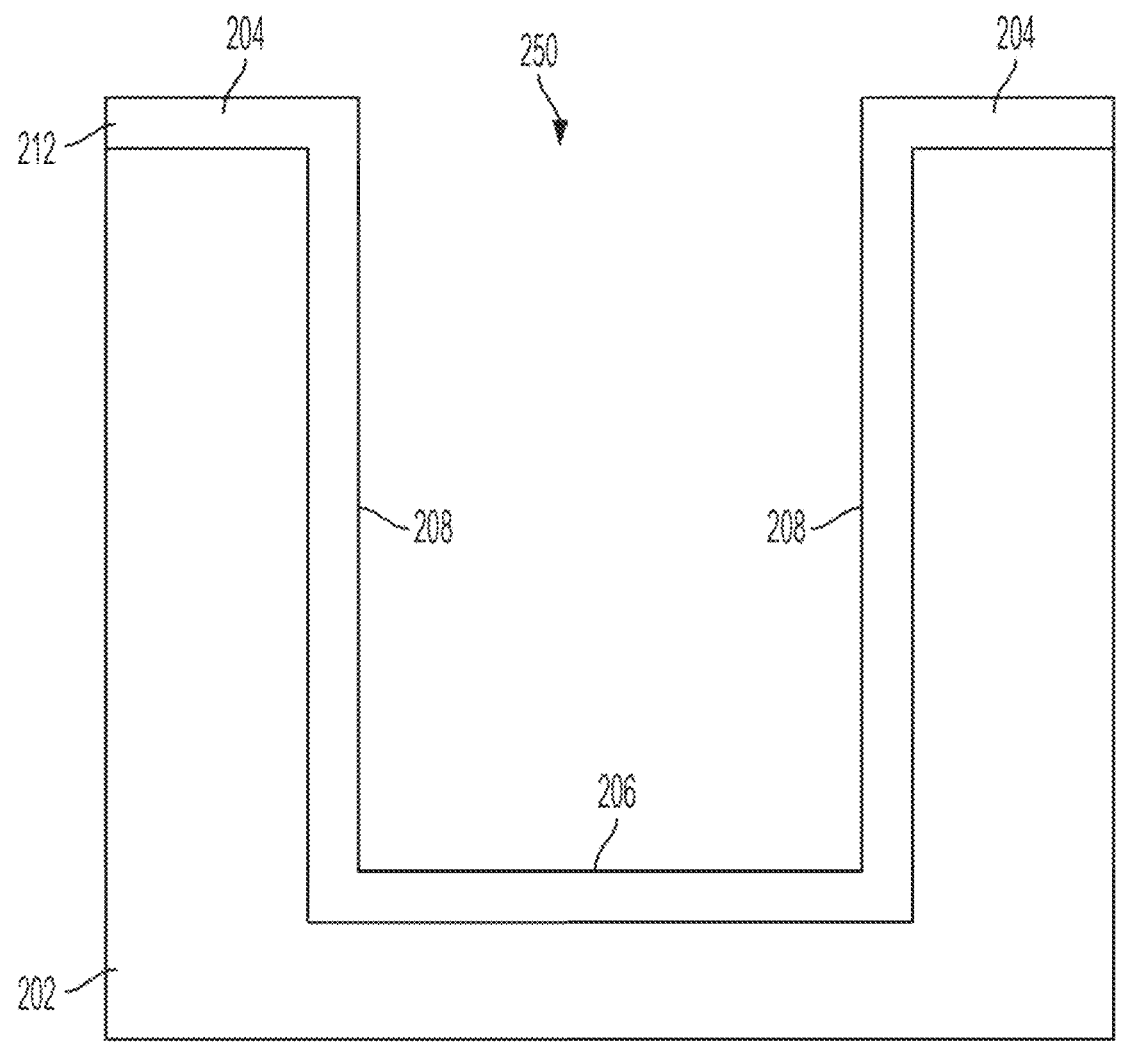
FIG. 8 shows an overlayer disposed on the substrate shown in FIG. 7.
Figure 9:
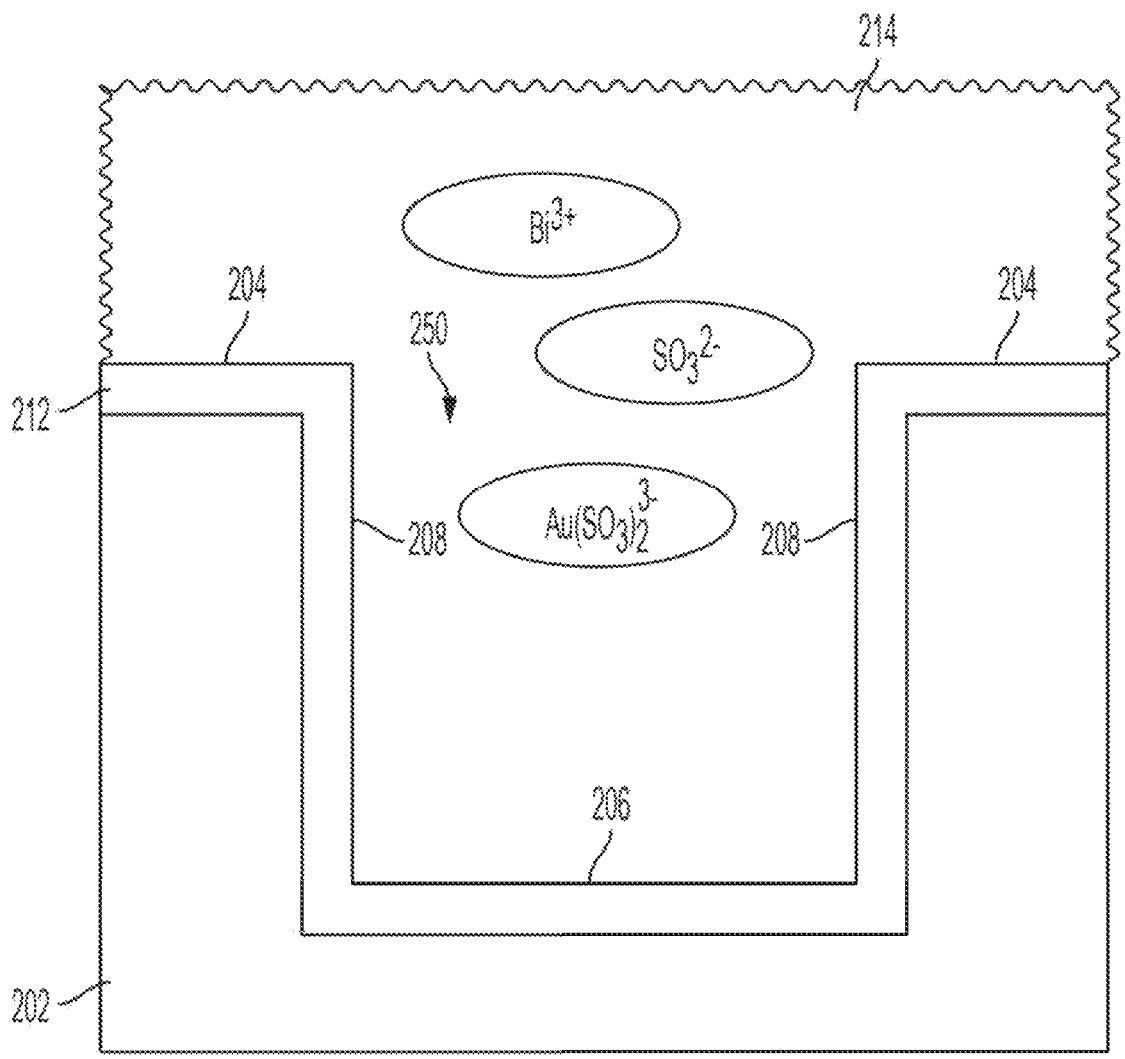
FIG. 9 shows a superconformal filling composition in contact with the overlayer shown in FIG. 8.

In an embodiment, with reference to FIG. 7. FIG. 8, FIG. 9, FIG. 10, FIG. 11, FIG. 12, and FIG. 14, a process for superconformally filling recessed feature 250 of article 200 with gold includes: contacting field surface 204 and recessed feature 250 with superconformal filling composition 214 optionally in an absence of cyanide, lead, thallium, or a combination thereof; convectively transporting $Au(SO_3)_2^{3-}$ anions and $Bi^{3+}$ cations from superconformal filling composition 214 to bottom member 206 by actively moving substrate 202 relative to superconformal filling composition 214; subjecting field surface 204 and recessed feature 250 to an electrical current to superconformally deposit gold from the $Au(SO_3)_2^{3-}$ anions on bottom member 206 relative to sidewall 208 and field surface 204, the electrical current providing a cathodic voltage ($V_{SSE}$) from −0.6 V and −1.0 V relative to a saturated sulfate electrode (SSE), and a first deposition ratio of a first deposition rate gold on bottom member 206 relative to a second deposition rate of gold on sidewall 208 being from 1.5 to $10^6$; and increasing the electrical current subjected to field surface 204 and recessed feature 250 to maintain the $V_{SSE}$ from −0.6 V to −1.0 V relative to the SSE during superconformally depositing gold on substrate 202 to superconformally fill recessed feature 250 of article 200 with gold as metallic superconformal filling 210 including gold. Metallic superconformal filling 210 is void-free and seam-free. It is contemplated that, in a presence superconformal filling composition 214: passivation of field surface 204 and recessed feature 250 occurs at the $V_{SSE}$ greater than −0.6 V relative to the SSE, sub-conformal depos gold occurs at the $V_{SSE}$ less than −1 V relative to the SSE, and superconformal deposition occurs at the $V_{SSE}$ from −0.6 V to −1.0 V relative to the SSE. It should be appreciated that, according to the process thus far, that superconformal deposition of gold occurs since the $V_{SSE}$ is maintained from −0.6 V to −1.0 V relative to the SSE. The electrical current can be provided in a continuous ramp that is linear (e.g., solid curve its panel A of FIG. 11) nonlinear, provided in a plurality of steps (e.g., dashed curve in panel A of FIG. 11), or a combination thereof. Without wishing to be bound by theory, it is believed that although electrical current increases from $I_{Low}$ to $I_{High}$, voltage is maintained from first voltage V1 to second voltage V2 because time-dependent adsorption or electrochemical transformation of adsorbed bismuth-containing compounds (e.g., oxo-complexes, sulfite complexes, hydroxide complexes) accelerate Au deposition.

The process also can include selectively disposing overlayer 212 on article 200 such that field surface 204 or recessed feature 250 are independently not metallized, partially metallized, or fully metallized for contact with superconformal filling composition 214. In some embodiments, the process includes disposing overlayer 212 on article 200 such that field 204 and bottom member 206 are metallized for contact with superconformal Filling composition 214 in an absence of metallization of sidewall 208. It is contemplated that for substrate 202 that is electrically conductive, formation of metallic superconformal filling 210 in recessed feature 250 can occur in an absence of overlayer 212. A seed layer, e.g., a gold seed layer, can be selectively formed on bottom of recessed feature 250 before deposition of gold as metallic superconformal filling 210. Disposing overlayer 212 on article 200 can include evaporation, electrochemical or electroless deposition, sputter deposition, chemical vapor deposition, or atomic layer deposition. In an embodiment, disposing overlayer 212 includes evaporation of a layer of titanium followed by a layer of gold.

In the process, contacting field surface 204 and recessed feature 250 with superconformal filling composition 214 can include transferring a wafer patterned with recessed features into the superconformal filling composition.

In the process, convectively transporting $Au(SO_3)_2^{3-}$ anions and $Bi^{3+}$ cations from superconformal filling composition 214 to bottom member 206 includes actively moving substrate 202 relative to superconformal filling composition 214. Actively moving substrate 202 relative to superconformal filling composition 214 can include displacing superconformal filling composition 214 across bottom member 206, exposed surface 216, sidewall 208, or field surface 204. Displacing can include rotating substrate 202, bubbling a gas (e.g., argon, nitrogen, carbon dioxide, and the like) through superconformal filling composition 214, stirring superconformal filling composition 214, heating superconformal filling composition 214 or substrate 202, recirculating superconformal filling composition 214, sonication of superconformal filling composition 214, vibration of substrate 202, and the like. In an embodiment, actively moving includes rotating the patterned wafer using equipment for rotating disk electrodes to which the patterned wafer is attached and suspended within the superconformal filling composition. In an embodiment, actively moving substrate 202 relative to the superconformal filling composition includes rotating substrate 202 at a rotation rate from 0 revolutions per minute (RPM) to 3000 RPM, specifically at rotation rates from 100 RPM to 1600 RPM. The rotation rate can be variable or fixed.

The process can include changing a rate of superconformal deposition of gold or changing from superconformally depositing gold to conformally or sub-conformally depositing gold. Here, it is contemplated that the process includes changing the rotation rate from a first rotation rate to a second rotation rate during superconformally depositing gold. The first rate can be, e.g., from 400 RPM to 3000 RPM, specifically 1600 RPM, and the second rate can be from 400 RPM to 100 RPM, specifically 100 RPM.

In the process, subjecting field surface 204 and recessed feature 250 to an electrical current can include attaching the specimen to a corrosion resistant metal holder such as a Pt holder that is rotating with a contact to a galvanostat or potentiostat that applies current or potential.

In the process, increasing the electrical current subjected to field surface 204 and recessed feature 250 to maintain the $V_{SSE}$ from −0.6 V to −1.0 V relative to the SSE can include stepping or ramping the potential or current to maintain the potential in the range −0.6 V and −1.0 V relative to the SSE. Here, superconformal filling self terminates because electrical current increases and then decreases back toward zero, wherein the electrical current is negative.

Figure 10:
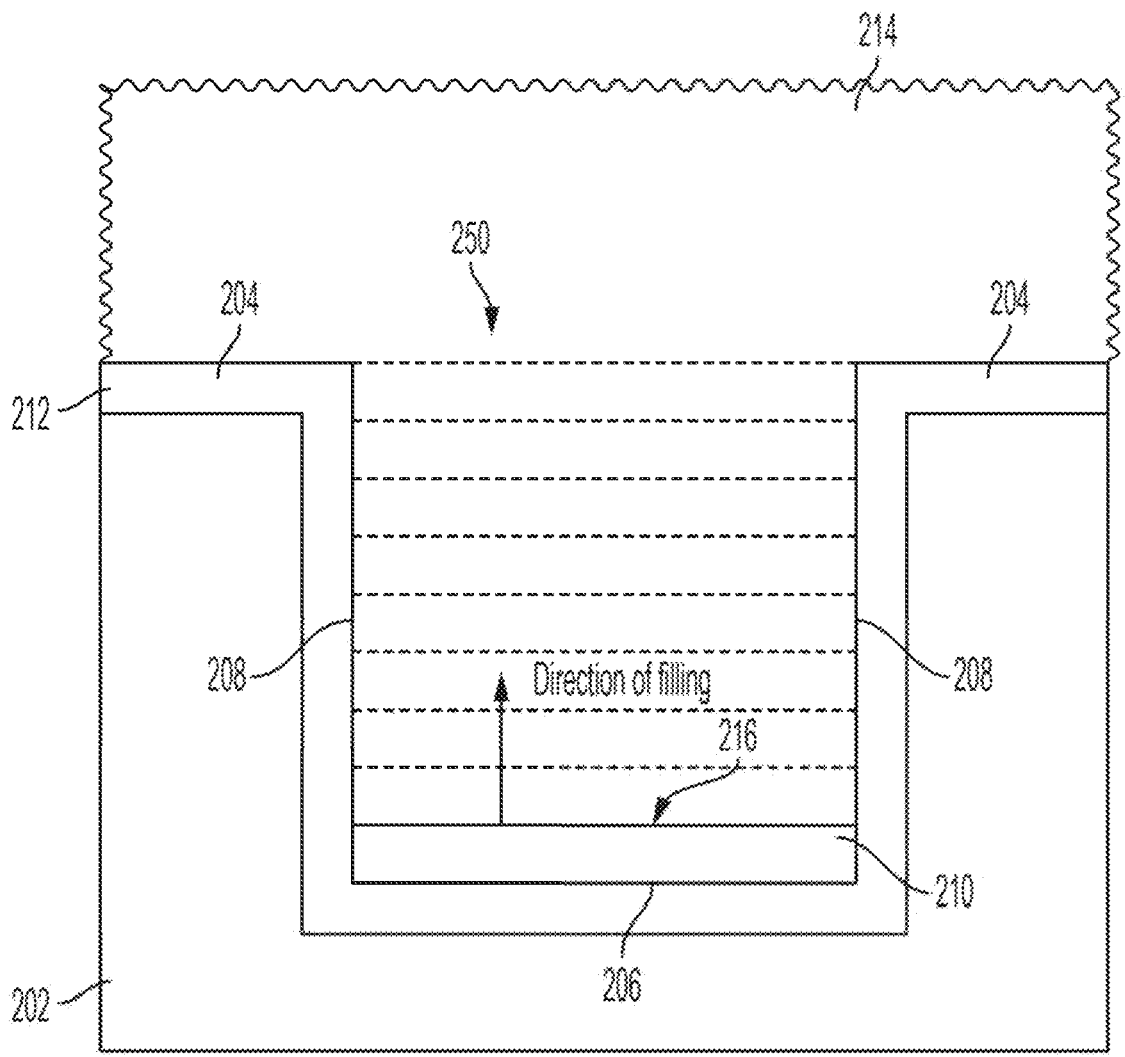
FIG. 10 shows growth of a metallic superconformal filling in the recessed feature of the substrate shown in FIG. 8 from the superconformal filling composition to make an article.
Figure 11:
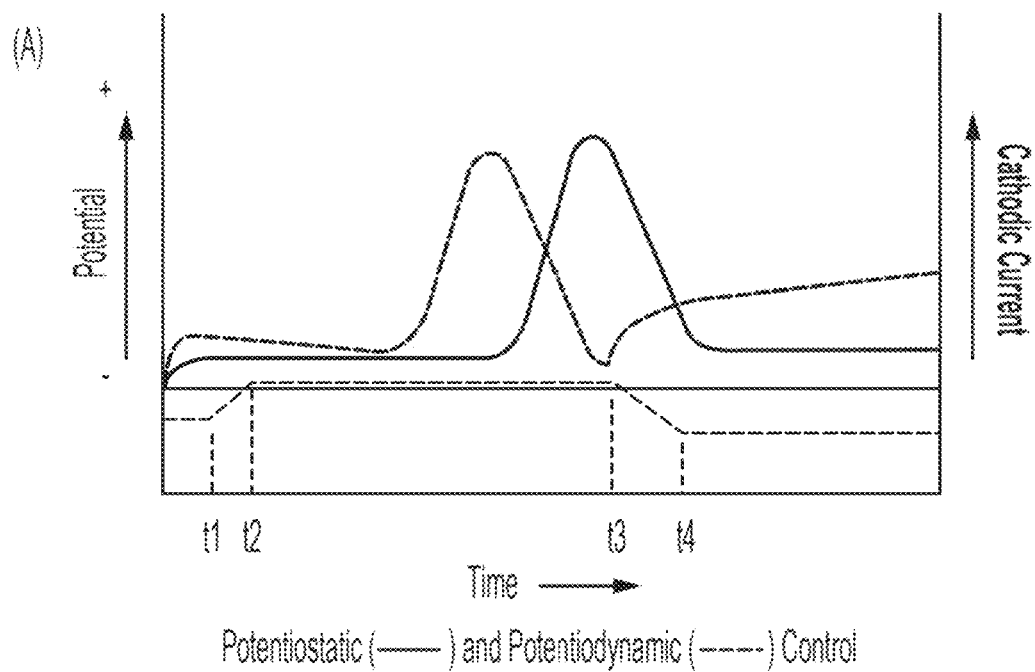
FIG. 11 shows a graph of potential and cathodic current versus time in panels A and B that occur during making a metallic superconformal filling.
Figure 11:
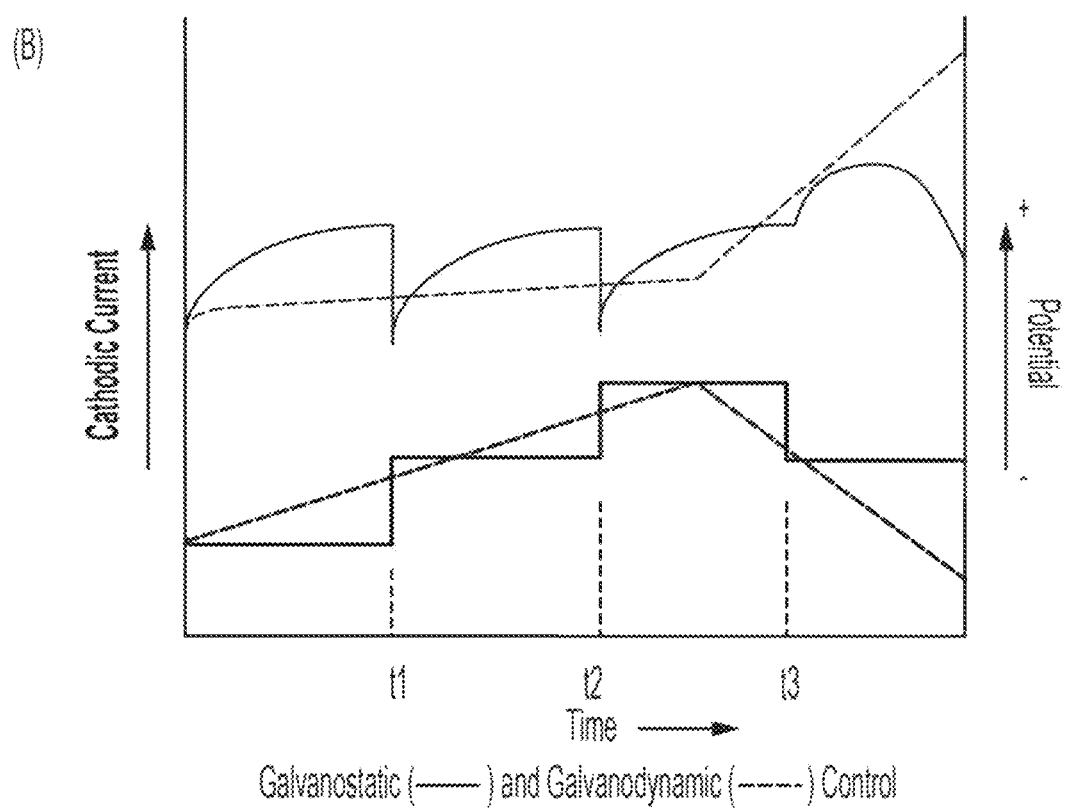

As shown in FIG. 10, growth proceeds from bottom member 206 in a direction of filling toward field surface 204. Here, with reference to FIG. 11, the electrical current can be subjected to overlayer 212 from low electrical current $I_{Low}$ to high electrical current $I_{High}$ to maintain the potential at field surface 204 and bottom member 206 from first voltage V1 to second voltage V2, wherein V1 is greater than or equal to V2, and V1 and V2 are from −0.6 V to −1.0 V relative to the SSE. In an embodiment, increasing the electrical current includes increasing the current through a series of steps of discrete and equal size at intervals that maintain potential in the specified interval.

According to an embodiment, the $V_{SSE}$ is maintained from −0.6 V to −1.0 V relative to the SSE until recessed feature 250 is completely filled with metallic superconformal filling 210. In an embodiment, the VSSE is maintained from −0.6 V to −1.0 V relative to the SSE until recessed feature 250 is partially filled with the aspect ratio being less than or equal to 0.5; and thereafter the process includes changing a deposition condition to fill recessed feature 250 sub-conformally, conformally, or a combination of at least one of the foregoing non-superconformal filling regimes (i.e., sub-conformally filling or conformally filling).

Figure 13:
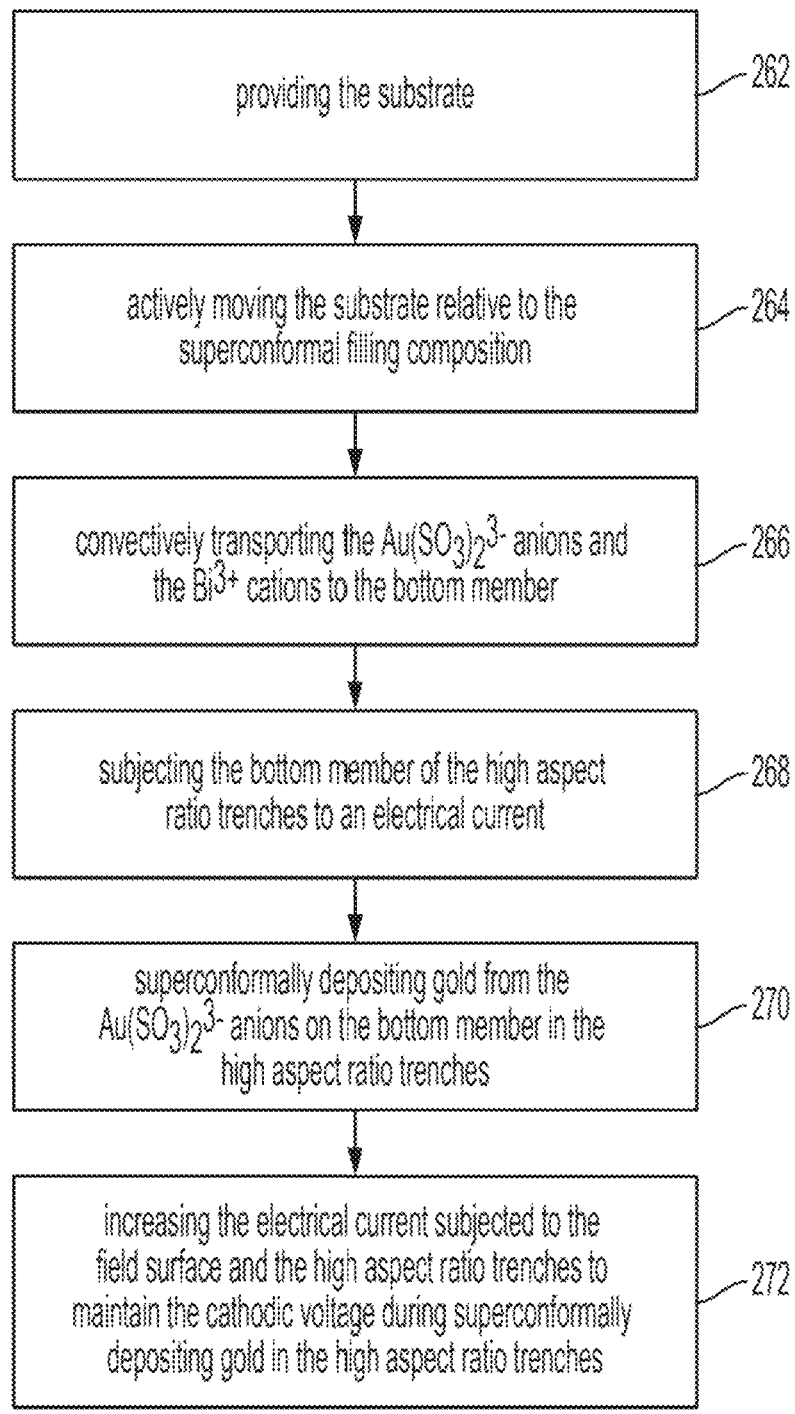
FIG. 13 shows a process for making a metallic grating.
Figure 14:
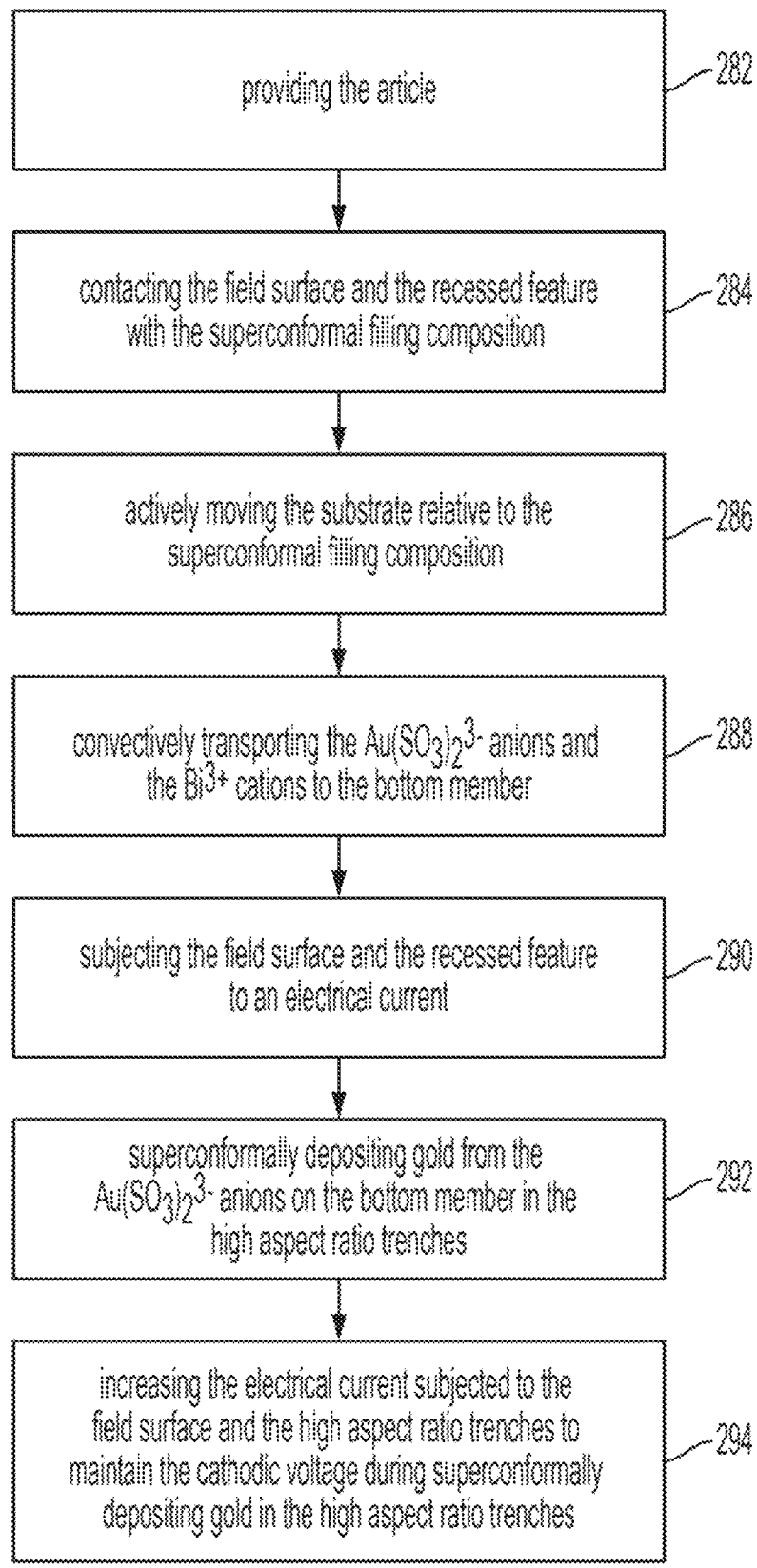
FIG. 14 shows a process for making an article.

According to an embodiment, with reference to FIG. 13, a process for making metallic grating 220 includes: providing substrate 202 with the plurality of high aspect ratio trenches 222 disposed in substrate 202 such that high aspect ratio trenches 222 are spaced apart from one another by field surface 204 of substrate 202, and each of high aspect ratio trenches 222 including: bottom member 206; sidewall 208 that separates bottom member 206 from field surface 204, and an aspect ratio of a height to a width from 0.5 to 200 before filling the high aspect ratio trench with metallic superconformal filling 210, the aspect ratio decreasing during filling the high aspect ratio trench with metallic superconformal filling 210; and optionally an overlayer disposed on the bottom member; contacting bottom member 206 with superconformal filling composition 214, superconformal filling composition 214 having a near-neutral pH and including: a plurality of $Au(SO_3)_2^{3-}$ anions as a source of gold that is superconformally deposited as metallic superconformal filling 210 in high aspect ratio trenches 222, a plurality of $SO_3^{2-}$ anions; and a plurality of $Bi^{3+}$ cations as a brightener and an accelerator for superconformally depositing gold in high aspect ratio trenches 222; convectively transporting the $Au(SO_3)_2^{3-}$ anions and the $Bi^{3+}$ cations to bottom member 206 by actively moving substrate 202 relative to superconformal filling composition 214; subjecting bottom member 206 of high aspect ratio trenches 222 to an electrical current to superconformally deposit gold from the $Au(SO_3)_2^{3-}$ anions on relative to sidewall 208 and field surface 204, the electrical current providing an overvoltage for gold deposition, and a first deposition ratio of a first deposition rate of gold on bottom member 206 relative to a second deposition rate of gold on sidewall 208; and increasing the electrical current subjected to field surface 204 and high aspect ratio trenches 222 to maintain the cathodic voltage during superconformally depositing gold in high aspect ratio trenches 222 to form metallic superconformal filling 210 including gold in high aspect ratio trenches 222 such that metallic superconformal filling 210 is void-free and seam-free.

Substrate 202 can include a material such as silicon, silicon dioxide, germanium, or a compound semiconductor such as gallium arsenide, silicon nitride, gallium nitride, other nitrides, oxides, diamond or other carbons or polymers, boron, beryllium, aluminum, templated porous aluminum oxide. These materials can be used for applications in electrodepositing gold on substrates for diffraction gratings, microelectronics, microelectromechanical devices such as an accelerometer, or jewelry. In an embodiment, substrate 202 is a semiconductor, e.g., silicon. Substrate 202 can be multi-layered such a first layer is disposed on a second layer. The first layer can be, e.g., a semiconductor, and the second layer, e.g., can be a high-K dielectric such as a nitride of the material of the first layer, e.g., silicon nitride. It is contemplated that field 204 and recessed feature 250 including sidewall 208 and bottom member 206 are metallized to be electrically conductive tor electrodeposition of gold thereon through superconformally depositing gold. Alternatively, it is contemplated that substrate 202 is electrically conductive and is metallized on none, some, or all of field 204, sidewall 208 and bottom member 206 for electrodeposition of gold thereon through superconformally depositing gold.

Overlayer 212 provides full metallization of field 204 and recessed feature 250. Overlayer 212 can include a material such as gold, platinum, iridium, nickel, titanium, tantalum, ruthenium, palladium, rhodium, silver, and alloys thereof. Such materials can be used for adhesion to the substrate or wetting of the superconformal filling composition and superconformal filling. In an embodiment, overlayer 212 is a transition metal, e.g., Ti, Ta, or a combination thereof. A thickness of overlayer 212 can be from 1 nm to 1 µm, specifically from 10 nm to 100 nm or specifically from 100 nm to 1 µm. It is contemplated that in some embodiments overlayer 212 is an electrically conductive composite such as an electrically conductive polymer or an electrically conductive glass. Exemplary electrically conductive composites include indium tin oxide and the like.

Substrate 202 has recessed feature 250 that includes bottom member 206 and sidewall 208. Recessed feature 250 can be a trench, via, or another feature in which metallic superconformal filling 210 is formed. For electrical applications, metallic superconformal filling 210 can function as an electrical interconnect. A shape of recessed feature as viewed from field surface 204 toward bottom member 206 can be a via, trench, or a combination thereof. Before superconformally filling recessed feature 250, recessed feature 250 can have an aspect ratio of depth D (also referred to herein ad height) to width W from 0.5 to 1000, specifically from 1 to 60, wherein the aspect ratio increases during superconformally filling recessed feature 250 or the aspect ratio provided above for high aspect ratio trenches 222. A length of width W can be from 5 nm to 50 µm, specifically from 1 µm to 10 µm, or the width provided above for high aspect ratio trenches 222. A length of depth D can be from 50 nm to 5 mm, specifically from 0.5 µm to 5 µm, or the aspect height provided above for high aspect ratio trenches 222.

Metallic superconformal filling 210 is void-free and seam-free. It is contemplated that, in a presence of superconformal filling composition 214, passivation of field surface 204 and recessed feature 250 occurs at $V_{SSE}$ greater than −0.6 V relative to the SSE. Further in a presence of superconformal filling composition 214, sub-conformal deposition of gold occurs at the $V_{SSE}$ less than −1 V relative to the SSE, and superconformal deposition of gold occurs at the $V_{SSE}$ from −0.6 V to −1.0 V relative to the SSE. Accordingly, superconformal deposition of gold occurs when $V_{SSE}$ is maintained from −0.6 V to −1.0 V relative to the SSE. As used herein, a potential being greater than a recited voltage means that the potential is more positive and less negative than the recited voltage. As used herein, a potential being less than a recited voltage means that the potential is less positive and more negative than the recited voltage.

Figure 12:
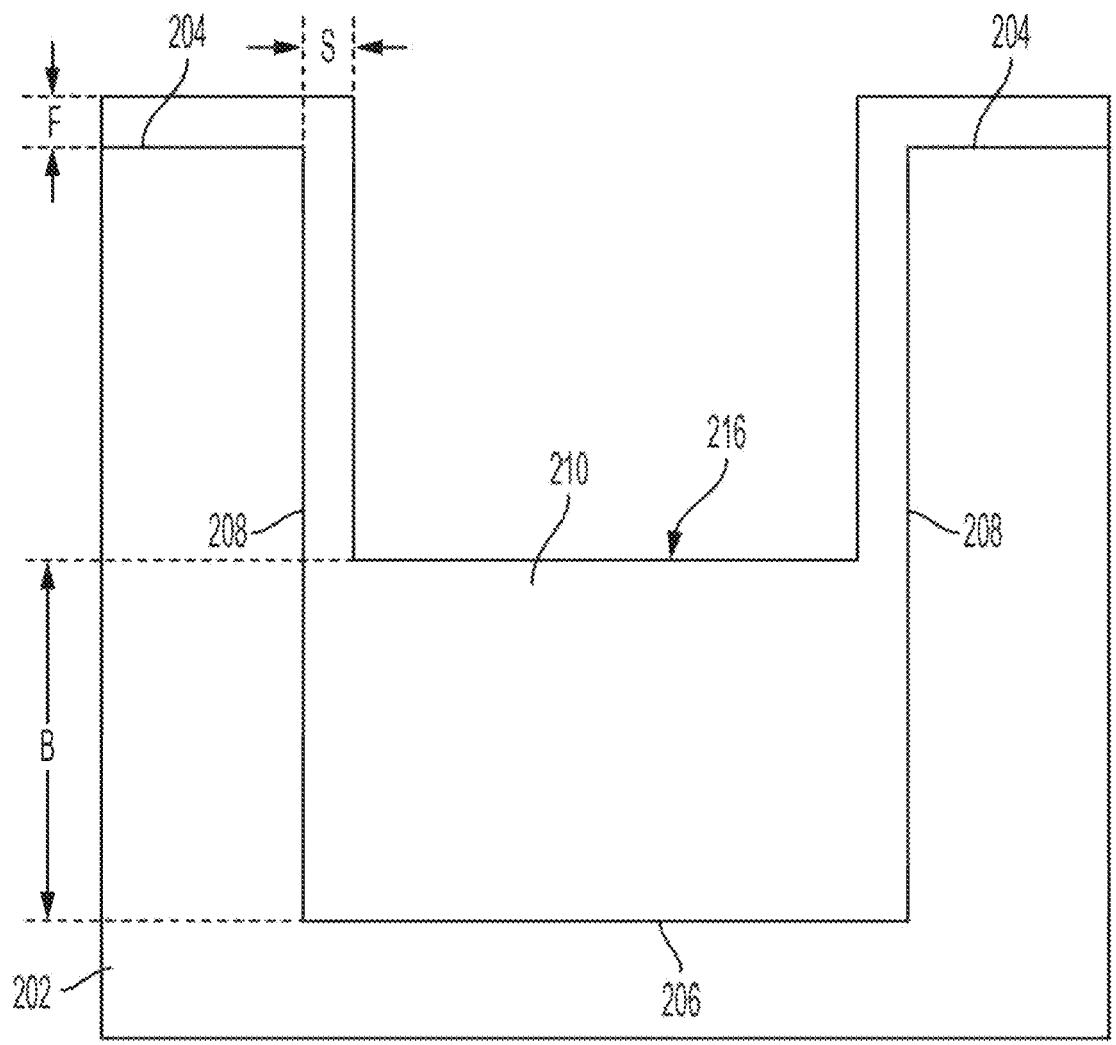
FIG. 12 shows an article that includes a metallic superconformal filling disposed on a field surface and a recessed feature of the article.

With reference to FIG. 12, an amount of metallic superconformal filling 210 superconformally deposited on bottom member 206 relative to sidewall 208 is a filling ratio given by thickness B of metallic superconformal filling 210 disposed on bottom member 206 relative to thickness S of metallic superconformal filling 210 disposed on sidewall 208, i.e. B/S, that can be from 2 to 10000, specifically from 2 to 100. An amount of metallic superconformal filling 210 superconformally deposited on bottom member 206 relative to field surface 204 is a bottom coverage given by thickness B relative to thickness F of metallic superconformal filling 210 disposed on field surface 204, i.e B/F, that can be from 2 to 10000, specifically from 2 to 1000.

Metallic superconformal filling 210 includes gold or an alloy of gold. Exemplary alloys include gold-silver, gold-cobalt, and gold-nickel. Elements in the alloy can be provided in superconformal filling composition 214. A purity of metallic superconformal filling 210 can be from 97 at % Au to 100 at % Au, specifically based on the elements in the metallic superconformal filling. An alloying element can be present in super conformal filling 210 in an amount from 0 at % to 3 at %, based on the elements in the metallic superconformal filling. Exemplary alloying elements are Ag, Co, and Ni. Trace elements can be present and can include Na, K, Pb, Tl, and the like.

Advantageously, and unexpectedly, metallic superconformal filling 210 can be crystalline, dense, void-free, and seam-free of the macroscale, microscale, and nanoscale. In an embodiment, metallic superconformal filling 210 is completely crystalline and is not amorphous. Crystalline domains of metallic superconformal filling 210 include face centered cubic gold. Voids and seams include voids and seams along the centerline of the feature as well as pores within grains, and along grain boundaries, and the like, which are absent in metallic superconformal filling 210 using an electron microscope at magnifications up to 100,000. As used here in, "macroscale" refers to dimensions that are of size 100 μm to 1 mm. As used here in, "microscale" refers to 0.1 μm to 100 μm. As used here in, "nanoscale" refers to 1 nm to 0.1 μm. In this regard, metallic superconformal filling 210 is shiny and planar at exposed surface 216 on a submicron level with, a brightness of metallic superconformal filling 210 occurring in an absence of dendrites on exposed surface 216.

Various types of fillings can be deposited in a recess of a substrate such as a sub-conformal filling, conformal filling, or, as herein, metallic superconformal fillings 210. It should be appreciated that sub-conformal fillings have thicker deposits closer to the feature entrance (i.e., top) with deposit thickness decreasing farther down (i.e., within) the feature. Further, conformal fillings can have uniform deposit thickness over the surface of the deposit. Moreover, metallic superconformal filling 210 can have a thinner deposit proximate to the feature entrance (i.e., top) and deposit thickness increasing monotonically farther down (i.e., within) the feature. Metallic superconformal filling 210 is bottom-up that forms with essentially planar deposition starting on the bottom surface.

Superconformal filling composition 214 forms metallic superconformal 210 on bottom member 206 and has a near-neutral pH, As used herein, "near-neutral pH" refers to a pH that is from 5 to 11.5, with the lower value provided by instability of the superconformal filling composition. In an embodiment, the near-neutral pH of the superconformal filling composition is from 6.5 to 9.5. Moreover, superconformal filling composition 214 includes a plurality of $Au(SO_3)_2^{3-}$ anions as a source of gold for superconformally depositing gold in recessed feature 250; a plurality of $SO_3^{2-}$ anions; and a plurality of $Bi^{3+}$ cations as a brightener and an accelerator for superconformally depositing gold in recessed feature 250. The $Au(SO_3)_2^{3-}$ anions can, be provided by a compound that includes the $Au(SO_3)_2^{3-}$ anions such as $Na_3Au(SO_3)_2$. The $Au(SO_3)_2^{3-}$ anions can, be present in superconformal filling composition 214 in an amount from 5 millimolar (mM) to 350 mM, specifically from 80 mM to 160 mM. The $SO_3^{2-}$ anions can be provided by a compound that includes the $SO_3^{2-}$ anions such as $K_2SO_3$, $Na_2SO_3$, $(NH_4)_2SO_3$ and alkyl ammonium derivatives thereof or a combination thereof. The $SO_3^{2-}$ anions can be present in superconformal filling composition 214 in an amount from 0.1 molar (M) to 1 M, specifically from 0.6 M to 0.7 M. It is contemplated that a source of the $Au(SO_3)_2^{3-}$ anions and the $SO_3^{2-}$ anions are independent. Moreover, the concentration of $SO_3^{2-}$ anions is independent from the concentration of $Au(SO_3)_2^{3-}$ anions in that the $SO_3^{2-}$ anions are not part of the $Au(SO_3)_2^{3-}$ anions present in superconformal filling composition 214. The $Bi^{3+}$ cations can be provided by a compound that includes the $Bi^{3+}$ cations such as bismuth sulfate or bismuth oxide or may be added through electrochemical dissolution from a Bi metal source. The $Bi^{3+}$ cations can be present in superconformal filling composition 214 in an amount from 1 micromolar (that can be written as mmM or μM or μmol/L) to 100 μM, specifically from 2 μM to 40 μM. Without wishing to be bound by theory, it is believed that in the process for superconformally filling, the superconformal deposition of gold is catalyzed by Bi or its complexes adsorbed on the surface from the $Bi^{3+}$ cations.

Superconformal filling composition 214 can include an additive. Exemplary additives include hardeners, such as As and Sb, surfactants or deposition suppressing additives. In an embodiment, superconformal filling composition 214 includes Bi in the absence of additive.

According to an embodiment, superconformal filling composition 214 consists essentially of $Au(SO_3)_2^{3-}$ anions, $SO_3^{2-}$ anions, $Bi^{3+}$ cations in an aqueous liquid.

In the process, the electrical current provides a cathodic voltage ($V_{SSE}$) from −0.6 V to −1.0 V relative to a saturated sulfate electrode (SSE), specifically from −0.6 V to −0.95 V. In an embodiment, the $V_{SSE}$ is −0.74 V. In an embodiment, the cathodic electrical current changes from 0.1 mA/cm$^2$ to 10 mA/cm$^2$ to maintain $V_{SSE}$ from −0.6 V to −1.0 V.

Figure 15:
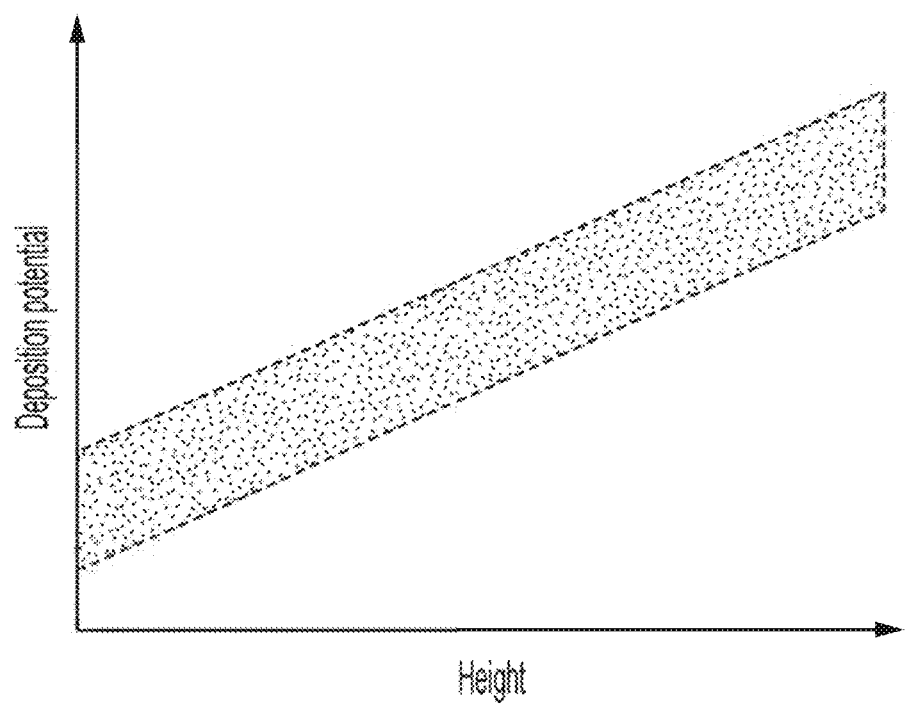
FIG. 15 shows a graph of deposition potential versus height of a high aspect ratio trench for forming a metallic superconformal filling.
Figure 16:
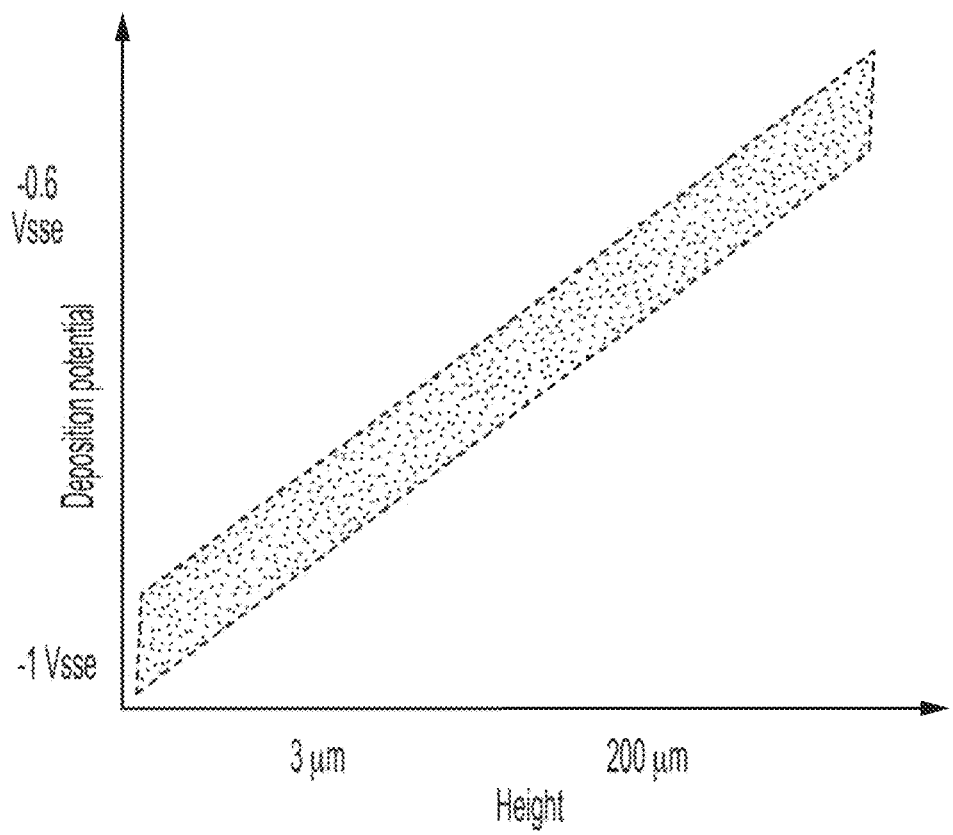
FIG. 16 shows a graph of deposition potential versus height of a high aspect ratio trench for forming a metallic superconformal filling.
Figure 17:
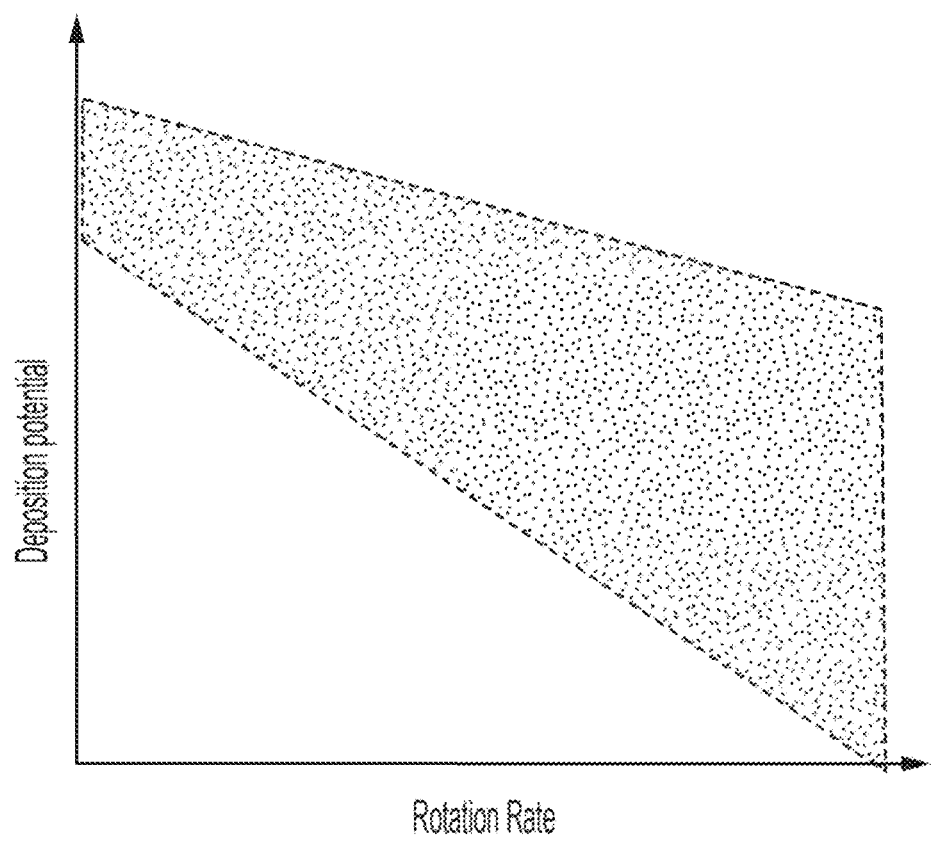
FIG. 17 shows a graph of deposition potential versus rotation rate for forming a metallic superconformal filling.
Figure 18:
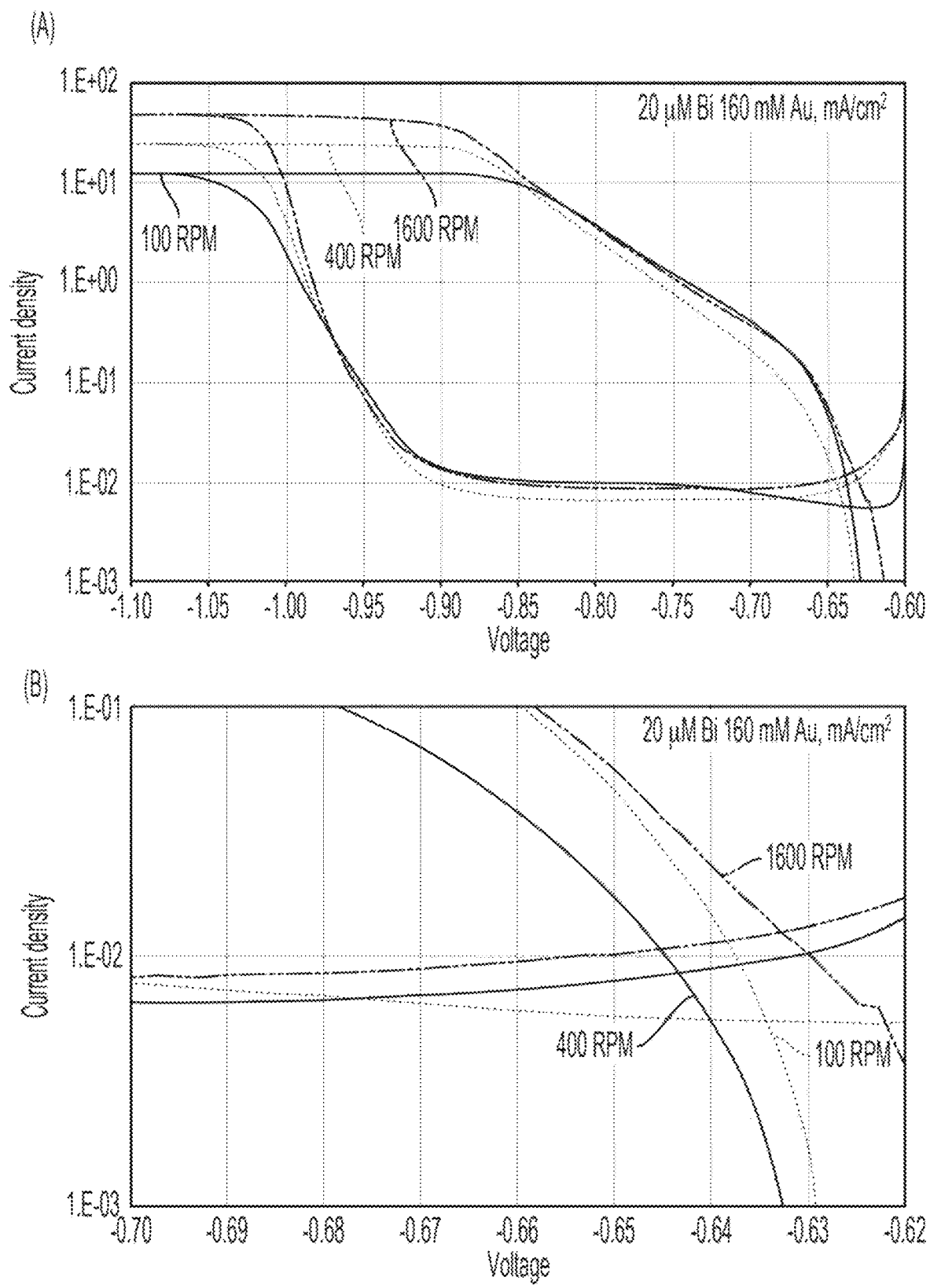
FIG. 18 shows a graph of current density versus deposition potential for forming a metallic superconformal filling in a high aspect ratio trench in panel A and an enlarged view of a portion thereof in panel B; wherein panel A includes data for cyclic voltammetry in 160 mmol/L $Na_3Au(SO_3)_2$+ 0.64 mol/L $Na_2SO_3$ electrolyte of pH 9.5 containing 20 µmol/L $Bi^{3+}$. RDE rotation rates are as indicated. Current densities are obtained from measured current using the nominal RDE surface area of 0.79 $cm^2$. The two current density values in the potential range −0.9 V to −0.6 V for each cycle represent Au deposition rates expected on a bottom (higher current density) and sidewall (lower current density) of filling recessed features during bottom-up super-conformal gold filling.

With reference to FIG. 15, formation of metallic superconformal filling 210 in high aspect ratio trenches 222 selectively occurs over a controllable range of deposition potentials. The range of deposition potential depends upon a height of high aspect ratio trenches 222 for a set of conditions such as concentration of various electrolytes in superconformal filling composition 214 and pH in view of the aspect ratio and rotation rate of substrate 202. Further, the deposition potential for formation of metallic superconformal filling 210 increases as the height of high aspect ratio trenches 222 increases for a set of conditions. Exemplary, though non-limiting, deposition potentials $V_{SSE}$ from −1 V to −0.6 V form metallic superconformal filling 210 versus height of high aspect ratio trenches 222 is shown in FIG. 16. Similarly, FIG. 17 shows deposition potential versus rotation rate over various conditions. For FIG. 17, exemplary conditions for making metallic superconformal filling 210 include performing deposition of gold in 80 mmol/L $Na_3Au(SO_3)_2$+0.64 mol/L $Na_2SO_3$ electrolyte of pH 9.5 containing 4 μmol/L $Bi^{3+}$ in 3 μm deep trenches of aspect ratio 1.3; deposition of gold in 80 mmol/L $Na_3Au(SO_3)_2$=0.64 mol/L $Na_2SO_3$ electrolyte of pH 9.5 containing 24 μmol/L $Bi^{3+}$ in 45 μm deep trenches of aspect ratio 11; deposition in 80 mmol/L $Na_3Au(SO_3)_2$=0.64 mol/L $Na_2SO_3$ electrolyte of pH 9.5 containing 24 μmol/L $Bi^{3+}$ in 210 μm deep trenches of aspect ratio 30. Within these conditions, FIG. 18a, shows an exemplary cyclic voltammogram for gold deposition for rotation of a substrate at 100 RPM, 400 RPM, and 1600 RPM, wherein deposition is in 160 mmol/L $Na_3Au(SO_3)_2$=0.64 mol/L $Na_2SO_3$ electrolyte of pH 9.5 containing 20 μmol/L $Bi^{3+}$. RDE rotation rates are indicated in revolution per minute (RPM) (200π rad/min). Current densities are obtained from measured current using the nominal RDE surface area of 0.79 cm$^2$. Data was acquired at a scan rate of 2 mV/s using software compensation for 90% of the measured (3.6 to 3.8) Ω cell resistance with ≈0.4Ω of uncompensated cell resistance. It should be appreciated that gold deposition occurs at potentials where the forward portion and the reverse portion of the hysteresis curve (for a given rotation rate) cross at a most-positive potential through a most-negative potential where the forward and reverse portions of the hysteresis curve asymptotically converge and overlap. Under the exemplary conditions tor FIG. 18, it should be appreciated that subjecting the substrate to the electrical current provides deposition of gold from Au $(SO_3)_2{}^{3-}$ anions from slightly negative of −0.63 V to −1.0 V as shown in FIG. 18b. Increasing the deposition time, changing the pH, changing the temperature, changing the feature dimensions, or changing electrolyte concentrations can provide deposition of gold for more positive potentials, e.g., up to −0.60 V.

With $V_{SSE}$ from −0.6 V to −1.0 V, a first deposition ratio of a first deposition rate of gold on bottom member 206 relative to a second deposition rate of gold on sidewall 208 can be from 2 to 1000. In an embodiment, a deposition ratio of a thickness of gold deposited on field surface 204 to a thickness of gold deposited on bottom member 206 is from 1:20 to 1:100.

According to an embodiment, superconformally filling recessed feature 250 is bottom-up filling. In an embodiment, field surface 204 is passivated during bottom-up filling. In a particular embodiment, the bottom-up filling is uniform over the entirety of bottom member 206.

Article 200, including metallic grating 220, and processes for superconformally filling recessed feature 250, including high aspect ratio trenches 222, with gold have numerous beneficial uses, including defect-free (i.e., seam-free and void-free) gold metallization as metallic superconformal filling 210. Further, the processes can be used to make defect-free gold metallic superconformal filling 210 structures in microelectromechanical system (MEMS). In an embodiment, a process for making a MEMS device with article 200 includes: processes described herein and removing selected material by a subtractive process to form a mechanical separation that provides a suspended mass that can be used a mass reference device.

In an embodiment, a process for making an electronic device with article 200 includes, includes: the superconformal deposition processes described herein followed by chemical mechanical planarization to remove the electrically conductive overlayer leaving gold metallic superconformal filling as electrically isolated wires and vias disposed in the substrate.

Moreover, processes and metallic superconformal filling 210 herein have numerous advantageous and beneficial properties. In an aspect, the process yields defect-free metal features for electrical conduction. The superconformal formation of the process yields reduced metal deposition on the field surface that decreases process cost, including reduced gold consumption in the superconformal filling composition as well as time and cost required to remove gold from the field surface. As with metallic grating 220, processes herein beneficially provide defect-free metallic superconformal filling 210 in high aspect ratio trenches 222 so that metallic grating 220 can be used as a diffraction grating for x-ray scattering. Processes produce metallic superconformal filling 210 that can have a selected height, wherein the plurality of metallic superconformal fillings 210 can have a uniform height. Additionally, passivation after forming metallic superconformal filling 210 to a selected height produces reproducible feature filling.

The processes and metallic superconformal filling 210 herein unexpectedly enable exclusively bottom-up metallic superconformal filling of recessed features as well as more general metallic superconformal filling of recessed features, selectable using processing parameters including concentrations, convectively transporting, potential, or adjusting temperature. Moreover, the processes and metallic superconformal filling 210 herein overcomes technical limitations, shortcomings, and problems of conventional processes. In this respect, gold filling by conventional conformal electrodeposition processes leave voids and seams in features of intermediate aspect ratio and leaves voids in reentrant features. Conventional conformal deposition processes deposit metal on the field surrounding recessed features, lengthens post-deposition processing time that involves removing extra deposited material, wastes gold deposited on the field of the substrate, and more rapidly depletes electrolyte than the processes described herein.

The articles and processes herein are illustrated further by the following Examples, which are non-limiting.

EXAMPLES

Example 1. Bottom-Up Superconformal Filling for Making Diffraction Gratings

Bottom-up, void-free gold electrodeposition in recessed features can occur in a gold sulfite electrolyte containing 80 mmol/L $Na_3Au(SO_3)_2$ with 2 troy ounces of gold per liter at 320 mmol/L $Na_3Au(S_3)_2$ to which 0.64 mmol/L $Na_2SO_3$ and micromolar concentrations of bismuth ($Bi^{3+}$) have been added. Void-free, bottom-up filling was achieved in features ranging from 3 μm deep trench (height/width aspect ratio (AR)≈1.5) interconnects to x-ray grating trench arrays 5.5 μm deep (AR≈8.5) and 45 μm deep (AR≈11). Void-free superconformal filling was made for gratings 17 μm deep (AR≈26) through partial bottom-up filling coupled with a modest gradient of deposition rate down the sidewalls. Feature filling is $Bi^{3+}$-mediated, gold bottom-up filling in patterned specimens with fluid flow suppressing such action on the field above without perturbing accelerated deposition within. Electrochemical measurements coupled with spectroscopy and electron microscopy on planar substrates indicate that electrolyte flow across the surface keeps the field suppressed by, perhaps unintuitively, preventing the accumulation of accelerating Bi adsorbate. In pH 9.5 electrolyte, the rate of $Bi^{3+}$ adsorption decreases at more positive potentials, and these kinetics likely are associated with an undesired "incubation period" of slow, but uniform, deposition that precedes bottom-up filling and effectively increases the aspect ratio that must be filled. Accordingly, both potentiodynamic and galvanodynainic processes were developed to, shorten the duration, and thus impact, of the incubation period. Maps of the Au microstructure in the largest features, obtained using electron backscatter diffraction (EBSD), show that grains generally span the trench width and often exceed tens of micrometers in length (discounting twins), aside from conditions of marginal filling and near the trench openings.

Bismuth used in these electrolytes is a p-block heavy metal whose adsorption is known to suppression intrinsic to both cyanide and sulfite electrolytes and permit the fabrication of smooth, bright Au films. Among these, the adsorption of Pb enables superconformal Au filling of (sub)micrometer size features. The filling process is quantitatively explained using the Curvature Enhanced Accelerator Coverage (CEAC) model. The same construct also captures the behavior of Cu from sulfate and Ag from cyanide electrolyte for suitable additive packages. In contrast, the bottom-up morphological evolution of Au filling in trenches achieved through the addition of $Bi^{3+}$ more closely resembles Cu bottom-up filling observed during, and quantified for, the fabrication of through silicon vias (TSV) for microelectronics. Conventional bottom-up filling of TSV is in electrolytes containing additives that suppress, rather than accelerate, metal deposition. Breakdown of suppression in those systems has been characterized by S-shaped negative differential resistance (NDR) in voltammetry that, coupled with resistive losses in the electrolyte, gives rise to the bifurcation of the electrode surface into active and passive zones that go hand-in-hand with localized feature filling. With recessed features such as TSV, coupling of suppressor adsorption and substrate topography bias active deposition toward the most recessed surfaces. In the case of $Bi^{3+}$ stimulated feature filling, similar traits and trends in morphological evolution are evident despite Au growth dynamics stemming from additive-induced acceleration of the intrinsically suppressed deposition process.

$Bi^{3+}$-based bottom-up Au filling of substantially deeper and higher aspect ratio trenches such as 210 μm tall and AR≈30 recessed features were filled with metallic superconformal filling. Electrolyte optimization was pursued by examining the dependence of filling on pH and $Na_3Au(SO_3)_2$ concentration. The composition and microstructure of the deposits are examined by Secondary ion Mass Spectroscopy (SIMS) and EBSD. SIMS enables the distribution of Bi within the Au deposits to be determined while EBSD is used to map the grain size and distribution. A rotating disk electrode is used for electroanalytical measurements while for feature filling rotation of rectangular wafer fragments analogous to a helicopter blade was implemented. In both cases fluid flow is defined by the rotation rate of the substrates in the electrolyte. With the patterned substrates in particular the rotation rate was maintained at levels that ensured the field remained in the passive state while uniform filling of the recessed features occurred across the patterned substrates.

Silicon wafers patterned and etched with arrays of trenches made using reactive ion etching Bosch processes were cleaved into 11 mm×3 mm fragments for studies of trench filling. Trench sizes included: 3 μm deep (AR=1.2), 5.5 μm deep (AR=8.5 to 9), 4.5 μm deep (AR=11), and 210 μm deep (AR=30). The conductive seed layer on the larger trenches includes 50 nm platinum (Pt) grown over the entire surface of the patterned specimens by atomic layer deposition (ALD) followed by an overlying Au layer deposited line-of-sight from an electron beam evaporated metal source. As the latter flux was at normal incidence to the wafers, the Au overlayer is 100 nm on the field and bottoms of the trenches with minimal coverage on the Pt-coated sidewalls. The seed layers on the shallower trenches, universal to coverage on the 3 μm and 5.5 μm deep trenches and ALD Pt with line-of-site partial Au coverage on the 45 μm deep trenches, have been detailed previously.

Feature filling and voltammetric studies were conducted in a cell containing; 40 mL of 80 mmol/L or 160 mmol/L $Na_3Au(SO_3)_2$ that included 320 mmol/L, $Na_3Au(SO_3)_2$) (commercially available from Technic under trade name TG-25) diluted in 18 MΩ·cm water electrolyte to which 0.64 mol/L $Na_2SO_3$ was added. The pH of the electrolyte as mixed was 9.4 to 9.5. The impact of pH was examined by titration with NaOH additions, Dilute additions of $Bi^{3+}$ were introduced by anodic dissolution of 99.999% Bi metal. Deposition on patterned specimens was conducted with the specimens rotating about one end from a Pt spindle in the electrolyte; all stated potentials are relative to a $Hg/Hg_2SO_4$/ saturated $K_2SO_4$ reference electrode (SSE). Cyclic voltammetry and chronoamperometry were performed using a gold rotating disk electrode (RDE) of 1.0 cm diameter that was electroplated on the end of an Ag rod embedded in epoxy. The Au RDE was polished to 1200 grit SiC paper before each experiment and current densities were evaluated based on the nominal (geometric projected) area. Electroanalytical data was acquired using software compensation for resistive potential drop from the measured cell impedance (iR) as indicated. No iR compensation was used during feature filling because of the changing geometry arising from specimen rotation.

The Bi coverage on the Au electrodeposits grown on Au-seeded, polished Si wafer fragments was evaluated using x-ray photoelectron spectroscopy (XPS). Following immersion of the actively plated Au surface under a protective $H_2$ and argon atmosphere, the Bi species remaining on the surface is in the metallic form. Without such protective measures the Bi species were subject to significant oxidation prior to XPS analysis.

Procedures for cross-sectioning specimens for optical and scanning electron microscope (SEM) imaging and electron backscatter detector (EBSD) mapping as well as secondary ion mass spectroscopy, (SIMS) characterization were used. SIMS analysis was conducted using a time-of-flight-SIMS system equipped with a 30 keV $Bi_3^+$ liquid metal ion source for analysis and a 20 keV $Ar_{2700\pm800}^{+0}$ cluster source for sputtering, both sources striking the sample surface at an angle of 45°. Analysis was performed in high-current bunched mode (high mass resolution mode) using a (250× 250) μm² analysis raster with a pixel density of (256×256), integrated over 200 scans. With a pulsed current of 0.390 pA, this corresponded to an ion dose of roughly $5.1\times10^{12}$ ions per cm². All areas were sputter cleaned prior to analysis using the Ar cluster source to remove surface contaminants and oxide layers by rastering 100 scans inside a (500×500) μm² area ($1.5\times10^{15}$ ions per cm² at 3.6 nA).

Conditions where highly localized bottom-up feature filling can be obtained in the $Bi^{3+}$ containing Au electrolyte with negligible deposition on the neighboring free surface correspond to experimental conditions where deposition remains suppressed on a rotating disk electrode (RDE), albeit with a more uniform and well-defined flow field in this latter case. For both workpiece geometries, high flow is associated with suppression in the $Bi^{3+}$-accelerated Au system, with higher rotation rates sustaining suppression to more negative potentials and/or higher $Bi^{3+}$ concentration.

A characteristic of accelerating additives, including the $Bi^{3+}$ additive in this gold sulfite electrolyte, is that their presence induces hysteresis during cyclic voltammetry. Au deposition rates are increased, especially on the return scan, exceeding those achieved in the absence of $Bi^{3+}$ additive until the transport limit of the Au. Such hysteresis, previously observed with electrolyte of pH 9.5, is also evident in electrolytes with a pH of 10.3 and 11.5 (FIG. 19a), a monotonic shift in the acceleration on the negative going scan to more positive potentials (depolarization) being seen for higher pH values. For a fixed pH of 9.5, increasing the gold sulfite concentration by a factor of two to 160 mmol/L (FIG. 19b) increases the current density as would be expected, although the limiting current for Au deposition only increases by a factor of approximately 1.5.

Figure 19:
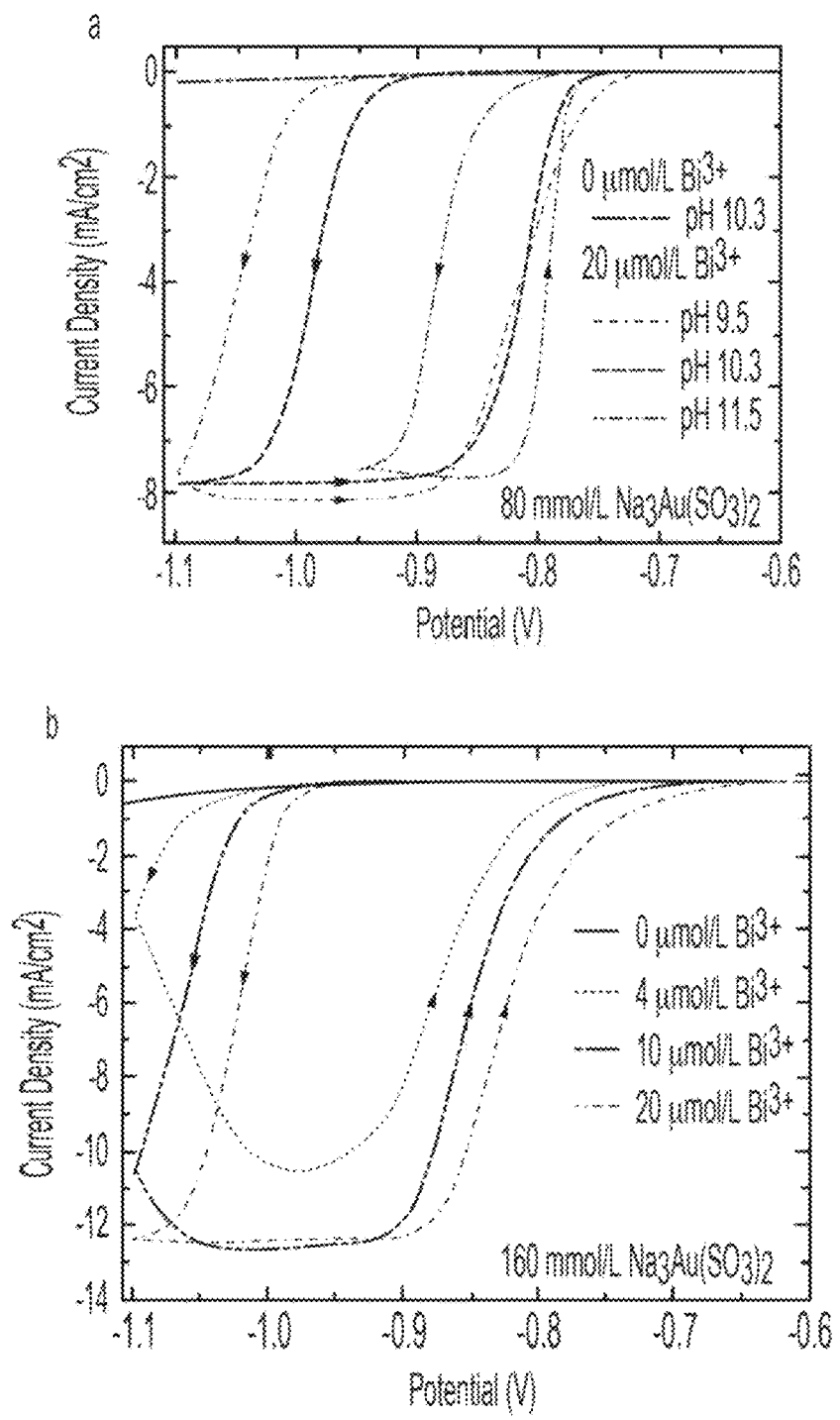
FIG. 19 shows: (a) cyclic voltammetry in 80 mmol/L $Na_3Au(SO_3)_2$+0.64 mol/L $Na_2SO_3$ electrolyte of the indicated pH containing 20 µmol/L $Bi^{3+}$. (b) Cyclic voltammetry in 160 mmol/L $Na_3Au(SO_3)_2$+0.64 mol/L $Na_2SO_3$ electrolyte of pH 9.5 containing the indicated $Bi^{3+}$ concentrations. RDE rotation rate for all is 100 revolution per minute (RPM) (200π rad/min). Current densities are obtained from measured current using the nominal RDF, surface area of 0.79 $cm^2$. Data was acquired at a scan rate of 2 mV/s using software compensation for 90% of the measured (3.6 to 3.8) Ω cell resistance with ≈0.4Ω of uncompensated cell resistance.
Figure 20:
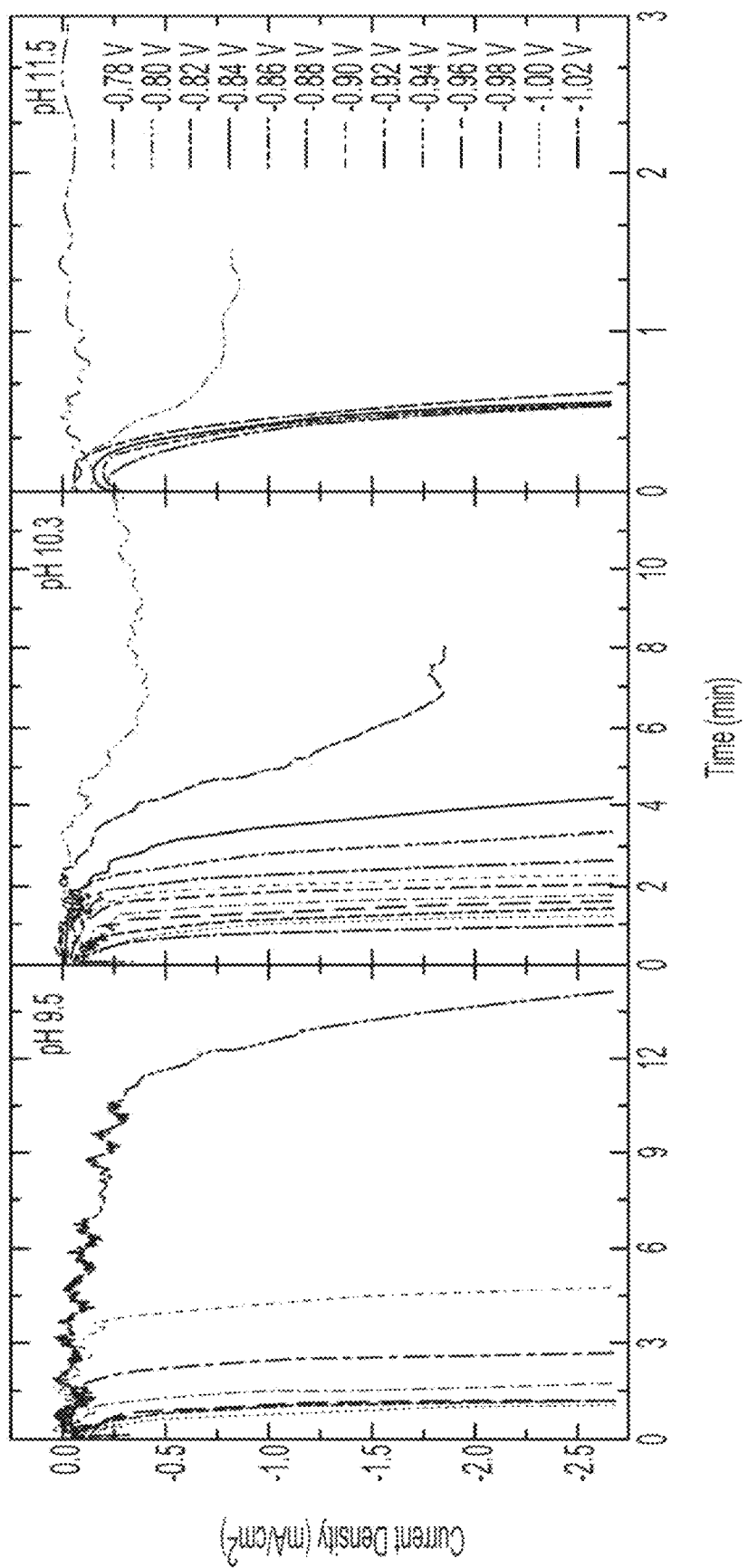
FIG. 20 shows chronoamperometry in electrolyte including 80 mmol/L $Na_3Au(SO_3)_2$+0.64 mol/L $Na_2SO_3$ electrolytes of the indicated pH containing 20 µmol/L $Bi^{3+}$. Potentials are indicated. The RDE rotation rate for all is 100 RPM. Current densities are obtained from measured current using the nominal RDE surface area of 0.79 $cm^2$. Data was acquired using software compensation for 90% of the measured (3.6-3.8) Ω cell resistance with ≈0.4Ω of uncompensated cell resistance.

Chronoamperometric measurements in the three different pH electrolytes under the same hydrodynamics conditions capture the initiation and evolution of deposition at representative values of applied potential (FIG. 20). Active deposition follows an incubation period of slow passive deposition that increases from several 10's of seconds to more than 10 min as the potential shifts positive from −1.02 V to −0.88 V in the pH 9.5 electrolyte. The incubation period at a given potential is substantially reduced in the pH 10.3 electrolyte; its duration at −0.88 V is shortened by half an order of magnitude. At more positive potentials, i.e. −0.84 V, the incubation period in the pH 10.3 electrolyte increases only modestly and, at more positive potentials, is coupled with reduced steady state deposition current once activation does occur. In the pH 11.5 electrolyte the incubation period is negligible and essentially independent of potential through −0.82 V. There is also a reduction of the deposition current at more positive potentials that is analogous to that observed in the pH 10.3 electrolyte. The increasing depolarization observed with pH in FIG. 19a might be due to a change in the speciation of the $Bi^{3+}$ precursor that yields faster kinetics of $B^{3+}$ adsorption and thereby activation of the Au deposition reaction.

Figure 21:
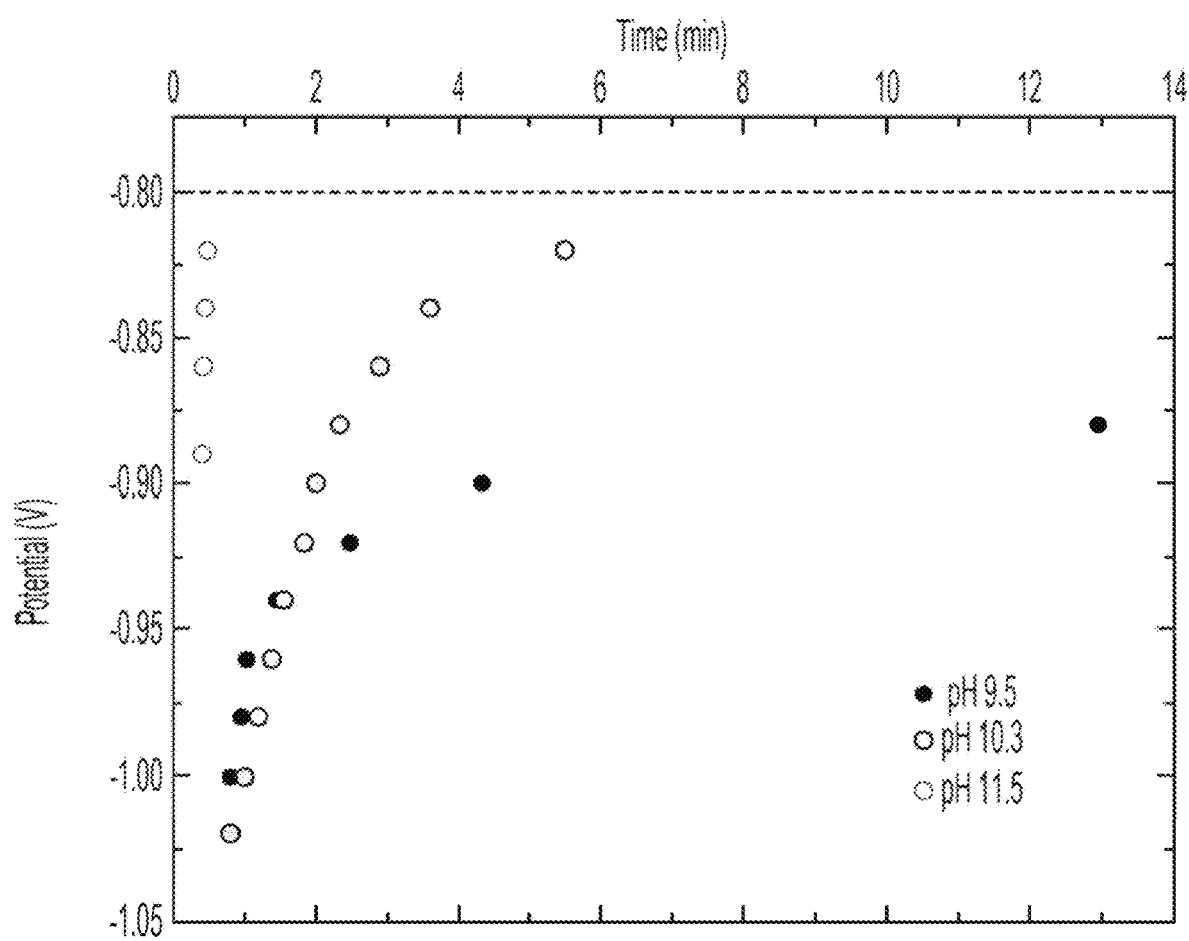
FIG. 21 shows time to reach 1 mA current on the RDE, an average current density of 1.27 mA/$cm^2$, as a function of applied potential in 80 mmol/L $Na_3Au(SO_3)_2$+0.64 mol/L $Na_2SO_3$ electrolytes of the indicated pH containing 20 µmol/L $Bi^{3+}$. The dashed line is experimental results for deposition current that did not rise to the threshold value in pH 10.3 and 11.5 electrolytes. All at RDF rotation rate of 100 RPM.

The time to obtain significant activation of the RDE, as marked by rising current at the end of the incubation period in FIG. 20, is summarized in FIG. 21. The time elapsed for the deposition current on the RDE to reach 1 mA (1.27 $mA/cm^2$) is plotted against the applied potential for pH 9.5, 10.3 and 11.5 electrolytes containing 20 μmol/L $Bi^{3+}$. The increase of time to activate Au deposition on the RDE surface at more positive potentials in the pH 9.5 electrolyte is consistent with absence of deposition on the field of patterned features filled at potentials positive of −0.85 V. It also correlates with increased incubation time for bottom-up filling of patterned features at even more positive potentials; the activation time increases substantially at the more positive potentials used for filling of deeper trenches.

Figure 22:
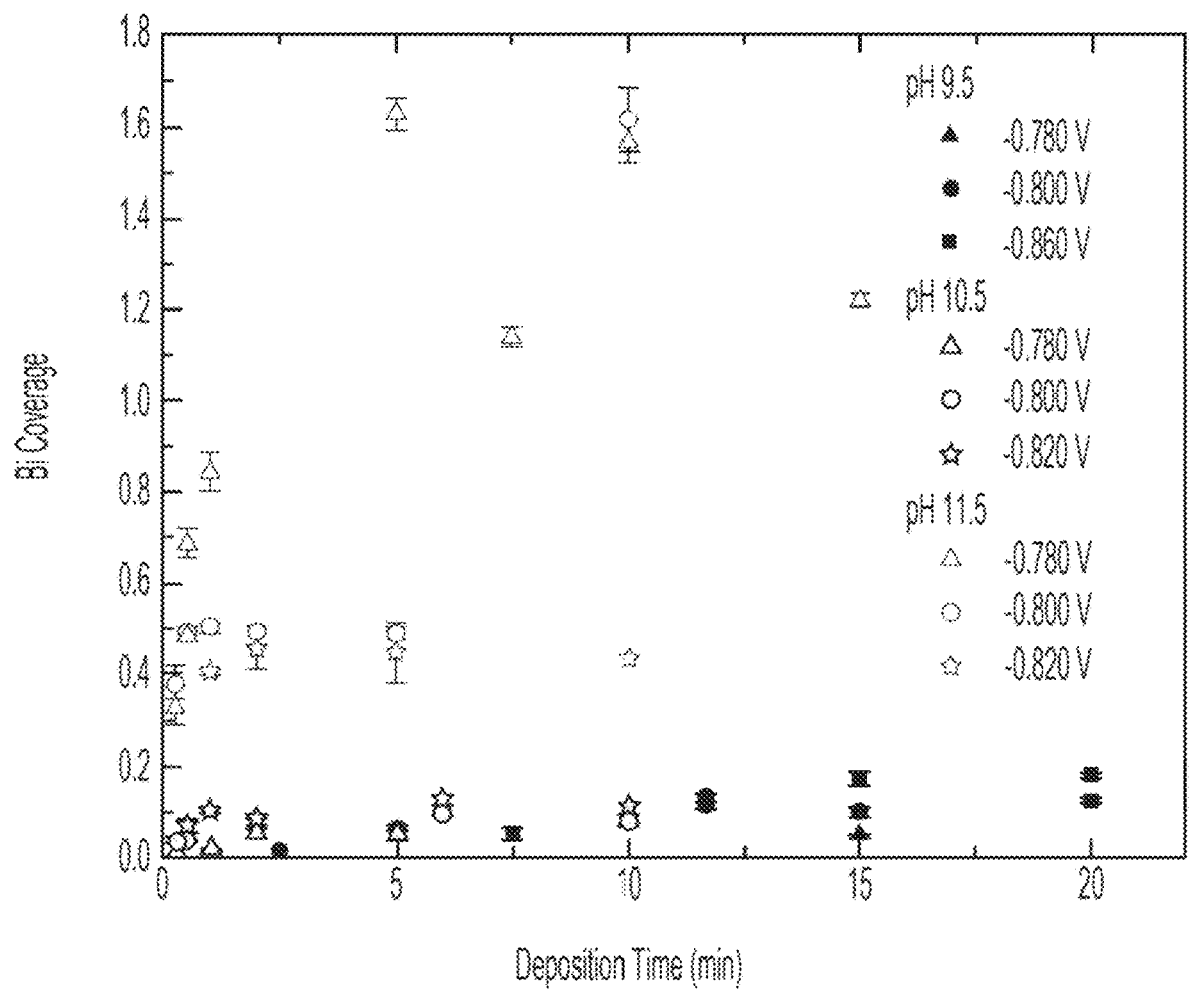
FIG. 22 shows bismuth coverage on the surface of Au electrodeposited on (111) textured Au thin films. Bi coverage obtained by XPS plotted against deposition time for the indicated applied potentials and electrolyte pH (data at −0.86 V for pH 9.5 from Ref. 2). Values include all oxidation states of Bi. Au deposition was in 80 mmol/L $Na_3Au(SO_3)_2$+0.64 mol/L $Na_2SO_3$ electrolytes containing 20 µmol/L $Bi^{3+}$ at a rotation rate of 100 RPM. Error bars indicate the standard deviation (1σ) of the data at the multiple positions examined on each specimen.

The temporal evolution of Bi adsorbate coverage during Au electrodeposition on planar Au surfaces as a function of applied potential and electrolyte pH at 100 RPM (200π rad/min) and fixed $Bi^{3+}$ concentration was quantified by XPS and is summarized in FIG. 22. For pH 9.5 a saturation coverage near 0.17 is approached after 15 minutes at −0.86 V with reduced coverage evident at more positive potentials. Similar coverages are observed in pH 10.5 although saturation occurs more rapidly, e.g., at values slightly greater than 0.1 at −0.82 V within 1 minute. For pH 11.5, saturation at both −0.80 V and −0.82 V is attained in the same time frame but with a much higher coverage near 0.4. Coverages in excess of a monolayer are observed at −0.78 V in the pH 11.5 electrolyte, as well as a single specimen at −0.80 V.

Figure 23:
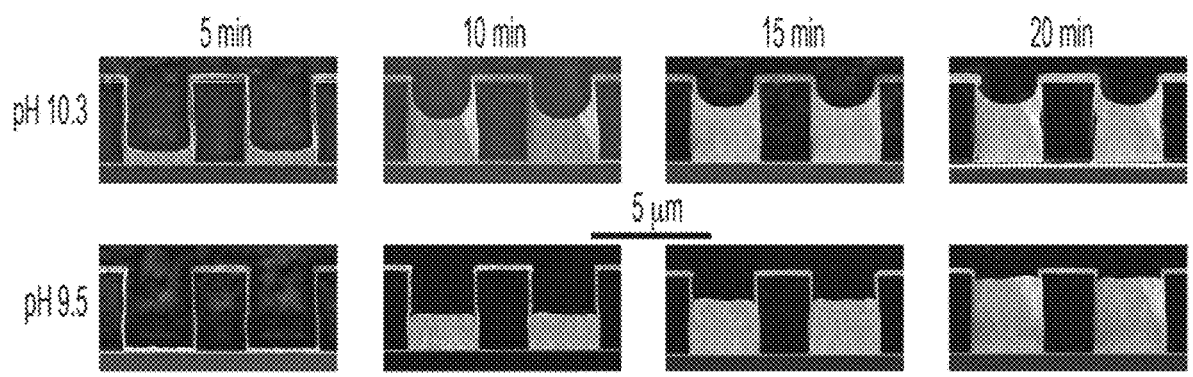
FIG. 23 shows scanning electron microscopy of Au electrodeposits in 3 µm deep, aspect ratio 1.2 trenches filled (upper images) at −0.80 V in electrolyte of pH 10.3 containing 20 µmol/L $Bi^{3+}$ and (lower image) at −0.90 V in electrolyte of pH 9.5 containing 4 µmol/L $Bi^{3+}$. Deposition times are indicated. All electrolytes 80 mmol/L $Na_3Au$ $(SO_3)_2$+0.64 mol/L $Na_2SO_3$ and rotation rates 400 RPM.

Filling of 3 μm deep trenches in the pH 10.3 electrolyte is shown in FIG. 23. Deposition initiates at the bottom, with upward growth yielding a concave hemicylindrical surface by 10 min that is followed by passivation of the growth front at some time between 10 min and 15 min for the conditions examined. Deposition occurs with reduced contact angle to the sidewalls, wherein the latter is shown in FIG. 23.

Figure 24:
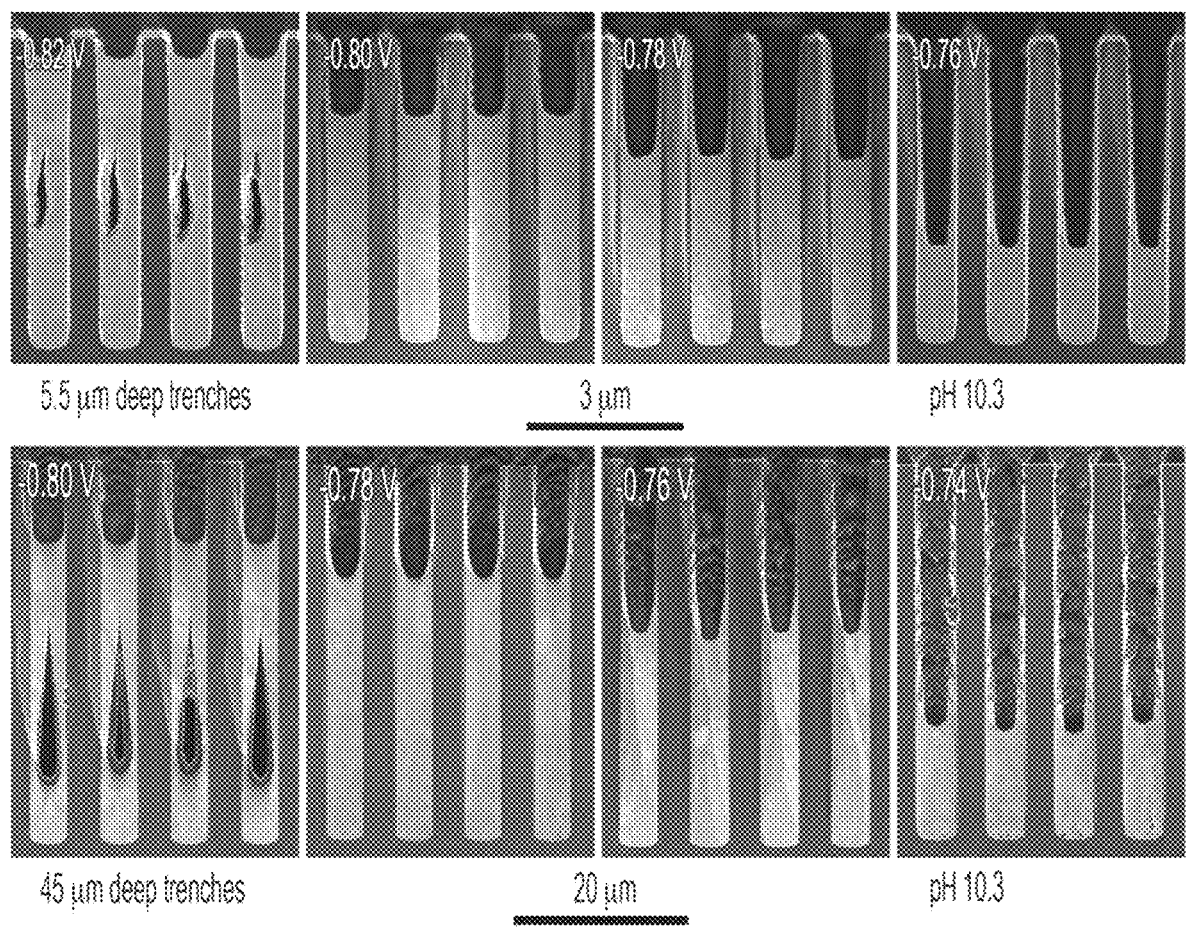
FIG. 24 shows scanning electron microscopy of Au electrodeposits in pH 10.3 electrolyte. Filling of 5.5 µm deep, high aspect ratio 8.5-9 trenches with increasing deposition time (20, 20, 30 and 60) min at more positive potential. Filling of 45 µm deep, aspect ratio 11 trenches with increasing deposition time (185, 205, 375 and 1100) min at more positive potential. Deposition potentials are indicated, all in 80 mmol/L $Na_3Au(SO_3)_2$+0.64 mol/L $Na_2SO_3$ electrolytes containing 20 µmol/L $Bi^{3+}$ at a rotation rate of 400 RPM.

The impact of applied potential on Au deposition in pH 10.3 electrolyte containing 20 μmol/L $Bi^{3+}$ is shown in both 5.5 μm and 45 μm deep trenches in FIG. 24. The chronoamperometric transients associated with the feature filling exhibit the incubation period prior to an increase of current upon the start of bottom-up filling and a decrease of current upon its self-termination. The location of the terminated growth front within the trench, influenced by trench size and electrolyte pH, is more recessed at more positive potentials. Truncated bottom-up filling in the pH 10.3 electrolyte observed at more negative potentials becomes void-free, bottom-up filling at more positive potentials, the change occurring at more positive potential in deeper trenches.

Figure 25:
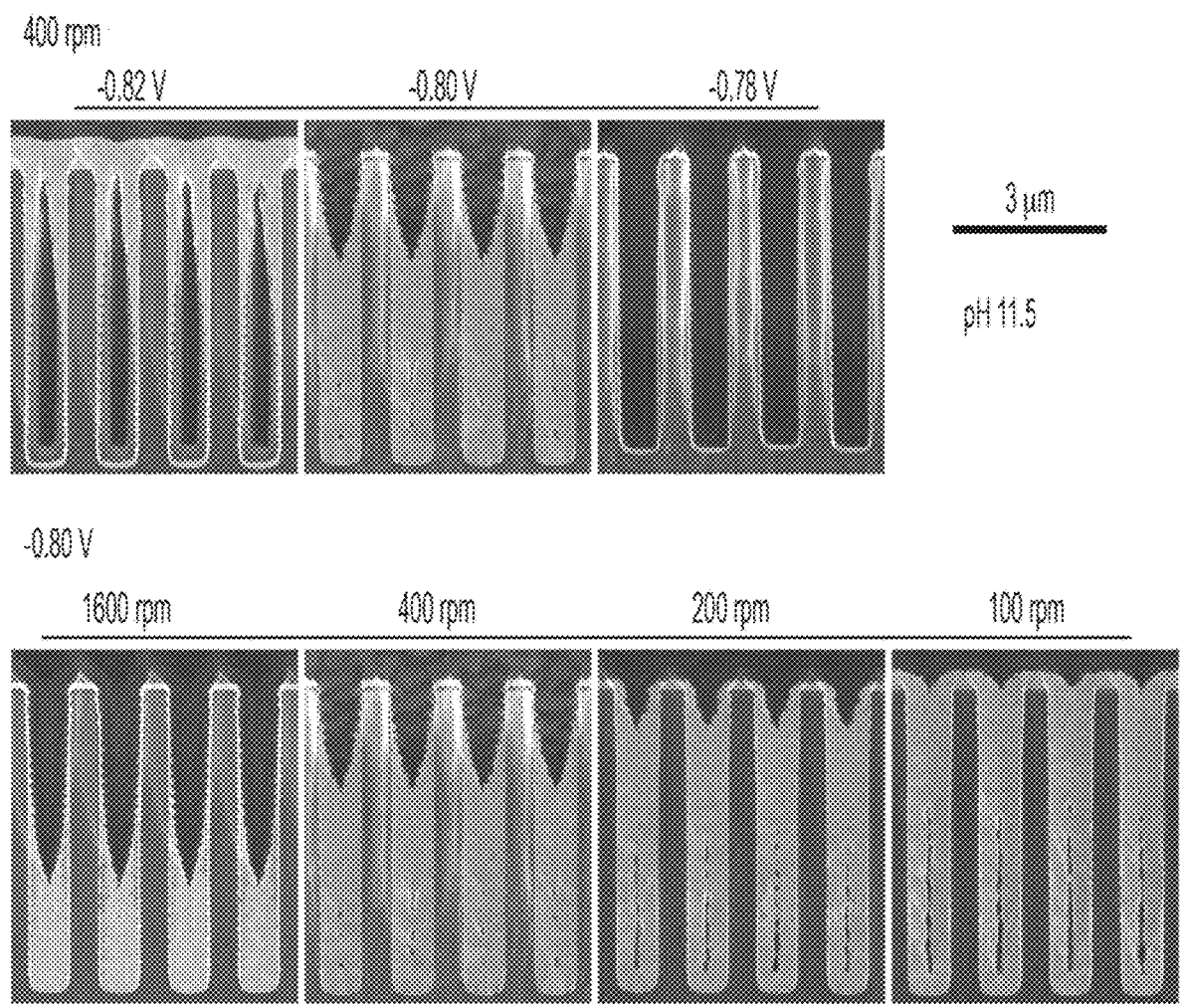
FIG. 25 shows scanning electron microscopy of Au electrodeposits in pH 11.5 electrolyte. Filling of 5.5 µm deep, aspect ratio 8.5-9 trenches at the indicated potentials and substrate rotation rates. All at 400 RPM with increasing deposition time (11, 60 and 165) min at more positive potential. Deposition times at −0.80 V are 60 min at all rotation rates. All in 80 mmol/L $Na_3Au(SO_3)_2$+0.64 mol/L $Na_2SO_3$ electrolyte containing 20 µmol/L $Bi^{3+}$.

The impact of potential as well as rotation rate on Au deposition in pH 11.5 electrolyte containing 20 μmol/L $Bi^{3+}$ is shown in 5.5 μm deep trenches in FIG. 25. The system transits from negligible deposition everywhere at −0.78 V to activation of the entire electrode surface at −0.82 V, with gross void formation in the trenches at the latter due to metal depletion manifest in the subconformal profile. While there is localization of deposition within the trench at −0.80 V, close inspection reveals voids along the centerline from conformal growth below the passive-active transition on the sidewall. Examination of filling at different RDE rotation rate reveals that the centerline voids might be minimized at higher rotation rates where the passive to active transition is more deeply recessed within the trenches. This suggests the possibility of dense feature filling using a controlled potential or current waveform to progressively advance the position of the sidewall transition. Of course, such a process is distinct from the inherently bottom-up filling observed at lower pH values. Furthermore, the deposits grown under these conditions contain significant porosity and exhibit substantial roughness that is not observed with the $Bi^{3+}$ containing pH 9.5 or pH 10.3 electrolytes.

Figure 26:
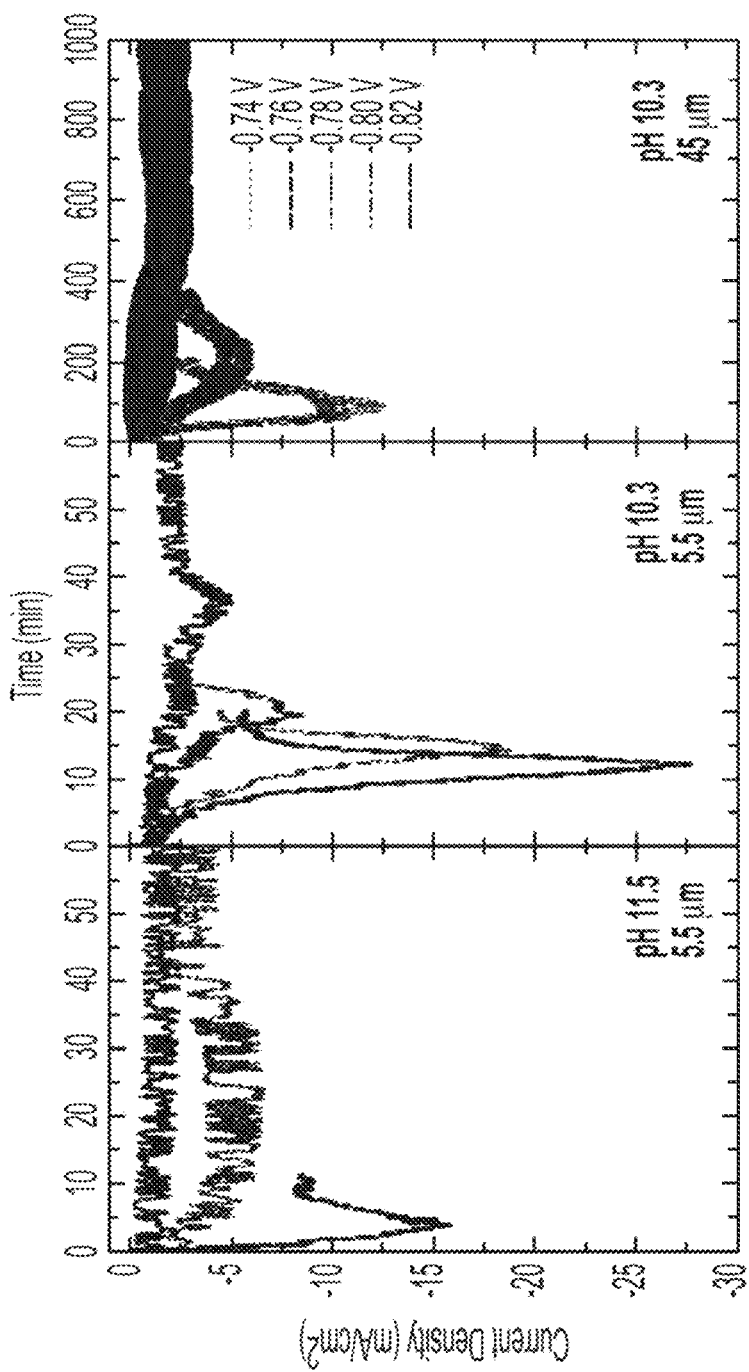
FIG. 26 shows current transients for Au deposition in 5.5 µm deep trenches in pH 10.3 and pH 11.5 electrolytes and 45 µm deep trenches in pH 10.3 electrolyte at the indicated applied potentials, corresponding to specimens shown in FIG. 24 and FIG. 25. All in 80 mmol/L $Na_3Au(SO_3)_2$+0.64 mol/L $Na_2SO_3$ electrolytes containing 20 µmol/L $Bi^{3+}$ at a rotation rate of 400 RPM.

The peaked current transients associated with the potential-dependent trench filling in FIG. 24 and FIG. 25 are shown in FIG. 26. At more positive potentials an initial incubation period precedes $Bi^{3+}$ adsorption that activates bottom-up Au deposition, the deposition current rising until deactivation of the adsorbate as the deposit approaches the passivated field brings it back to a low background level. In evaluating the small, nonzero currents observed after passivation of bottom-up filling caution is warranted due to uncertainty as to the contributions from deposition within the recessed slot in the Pt holder where the specimens are clamped. The absence of a steady state plateau during the period of active growth, seen during trench filling as well as chronoamperometric RDE experiments in pH 9.5 electrolyte, reflects the changing geometry of both nonplanar growth fronts and sidewall deposition during feature filling. Evolution of the active area is captured in FIG. 23 for pH 10.3 electrolyte and reflected in the final growth profiles in FIGS. 24 and 25. It contrasts with the time-independent profiles of growth in pH 9.5 electrolyte and also captured in FIG. 23. The decrease of deposition current due to self-passivation is nearly as steep as the rise associated with activation, suggestive of the uniformity that is observed across the trench arrays. The high fraction of the maximum current that remains after (voided) filling at −0.82 V in the pH 11.5 electrolyte corresponds to sustained active deposition on the field of the specimen that is visible in FIG. 25.

The incubation period during trench filling in pH 9.5 electrolytes is shorter in pH 10.3 electrolyte. Based on the current transients in FIG. 26 for the pH 10.3 electrolyte, less than 4 min pass before the onset of bottom-up deposition in the 5.5 μm deep trenches at −0.80 V whereas the shortest incubation time for void-free filling in pH 9.5 electrolyte was 15 min even at the more negative potential of −0.86 V. As a result, bottom-up filling of 5.5 μm deep trenches that takes approximately 40 min at −0.80 V in pH 9.5 electrolyte has already exceeded 4 μm height at 20 min in pH. 10.3 electrolyte at the same potential (FIG. 24) and likely reached this point even earlier based on when passivation occurred in the current transient in FIG. 26. Filling of the 45 μm deep trenches is also more rapid due to reduced incubation time, the deposit reaching the 30 μm height seen in FIG. 24 before 3.6 h −0.78 V (based on the current transient). In contrast, only 17 μm of Au was obtained after 4 h at the same potential in pH 9.5 electrolyte containing 24 μmol/L $Bi^{3+}$, and 34 μm was obtained only after 6 h at −0.80 V in pH 9.5 electrolyte containing 4 µmol/L $Bi^{3+}$. Even use of a two-step process of 1 h at −0.80 V then 3 h at −0.78 V to shorten the incubation period in the pH 9.5 electrolyte by nearly an hour yielded a fill height of 31 µm after a comparatively longer 4 h.

Deposition the pH 11.5 electrolyte at −0.83 V and −0.80 V exhibits no obvious incubation period. The deposition currents reflect the rapid initiation of Au deposition on the sidewalls as well as the trench bottoms.

Figure 27:
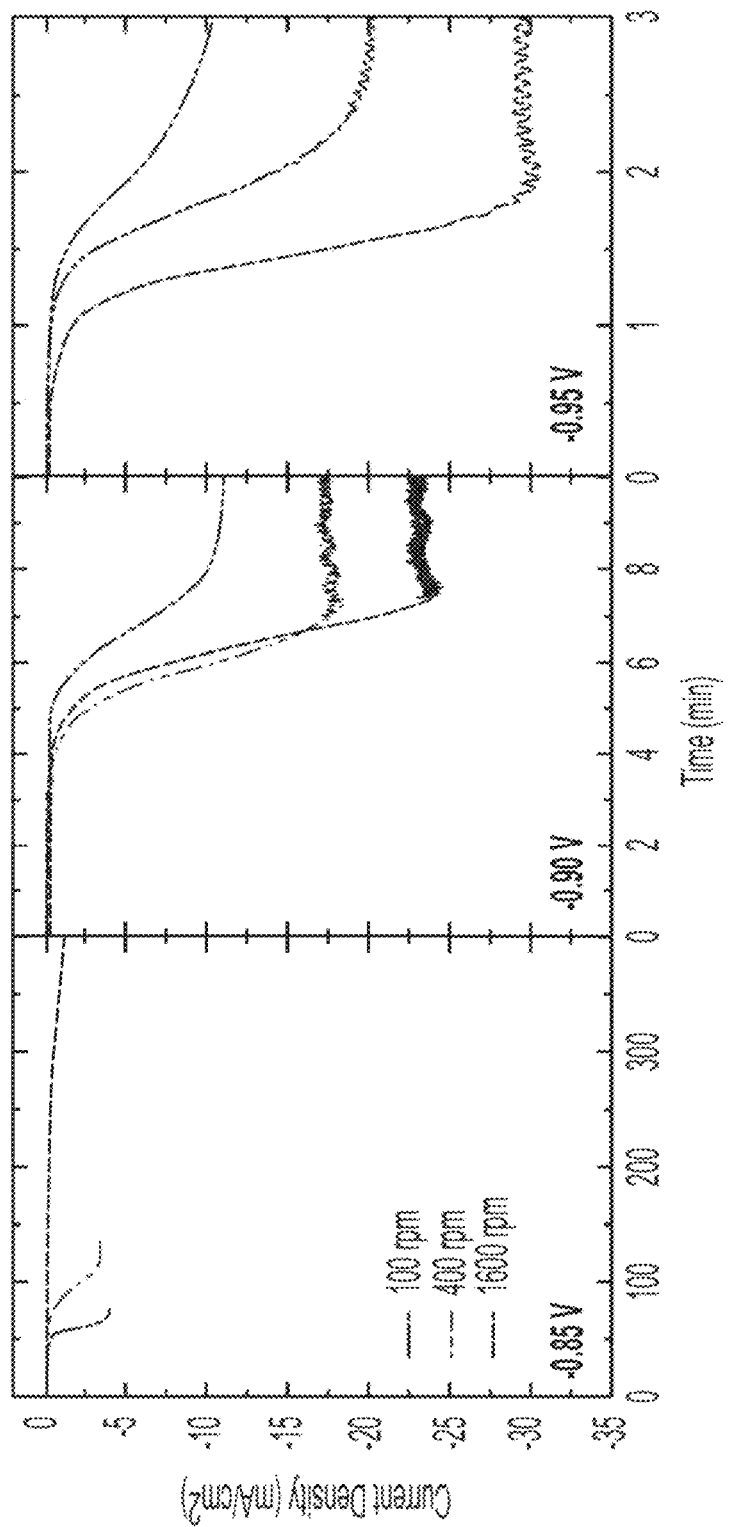
FIG. 27 shows chronoamperometry in electrolyte including 160 mmol/L $Na_3Au(SO_3)_2$+0.64 mol/L $Na_2SO_3$ of pH 9.5 containing 20 µmol/L $Bi^{3+}$ at the indicated applied potentials and RDE rotation rates. Current densities are obtained from measured current using the nominal RDE surface area of 0.79 cm$^2$. Data was acquired using software compensation for 90% of the measured 6Ω cell resistance with ≈0.6Ω of uncompensated cell resistance.

$Bi^{3+}$ additions to an electrolyte containing 160 mmol/L gold exert the same key effects observed with 80 mmol/L Au pH 9.5 electrolyte. The electrochemical signature includes the acceleration evident in, hysteretic voltammetry (FIG. 19b). It also includes the inverted dependence of acceleration of Au deposition on rotation rate at more positive potentials. As shown in FIG. 27 for electrolyte containing 20 µmol/L $Bi^{3+}$, acceleration at more negative potentials occurs more rapidly at higher rotation rates while the reverse is true at more positive potentials; thus, the time to reach the current plateau decreases with increased rotation rate at −0.9.5 V, is approximately independent of rotation rate at −0.90 V and increases with rotation rate at −0.85 V. The trend at −0.95 V is consistent with increased flux of $Bi^{3+}$ while the behavior at −0.85 V suggests that interface shearing somehow inhibits the additive adsorption process. As with lower Au concentration electrolytes, and in contrast to the higher pH electrolytes, potential and rotation rate clearly and substantially impact the incubation period of passive deposition that precedes activation of the RDE surface. The incubation period increases from 1 min, to 5 min and then to more than 50 min as the potential increases from −0.95 V, to −0.90 V and then to −0.85 V, increasing even further for higher rotation rate at the more positive potential. Both trends are consistent with previously measured slowing of adsorption at less negative potentials and higher rotation rates in the lower Au concentration electrolyte.

Figure 28:
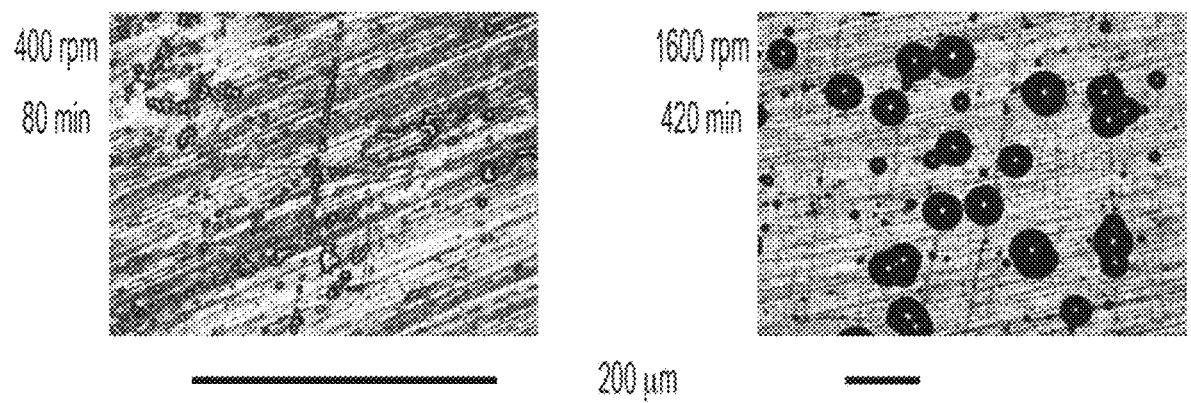
FIG. 28 shows optical microscopy of Au electrodeposits on the Au rotating disk electrode, polished to 1200 grit SiC paper after deposition, after deposition at −0.85 V in 160 mmol/L $Na_3Au(SO_3)_2$+0.64 mol/L $Na_2SO_3$ electrolyte of pH 9.5 containing 20 µmol/L $Bi^{3+}$ for the indicated deposition times and rotation rates.

Systems for Cu and Zn deposition that exhibit suppressor-based S-NDR in voltammetry along with localized bottom-up filling of features by the S-NDR mechanisms also exhibit bifurcation of planar electrode surfaces into zones of adsorbate-blocked inhibited deposition and adsorbate-free active deposition (Turing patterns). On topographically patterned surfaces the bifurcation manifests in active deposition in the locations most recessed from the field. The geometrical similarity of Au bottom-up filling to feature filling in the suppressor-based S-NDR systems suggests analogous bifurcation, albeit based on non-uniform distribution of adsorbed accelerator. An issue is whether bottom-up feature filling is connected with Turing pattern formation on planar electrodes. Such bifurcation of a planar Au RDE surface into active and passive zones during deposition at the −0.85 V potential exhibiting the inverted dependence of deposition rate on hydrodynamics (FIG. 27) is shown in images in FIG. 28, wherein localized regions of active deposition surrounded by passivated RDE surface exhibit the original surface polish. Rising current densities observed in cyclic voltammetry as well as amperometry after the incubation period, although based on the nominal RDE area, convolve increasing active surface area as well as any acceleration of deposition on activated regions. The shapes of observed transients thus reflect the geometry of nucleation and growth in addition to the Bi stimulation of deposition rate; and current densities defined using the ROE area are necessarily only lower bounds to actual local current densities. Although not shown here, this same observation and constraint apply to the 80 mmol/L Au electrolyte of pH 9.5 as well. The challenge is to understand how $Bi^{3+}$ selectively accumulates and accelerates the reaction at the most recessed surface features.

Figure 29:
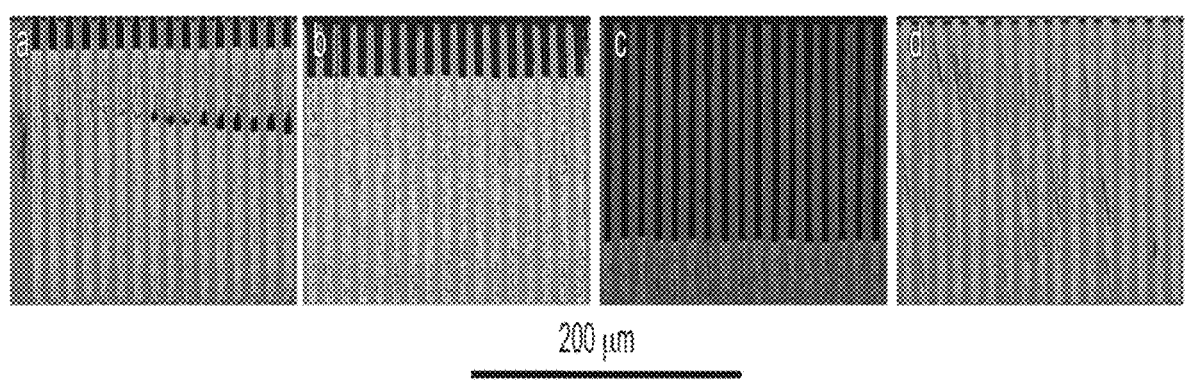
FIG. 29 shows optical microscopy of Au electrodeposits in 210 µm deep, aspect ratio 30 trenches filled at a) −0.75 V for 60 h and b) −0.75 V for 48 h 30 min in 80 mmol/L $Na_3Au(SO_3)_2$+0.64 mol/L $Na_2SO_3$ electrolyte of pH 9.5 containing 24 µmol/L $Bi^{3+}$. Trenches filled at c) −0.76 V for 20 h and d) −0.76 V for 62 h 15 min then −0.80 V for 4 h in 160 mmol/L $Na_3Au(SO_3)_2$+0.64 mol/L $Na_2SO_3$ electrolyte containing 10 µmol/L $Bi^{3+}$. Rotation rate: a) 100 RPM, b-d) 150 RPM. Dark spots and streaks on the Au are diamond grit pulled from the lapping papers by the Au deposit.

Bottom-up Au filling was examined in 210 µm deep trenches with an aspect ratio of 30 using both 80 mmol/L and 160 mmol/L Au electrolytes of pH 9.5. Lower rotation rates minimize deflection of the thin Si walls between the trenches, but 100 RPM yields increasingly large voids farther from the leading edge of the substrate (fluid flowing from left to right over the trenches in FIG. 29a) for the electrolyte with lower Au concentration. The increasingly deep and flat bottom of the void suggests retarding of the bottom-up filling achieved prior to activation of deposition on the upper sidewalls, which defines the uniform depth of the tear-drop shaped top of the void. A slight increase of the rotation rate to 150 RPM yields void-free filling across the substrate (FIG. 29b) although the depth of the self-passivation increases at higher rotation rate (FIGS. 29a and b) as seen with pH 11.5 electrolyte (FIG. 25) and previously documented in this pH 9.5 electrolyte. Filling in electrolyte with higher Au concentration (FIG. 29c,d) is qualitatively similar. Modest variations of deposit height in trenches imaged prior to passivation (FIG. 29c) indicate reasonably uniform incubation period and subsequent growth rate across the specimen. Full filling is achieved (FIG. 29d), given the potential dependence of the passivation depth, using potential stepping.

Figure 30:
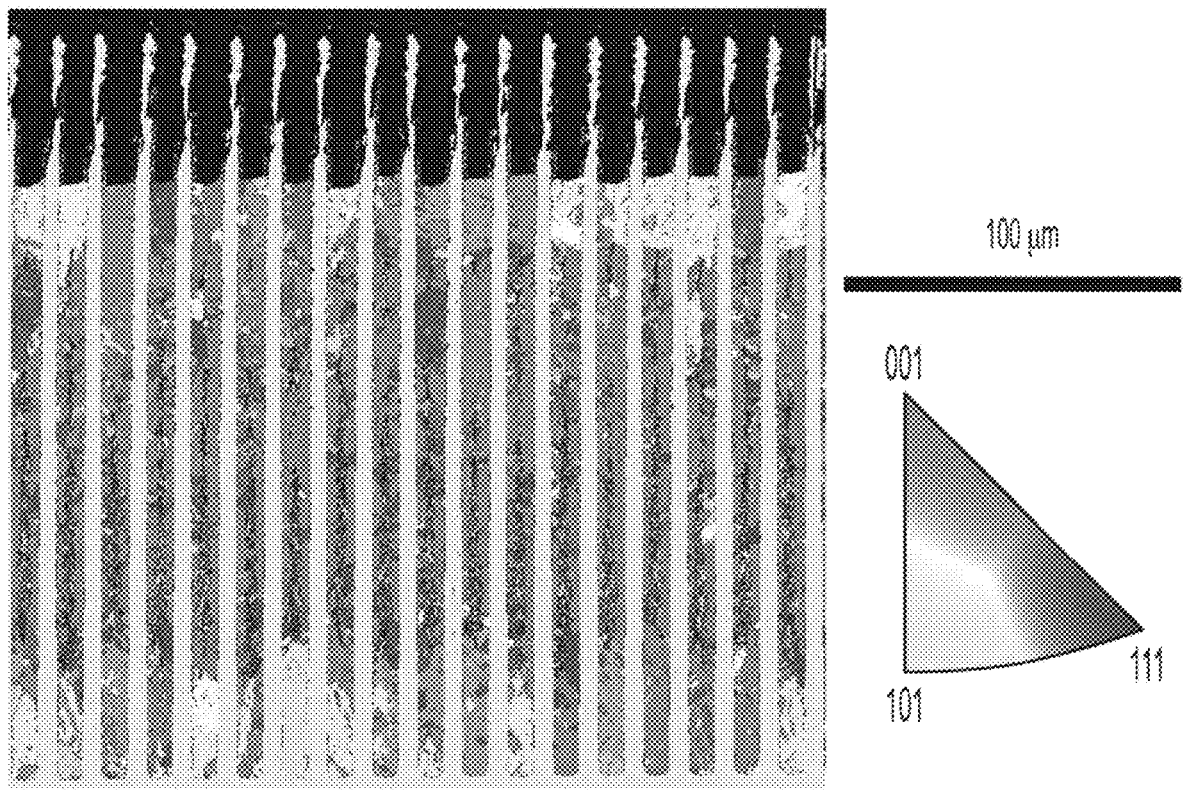
FIG. 30 shows electron backscatter diffraction (EBSD) map of Au electrodeposited at −0.75 V for 48 h 30 min in 210 µm deep, aspect ratio 30 trenches in 80 mmol/L $Na_3Au(SO_3)_2$+0.64 mol/L $Na_2SO_3$ electrolyte of pH 9.5 containing 24 µmol/L $Bi^{3+}$ showing grain orientation in the direction of the sidewall normal. Rotation rate was 150 RPM. Charging and specimen drift during the multiple hour acquisition of the map induce distortion. The black pixels in the fine-grained regions arise from failure to assign an orientation due to diffraction by multiple grains.

The microstructure of the Au deposits from pH 9.5 electrolyte in the high aspect ratio 210 µm deep trenches, was examined by EBSD. The grain size in these tallest Au features exhibits substantial spatial variations, both laterally and vertically, within the trenches. For deposition at a fixed applied potential of −0.75 V for 48 hours 30 min in an electrolyte containing 80 mmol/L gold salt and 24 µmol/L $Bi^{3+}$, the bottom-up growth exhibits grains that are substantially taller than the trench widths for the bottom quarter of the filled region as shown in FIG. 30. This transitions to a much finer grained structure followed by the development of highly extended grains immediately adjacent to the sidewalls. These elongated grains have a strong (100) texture normal to the sidewalls. Between them, the centers of the trenches are marked by much smaller grains, a subset of which are not resolved by EBSD as annotated by a peppering of small black regions within the map. Higher up the microstructure transitions back to grains that span the trench widths and have heights that frequently exceed it. The grain structure is dispersed relative to the bottom-up motion of the growth front during its formation. Interpretation of the observed microstructures requires knowledge of what portion of the mapped structure corresponds to the as-deposited state versus post-deposition grain growth or recrystallization during specimen preparation or aging.

Figure 31:
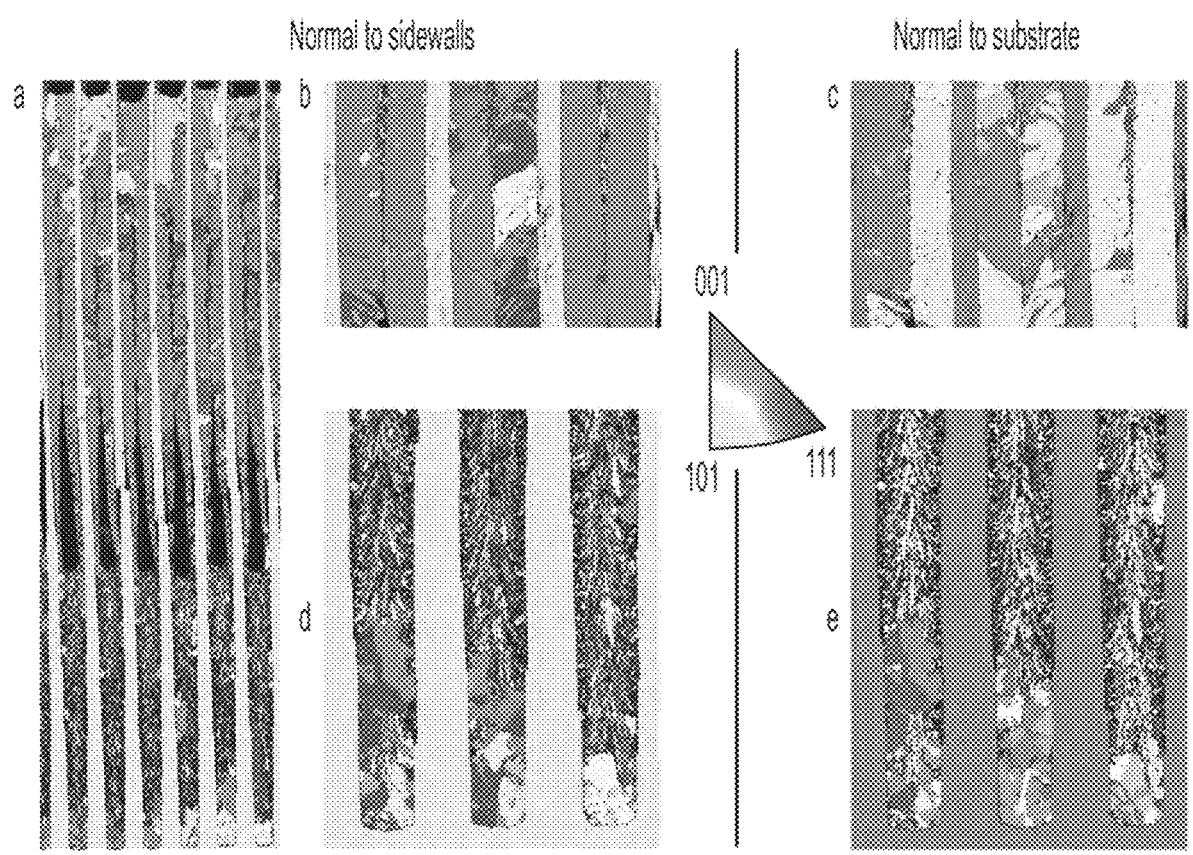
FIG. 31 shows EBSD maps of Au electrodeposited at −0.76 V for 60 h 45 min in 210 µm deep, aspect ratio 30 trenches in 160 mmol/L $Na_3Au(SO_3)_2$+0.64 mol/L $Na_2SO_3$ electrolyte of pH 9.5 containing 20 µmol/L $Bi^{3+}$. a) Grain orientation in the direction of the sidewall normal. The large black region in the center of the trenches is a void (i.e., nothing to diffract). Higher resolution maps of d,e) the lower and b,c) upper regions showing grain orientation in the direction of the sidewall normal and substrate normal as indicated. The (001) Si wafer is patterned with both the trenches and their sidewall normals along <110> directions. Rotation rate was 150 RPM. Charging and specimen drift during the multiple hour acquisition of each map induce distortion. The black pixels in the fine-grained regions arise from failure to assign an orientation due to diffraction by multiple grains.

The microstructure in trenches filled for 60 h 45 min at a similar applied potential of −0.76 V in electrolyte containing moderately lower 20 µmol/L $Bi^{3+}$ but double the Au salt concentration exhibits some notable differences (FIG. 31). The bottoms of the trenches are filled with large grains, but this structure persists for only a few tens of micrometers up the features as shown higher resolution maps of the texture in the directions of both the sidewall normal (FIG. 31d) and substrate normal (FIG. 31e). The large grains are succeeded by a much finer grained, feathered microstructure where the direction of the elongated major axis of the grains and symmetric disposition around the centerline are suggestive of a v-notched growth front like that seen previously in the filling of 45 deep trenches. The feathered structure in each trench ends abruptly approximately one third of the way up at the base of a triangular void whose shape is consistent with a previously observed truncated bottom-up filling mode in which void formation occurs following the breakout of metal deposition on the upper sidewalls. The reentrant shape of the void is congruent with depletion of the $Au(SO_3)_2^{3-}$ caused by the thickening deposits; the very strong <100> texture along the growth normal of the resulting deposits, both adjacent to and above the void, is evident (FIG. 31a). Above the voided region, where grains on the opposing sidewalls impinge, the centerline is decorated by a dispersion of fine-grained material. At some points along the trench centerline the opposing sidewall grains bridge to form trench-spanning grains with a <100> texture normal to both the trench sidewalls, FIG. 31b, and the substrate normal (i.e., normal to the trench bottom), FIG. 31c. In other locations the deposits have <100> texture in the direction of the sidewall normal but the grains on opposing surfaces are rotated about this axis relative to each other yielding different orientations along the substrate normal direction. These yield bridging of two grains without a grain boundary or a grain boundary along the mid-line, respectively.

Figure 32:
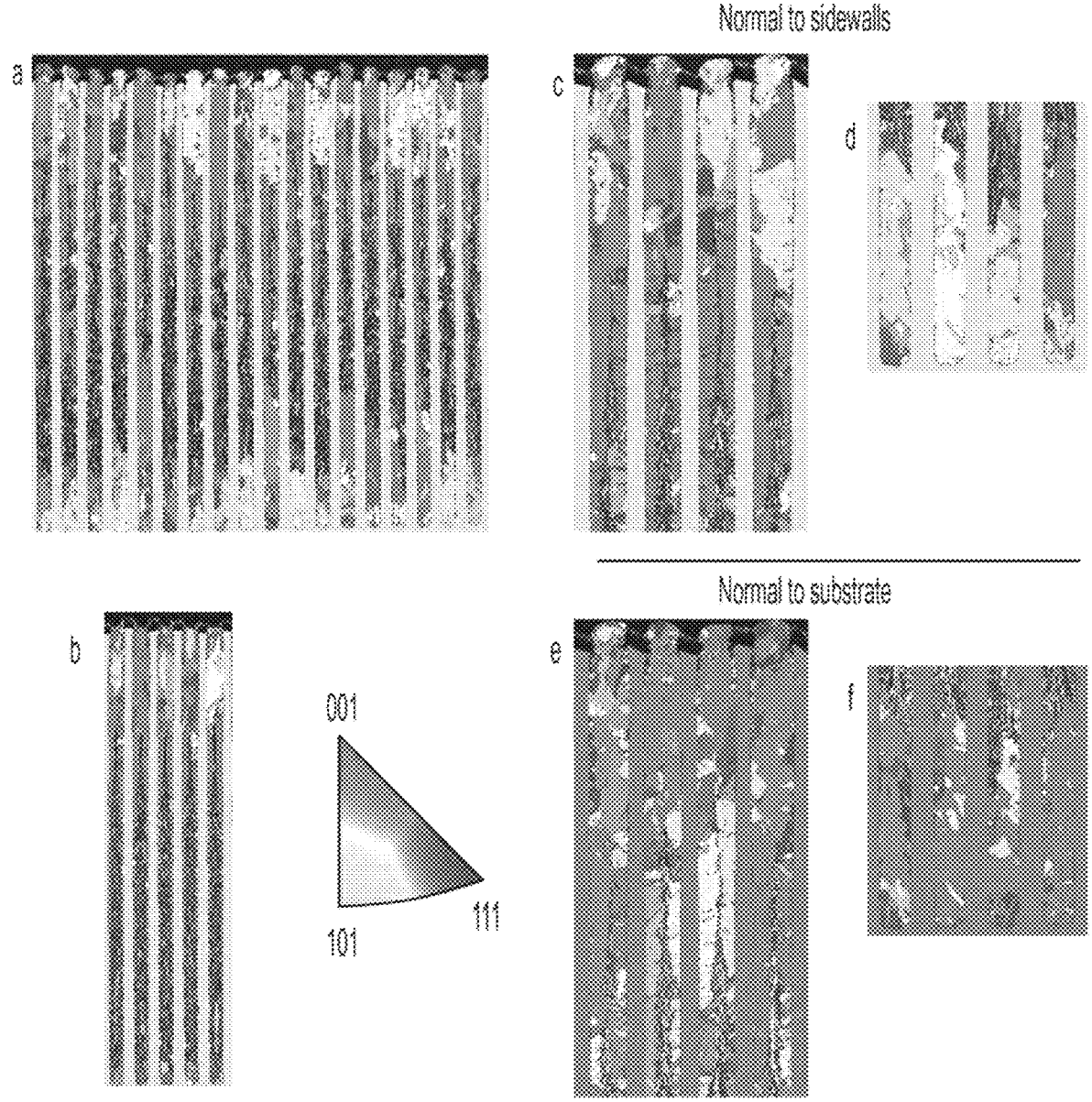
FIG. 32 shows EBSD maps of Au electrodeposits in 210 µm deep, aspect ratio 30 trenches filled at a,c-f) −0.76 V for 47 h 10 min, followed by 3 h at −0.77 V, −0.78 V and finally −0.79 V in 80 mmol/L $Na_3Au(SO_3)_2$+0.64 mol/L $Na_2SO_3$ electrolyte of pH 9.5 containing 20 µmol/L $Bi^{3+}$ and b) 60 h 15 min at −0.76 V then 4 h at −0.80 V in 160 mmol/L $Na_3Au(SO_3)_2$+0.64 mol/L $Na_2SO_3$ electrolyte of pH 9.5 containing 10 µmol/L $Bi^{3+}$. The higher resolution maps of the upper and lower regions of a) show grain orientations in the direction of c,d) the sidewall normal and e,f) substrate normal. The (001) Si wafer is patterned with both the trenches and their sidewall normals along <110> directions. Charging and specimen drift during the multiple hour acquisition of each map induce distortion. Black pixels in the fine-grained regions indicate failure to assign an orientation because more than one grain is diffracting.

Void-free bottom up filling of 210-μm deep trenches in the more concentrated gold salt electrolyte can be obtained by progressively advancing the applied potential during electrodeposition. Two examples of filled trench arrays are shown in FIGS. 32a and 32b. For two step deposition of 62 h 15 min at −0.76 V followed by 4 h at −0.80 V in an electrolyte containing 10 μmol/L $Bi^{3+}$ (FIG. 32b), all but the very bottom of the lower half of the trenches exhibits fine-grained feathered microstructure. Higher in the trenches, extended thin regions of <100> textured grains along the sidewalls become more obvious as the grains thicken higher up. A thin seam of fine-grained materials marks the centerline in this region. In the top quarter larger grains having a variety of orientations span the widths of the trenches. Based on the filling in FIG. 30 (albeit for lower gold concentration electrolyte), it is likely that all but the uppermost 30 μm or 40 μm was filled during the 62 h 15 min step at −0.76 V, leaving only the uppermost large grained region associated with growth during the 4 h step at −0.80 V. Filling obtained using multiple potential steps is shown in FIG. 32a. The deposition at −0.76 V for 47 h 10 min followed by 3 h at −0.77 V, −0.78 V and −0.79 V results in a microstructure very similar to that observed with the two potential steps. Higher resolution maps of the lower region are shown in FIG. 32d,f and of the upper region in FIG. 32c,e. The grains in the lower region span the trench widths and reach several tens of micrometers up from the trench bottoms. Above this region the trench core is filled with fine grained feathered structure. Moving upward in the trenches, elongated grains having <100> texture in the direction of the sidewall normal develop along the sidewalls, becoming thicker with height, leaving a narrowing patch of fine grain material along the centerline. The uppermost region of each trench is, once again, filled with large grains that span the width and exhibit a variety of orientations.

The initial step at −0.76 V accounts for a significant fraction of deposition from the bottom of the trenches in both FIG. 32a and FIG. 32b. The fine-grained structures seen in both are suggestive of as-deposited materials. The larger grained regions suggest recrystallization.

Figure 33:
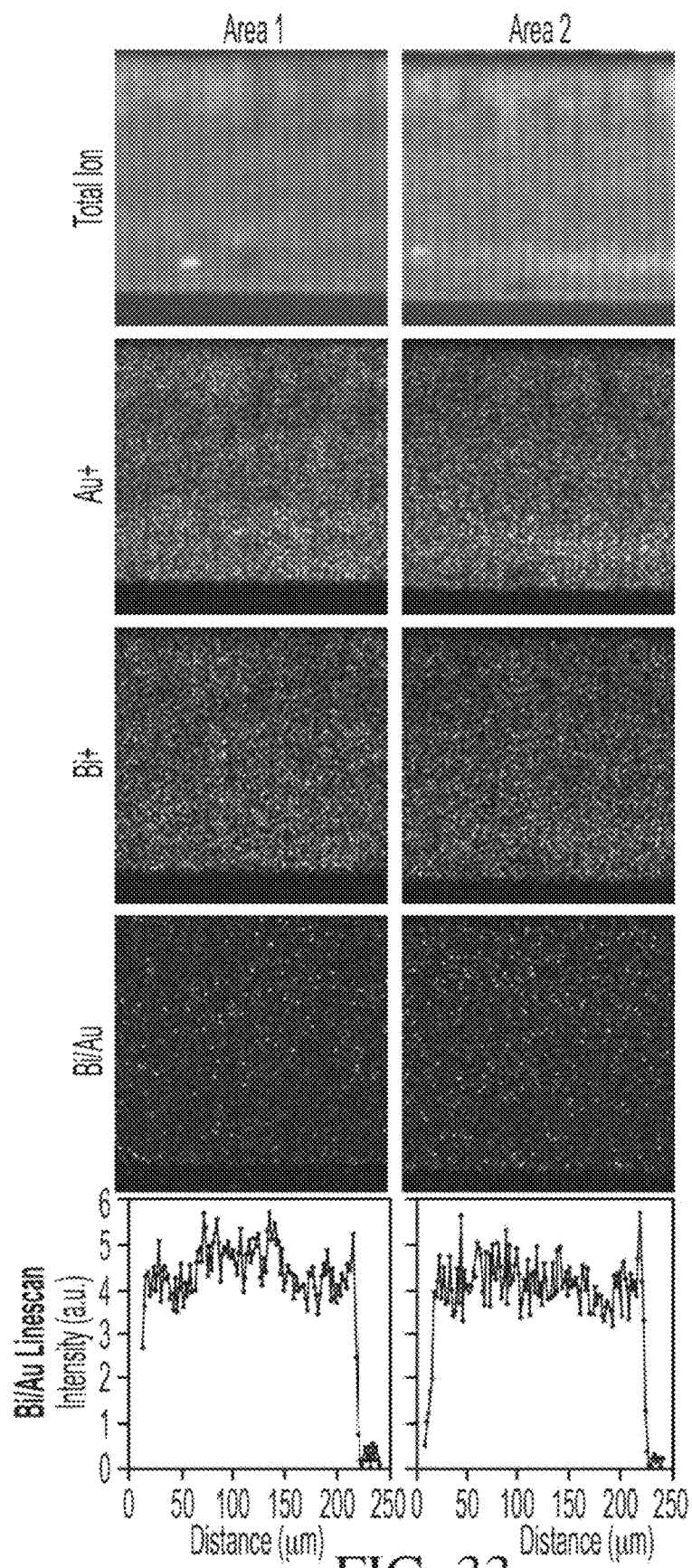
FIG. 33 shows positive polarity secondary ion mass spectroscopy (SIMS) maps of Au and Bi concentrations (arbitrary units) for 210 µm deep, aspect ratio 30 trench array filled in 160 mmol/L $Na_3Au(SO_3)_2$+0.64 mol/L $Na_2SO_3$ electrolyte of 9.5 containing 10 µmol/L $Bi^{3+}$ at −0.76 V for 60 h 15 min then at −0.80 V for 4 h, all at a rotation rate of 150 RPM. The maps show the distribution of total ion, $Au^+$, and $Bi^+$ obtained over the cross-sectioned, Au-filled trenches in two different locations. The maps are each (256×256 pixels over (250×250) µm$^2$, acquired over 200 scans. The Bi/Au maps give the ratio of the $Bi^+$ signal normalized to the $Au^+$ signal, with the corresponding line scan integrated across the 256-pixel width as a function of distance from the top (i.e., the specimen surface). Analysis was performed after 100 scans of sputter cleaning.

SIMS was used to map the distribution of Bi within the filled trenches of the specimen shown in FIG. 32a. Secondary ion maps reveal the individual Au filled trenches as total ion images, with $Au^+$ and $Bi^+$ maps, as well as their ratio, also shown in FIG. 33. The $Bi^+/Au^+$ normalized images indicate qualitatively that the Bi is uniformly distributed within the deposits. The approximately uniform Bi concentration throughout the trench depth indicated by the line scans suggests Bi incorporation at a rate defined by kinetics at the interface of the actively growing Au deposit.

Lowering of the contact angle where the advancing deposit meets the sidewall achieved using higher (10.3) pH electrolyte is significant. Coupled with the less abrupt transition from passive to active deposition along the sidewalls manifest in the concave profiles of the bottom-up filling Au deposits (FIG. 24) this might be expected to yield improved structural performance. An analogous, albeit much smaller, increase of deposition rate on the sidewalls farther from the trench opening in pH 9.5 electrolyte manifests in a V-shaped profile during filling of 17 μm tall trenches. Indeed, the thin, angled grains (FIG. 31d,e) as well as the larger grains with 100 texture along the sidewall normal in the bottom-up filled 210 μm deep trenches suggest that sidewall activation at/near the upward moving growth front is a component of the bottom-up filling in pH 9.5 electrolyte as well. The impact of pH on the $Bi^{3+}$ adsorption kinetics is also substantial, but whether this has implications for the bottom-up filling mechanism itself is not determined.

Figure 34:
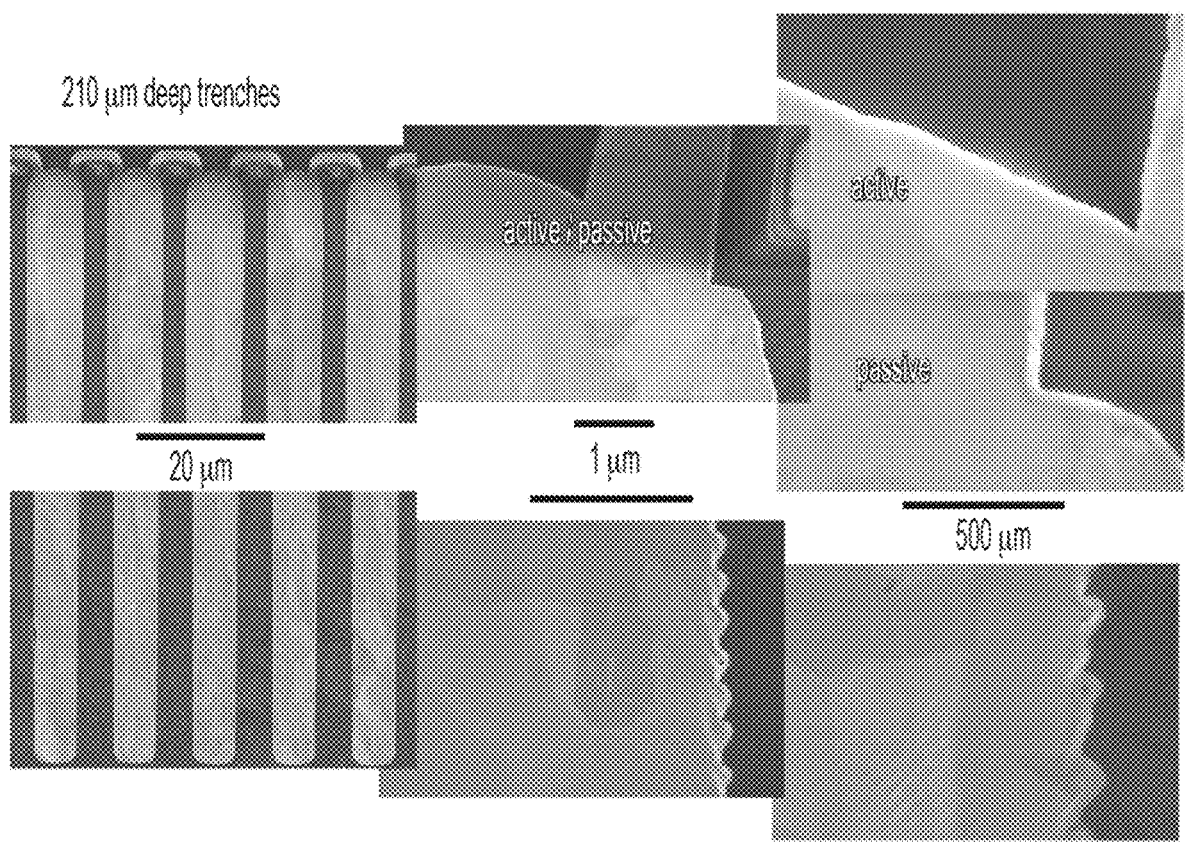
FIG. 34 shows scanning electron microscopy of Au electrodeposit in 210 µm deep, aspect ratio 30 trenches filled at −0.76 V for 60 h 10 min then 4 h at −0.80 V in 160 mmol/L $Na_3Au(SO_3)_2$+0.64 mol/L $Na_2SO_3$ electrolyte of pH 9.5 containing 10 µmol/L $Bi^{3+}$ at rotation rate of 150 RPM. Progressively higher magnification images to the right of the upper and lower filled regions capture pores located principally in trench fabrication-related convolutions in the sidewalls.

EBSD maps show regions with high densities of grain boundaries, and complete bottom-up filling yields voids that are visible at highest magnifications and within convolutions of the sidewall associated with the Bosch etching (FIG. 34). Bottom up filling couples the shift to taller features having decreased transport limited fluxes with a shift to less negative potentials having slower deposition kinetics.

An empirical formulation that accounts for bottom and sidewall deposition rates as well as the impact of sidewall growth during the incubation period provides estimation of fillable feature height. This formulation provides an estimate of the maximum aspect ratio of trenches that might be filled without sidewall-impingement given by $$\frac{h}{w} = \frac{v_b}{2v_s}\left(1 - \frac{2t_i v_s}{w}\right) \quad (1)$$

where the sidewall and bottom-up growth rates are $v_s$ and $v_b$, respectively, the trench width and height are w and h, respectively, and the incubation period prior to the start of bottom-up filling is $t_i$. Values for the bottom up growth rate and sidewall growth rate are in the range $v_b \approx (6.5$ to $75)$ μm/h (1.8 to 2.1) nm/s) and $v_s \approx 0.13$ μm/h, although deposition on the sidewalls adjacent to the field yields a much lower value of $v_s \approx 0.025$ μm/h (0.007 nm/s).

With no incubation period the highest aspect ratio trench that can be bottom-up filled with $v_b \approx 7.5$ μm/h and $v_s \approx 0.13$ μm/h is found to be 29. Inclusion of a nonzero incubation period lowers the value. That bottom-up filling is so easily attained here in trenches of aspect ratio 30 highlights the significance of the noted gradient of deposition rate on the sidewalls. Were one to use the growth rates observed on the field and uppermost region of the sidewalls for $v_s$ in Eq. 1 the maximum fillable aspect ratio reaches or exceeds 200.

Example 2. Accelerated Bottom-Up Gold Superconformal Filling of Trenches

Bismuth is one of several p-block heavy metals whose adsorption lifts suppression intrinsic to both cyanide and sulfite electrolytes and permit the fabrication of smooth, bright Au films.

Bi-based bottom-up Au filling fills trenches up to 45 μm deep with aspect ratio 11. Both potential and current control modalities are examined with an eye towards optimizing the filling process by shortening the incubation time prior to the onset of bottom-up filling. Fluid flow defined by the rotation rate of the substrates within the electrolyte is maintained at levels that passivate the field of the patterned wafers.

The gratings used for the study of feature filling were patterned on (100) oriented silicon wafers using an i-line projection lithography system. The patterned wafers were etched to the stated depths using a Bosch process. The trenches have a conformal 10 nm thick alumina film as a nucleation layer for a conformal 50 nm platinum (Pt) seed, both deposited by atomic layer deposition (ALD) and uniformly covering all surfaces. An additional Au layer for improved electrical conduction, with a thin titanium (Ti) adhesion layer, was deposited on the Pt layer using line-of-sight electron beam evaporated metal sources with the flux at normal incidence to the wafers. Layer thicknesses on the field and bottoms of the 45 μm trenches are 15 nm Ti and 150 nm Au. Layer thicknesses on the field and bottoms of the 17 μm trenches are 24 nm Ti and 120 nm Au. Coverage on the Pt-coated sidewalls is minimal in both cases.

Depositions and voltammetry were conducted in a cell containing 40 mL of 80 mmol/L $Na_3Au(SO_3)_2$ from Technic TG-25 concentrate with 0.64 mol/L $Na_2SO_3$ in 18 MΩ·cm. Dilute $Bi^{3+}$ was introduced by anodic dissolution of 99.999% Bi metal, the possibility of parasitic processes and dependence on the surface area of the charge used making the stated $Bi^{3+}$ concentrations upper bounds. Voltages are relative to a $Hg/Hg_2SO_4$/saturated $K_2SO_4$ reference electrode (SSE). Feature filling was studied using 3 mm×11 mm pieces of patterned silicon wafers that were rotated about one end from a Pt spindle during deposition and subsequently cross-sectioned for examination.

A field emission scanning electron microscope (SEM) was used to image the cross-sectioned, Au-filled features. A microscope equipped with an electron backscatter imaging camera characterized grain size and orientation within them using electron backscatter diffraction (EBSD). The surfaces to be mapped were tilted 70° from the electron beam in the direction of the EBSD camera, the acquisition software automatically correcting for associated foreshortening. The texture maps were obtained using 15 keV accelerating voltage, 2.8 nA beam current and step size of 0.0625 μm.

The surface composition of Au electrodeposits on Au-coated, polished Si substrates for quantification of adsorbed Bi coverage was determined using x-ray photoelectron spectroscopy (XPS).

Figure 35:
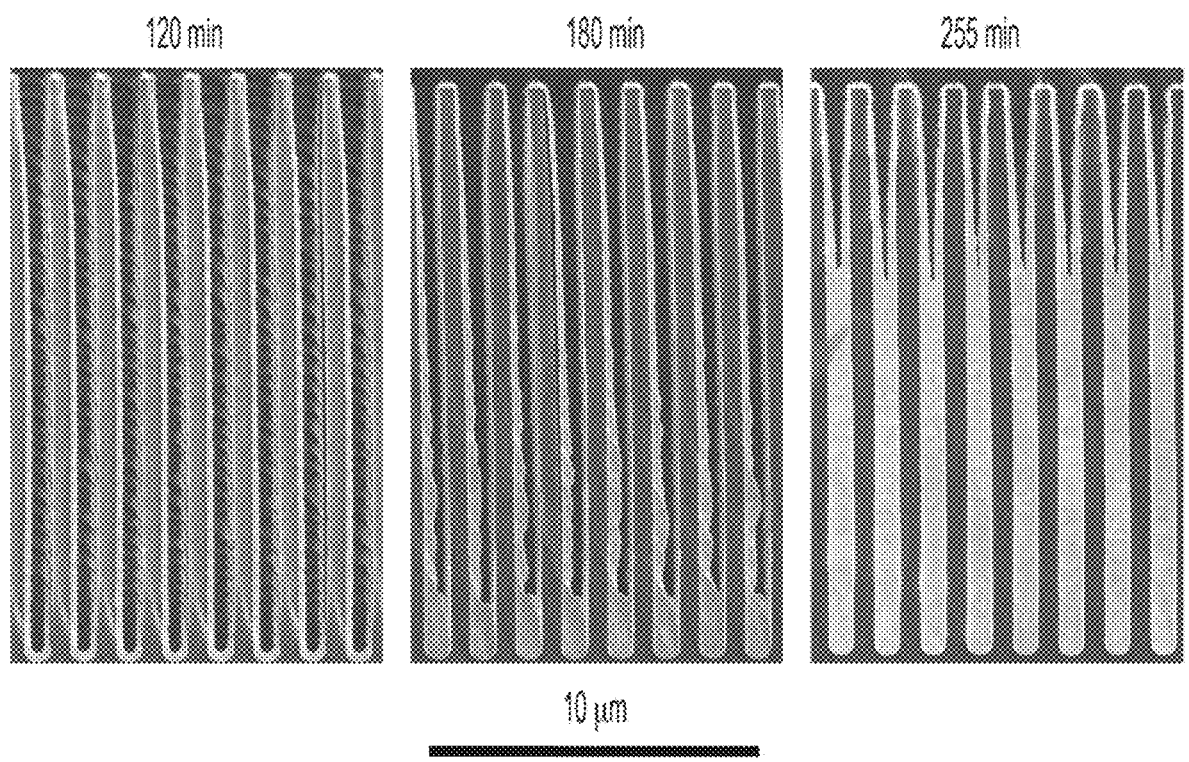
FIG. 35 shows SEM images of Au electrodeposits in 17 µm deep trenches after the indicated deposition times at −0.82 V. All in 80 mmol/L $Na_3Au(SO_3)_2$+0.64 mol/L $Na_2SO_3$ electrolyte containing 4 µmol/L $Bi^{3+}$ rotating at 400 RPM (800π rad/s). Tilting of trenches arises during epoxy infiltration and setting.
Figure 36:
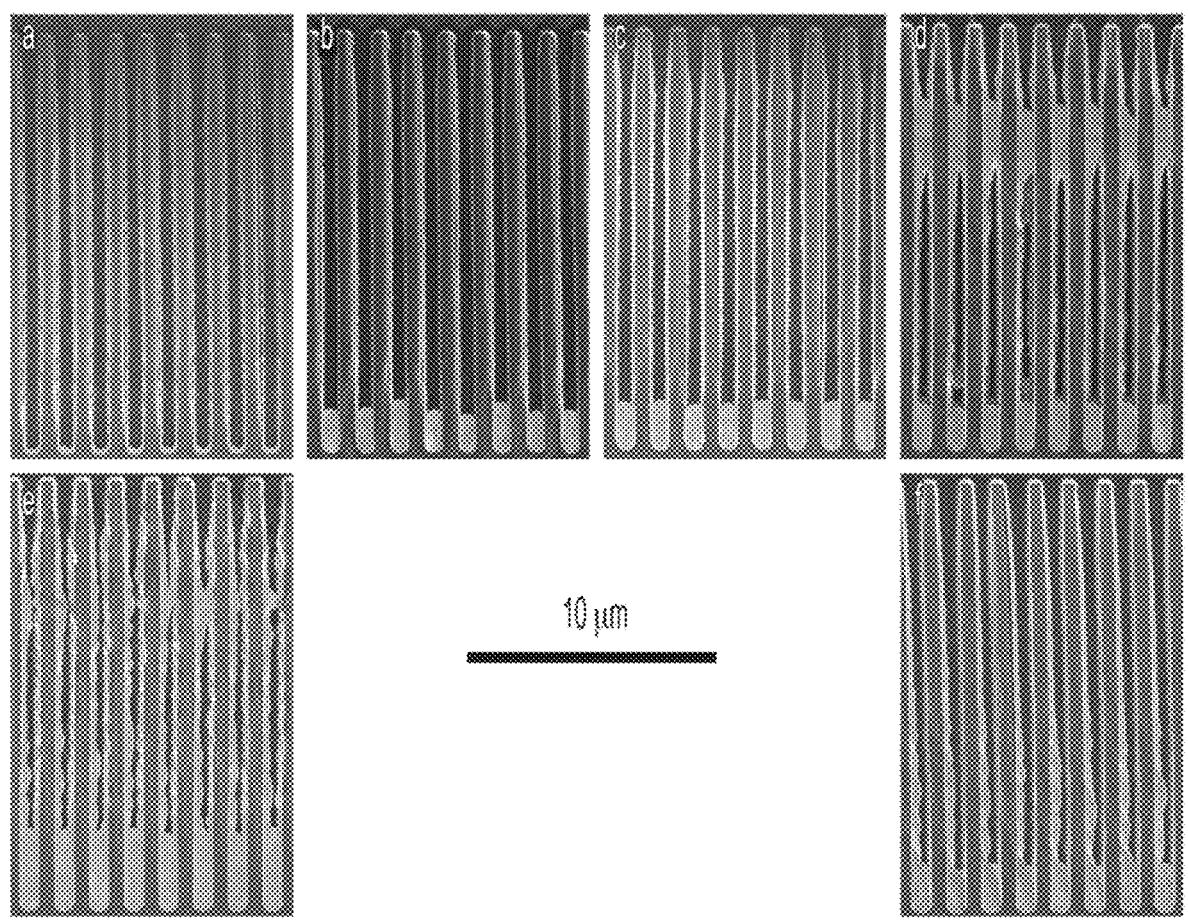
FIG. 36 shows SEM images of Au electrodeposits in 17 µm deep trenches after a) 120 min at −0.82, b) 20 min, c) 25 min and d) 35 min at −0.86 V followed by 90 min at −0.82 V, e) 20 min at −0.86 V followed by 150 min at −0.82 V, and f) 180 min at −0.82 V. All in 80 mmol/L $Na_3Au(SO_3)_2$+0.64 mol/L $Na_2SO_3$ electrolyte containing 4 µmol/L $Bi^{3+}$ rotating at 400 RPM (800π rad/s). Tilting of trenches arises during epoxy infiltration and setting.

Gold deposition in 17 μm deep trenches is shown in FIG. 35. Deposition is uniform and only ≈0.1 μm thick after 120 min at −0.82 V in electrolyte containing 4 μmol/L $Bi^{3+}$. This is consistent with passive deposition and the noted incubation period at this potential. Upon extension of the deposition to 180 min, bottom-up filling occurs with uniform deposition in the upper half of the trenches and enhanced deposition toward the bottom. Continuing to 255 min superconformally fills trenches with a V-notch growth front that has advanced approximately two-thirds of the way up from the trench bottom with no obvious voids, To reduce the incubation period prior to inception of bottom-up filling while avoiding void formation that occurs at more negative potentials, activation at −0.86 V was followed by a potential step to −0.82 V for continued deposition. With the filling obtained following 120 min at −0.82 V shown again in FIG. 36a for reference, it is seen that starting with the activation treatment results in ≈2 μm of bottom-up Au filling in trenches held for 20 min (FIG. 36b), 25 min (FIG. 36c) or 35 min (FIG. 36d) at −0.86 V followed by 90 min at −0.82 V. The shortest activation time corresponds to the incubation period for bottom-up deposition at −0.86 V. The activation treatment of 25 min yields visible deposition on the specimen sidewalls (FIG. 36c) resulting in a slight retrograde slope, the 35 min hold (FIG. 36d) resulting in break-out of more extensive deposition on the upper sidewall that leads to collision of the opposing sidewalls and void formation in the lower section of the trench; this filling profile has previously been classified as truncated bottom-up filling. The 20 min hold leaves no obvious sidewall build-up (FIG. 36b). However, upon more extended deposition of 150 min at −0.82 V, extensive sidewall deposition and incipient pinch off are evident (FIG. 36e). Absent the activation step at −0.86 V, bottom-up deposition at −0.82 V only begins beyond 120 min, reaching ≈2 μm height only at 180 min (FIG. 36f). Further optimization of the activation procedure can occur for accelerated filling by potentiodynamic operation.

Figure 37:
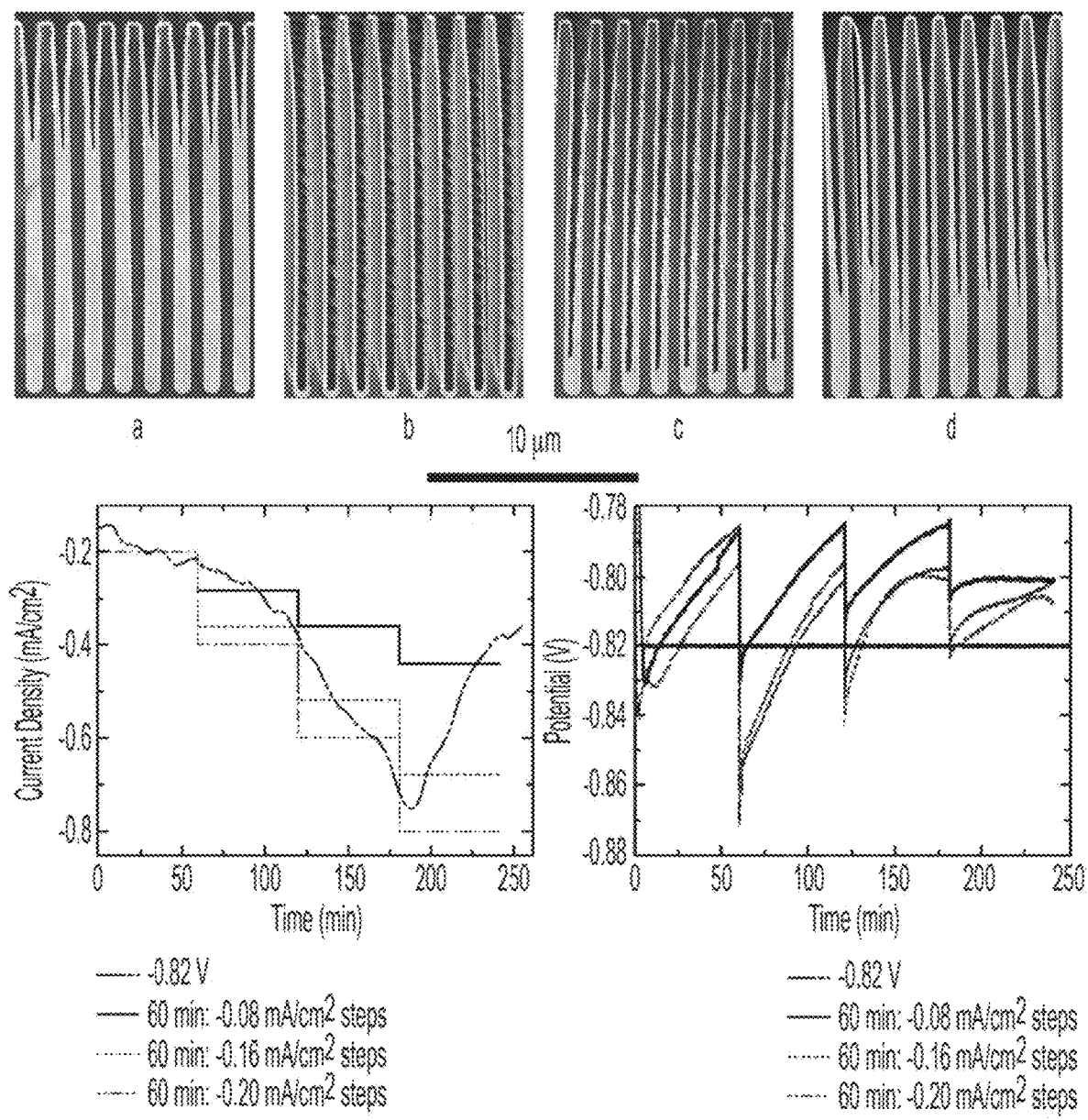
FIG. 37 shows SEM images of Au electrodeposits in 17 µm deep trenches after deposition a) under potential control for 255 min at −0.82 V and under current control for 60 min at current density starting at −0.2 mA/cm$^2$ and increasing, by b) −0.08 mA/cm$^2$, c) −0.16 mA/cm$^2$ or d) −0.20 mA/cm$^2$ every 60 min for total deposition time of 240 min. Imposed and associated current densities and potentials associated with the Au deposition pictured are shown below; the imposed conditions are included for comparison. Substrate areas accessible for deposition are estimated to be 0.25 cm$^2$ for conversion of imposed and measured currents to current densities. All in 80 mmol/L $Na_3Au(SO_3)_2$+0.64 mol/L $Na_2SO_3$ electrolyte containing 4 µmol/L $Bi^{3+}$ at rotation rate of 400 RPM. Tilting of trenches arises during epoxy infiltration and setting.

Stepped current waveforms were examined as an alternative to potential controlled Au deposition in 17 μm deep trenches. The galvanodynamic approach systematically advances the applied current to mimic the current transient associated with potentiostatic filling at −0.82 V. The current density-potential characteristics are shown in FIG. 37 along with the corresponding images of trench filling. Potentiostatic deposition for 255 mM at −0.82 V is shown in FIG. 37a for comparison. Deposition was initiated at −0.20 mA/cm² for the galvanodynamic experiments, stepping by increments of −0.08 mA/cm², −0.16 mA/cm² or −0.20 mA/cm² every 60 min for a total of 240 min of filling. The −0.08 mA/cm² steps yield the thin, uniform Au deposit of the fully passivated surface (FIG. 37b). In contrast, partial bottom-up filling is observed using the −0.16 mA/cm² steps, with more substantial thickening of the mid- to lower sidewall deposits (FIG. 37c). Deposition using the −0.20 mA/cm² steps exhibits the superconformal v-notch shape (FIG. 37d) obtained at the fixed potential, having advanced one-third of the way from the trench bottom. Growth of the sidewall deposits raises the aspect ratio that must be filled even as it negatively impacts transport required for bottom-up filling; only the gradient of sidewall thickness down the trenches, notably of opposite sign to that expected from either metal ion or $Bi^{3+}$ depletion, prevents formation of considerable keyhole voids. For exclusive bottom-up filling, each −0.4 mA/cm² increment can increase deposition rate v by 0.85 nm/s given the relationship $$v = \Omega \frac{|I|}{nFA} \quad [1]$$

with molar volume Ω=10.2 cm³/mol for Au, n=1 equivalents for Au deposition, A (active) recessed area, which is one-half of the approximately 3 mm×8 mm accessible region of the patterned specimen, and Faraday's constant F=96485 C/mol. Deposition for 240 min using the −0.2 mA/cm² current steps should yield nearly 15.2 μm of bottom-up filling, more than 90% of the volume of the 17 μm deep trenches. Instead, additional active area within the slot of the substrate holder reduces the filled volume in FIG. 37d, pointing out the need for well-defined active area when current (density), rather than potential, control is used. Bottom-up filling of the trenches at a constant current of −0.8 mA/cm² on the defined area should take somewhat over 160 min, absent void formation.

The current and potential transients associated with fabrication of the specimens pictured in FIG. 37 are shown as well. The −0.08 mA/cm² step extends the gradual increase of current density observed during the incubation period in the potentiostatic deposition at −0.82 V. The associated potential transient relaxes within the range −0.83 V to −0.79 V during each hold period. The −0.16 mA/cm² and −0.2 mA/cm² steps better mimic the increase of current observed during the potentiostatic deposition at −0.82 V that is associated with bottom-up filling. They yield potential transients that are generally 10 mV to 20 mV more negative than those obtained using the −0.08 mA/cm² steps.

Figure 38:
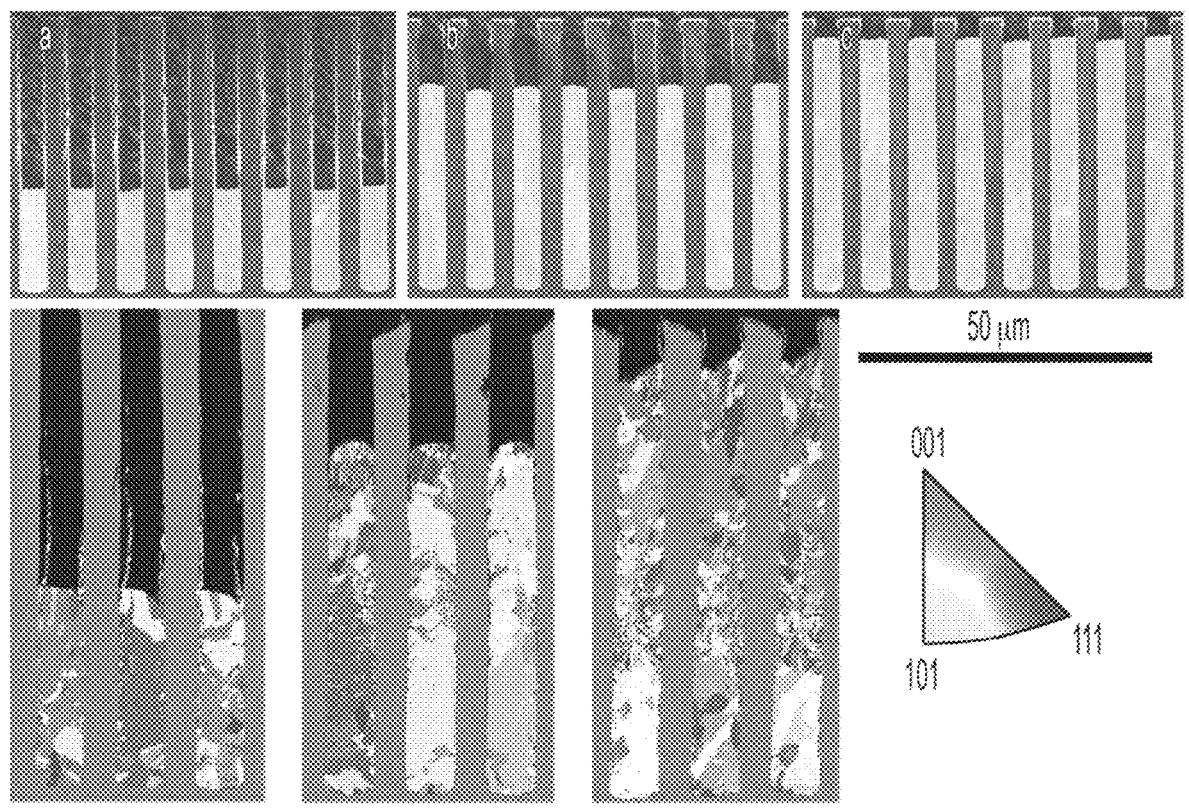
FIG. 38 shows SEM images of Aw electrodeposits in 45 µm deep trenches filled at −0.80 V for a) 240 min, b) 360 min and c) 480 min. EBSD maps showing the z-direction grain orientation are shown for smaller regions below. Curving of the upper surfaces in EBSD maps arises from oblique imaging (70° from surface normal) of the nonplanar surface created during ion-polishing while vertical displacement of adjacent trenches results from misalignment of the specimen in the holder. Charging and specimen drift during the 3.5 h acquisition of each map also induce distortion. Black pixels indicate failure to assign an orientation. All in 80 mmol/L $Na_3Au(SO_3)_2$+0.64 mol/L $Na_2SO_3$ electrolyte containing 4 µmol/L $Bi^{3+}$ at rotation rate of 400 RPM.

Filling occurred for 45 µm deep, lower aspect ratio trenches. Exclusively bottom-up filling at −0.80 V of the 45 µm deep trenches is shown in FIG. 38. The deposit heights of 20 µm at 240 min and 35 µm at 360 min indicate a deposition rate of 7.5 µm/h during this period with the rate decreasing as the deposit approaches the trench top at 480 min. Deposition rate slowing occurs near the field surface. Linear extrapolation backward in time from the first two filling heights indicates an incubation period τ of 80 min at −0.80 V. This is shorter than the 120 min<τ<180 min incubation period observed at −0.82 V with the 17 µm deep trenches (FIG. 35). While unexpected given that incubation time increases at less negative potentials, the shorter incubation time shows longer incubation time in shorter features.

The microstructures of the specimens imaged in FIG. 38 are characterized by EBSD in the same figure. The grain size spans the full width of the features almost immediately after growth initiates at the trench bottoms. While new grains appear as bottom-up filling progresses, they remain quite large through mid-height where a region with grains of much smaller size develops between a central seam and the sidewalls. After ≈10 µm of the finer microstructure, the grains again span the full width. The grain size decreases again near the tops of the nearly filled trenches, albeit with a larger size than the grains at mid-height.

Figure 39:
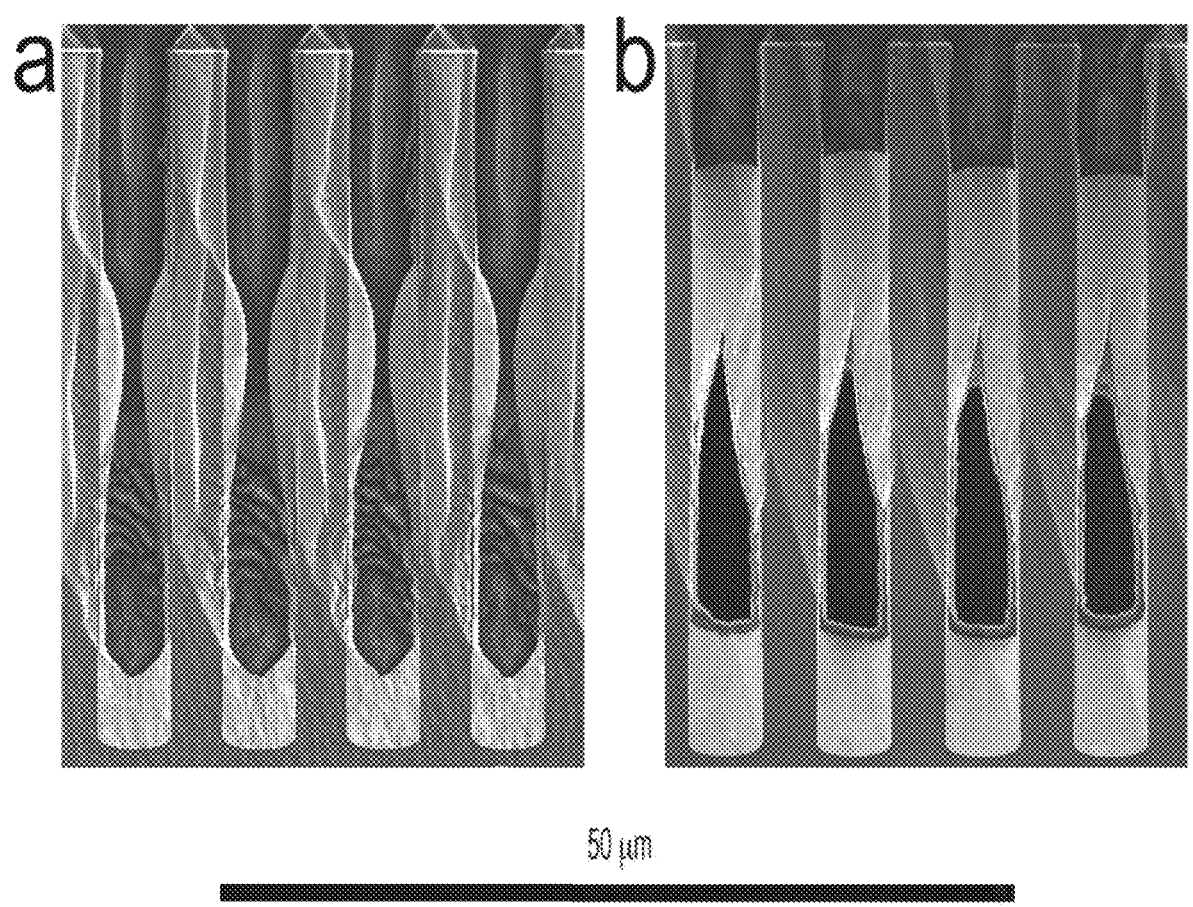
FIG. 39 shows SEM image of trenches filled for a) 85 min and b) 190 min at −0.82 V. Both in 80 mmol/L Na$_3$Au(SO$_3$)$_2$+0.64 mol/L Na$_2$SO$_3$ electrolyte containing 4 μmol/L Bi$^{3+}$ at rotation rate of 400 RPM.

Some trenches on the specimen imaged in FIG. 38b do not exhibit, the smaller grains at mid-height (not shown). Without being bound by theory, it is believed that the variation of microstructure across the specimen may occur under conditions marginal for bottom-up filling. Sidewall activation for voiding can occur 20 mV more negative during deposition at −0.82 V (FIG. 39 for transition at a potential between truncated bottom-up filling and entirely bottom-up filling.

Figure 40:
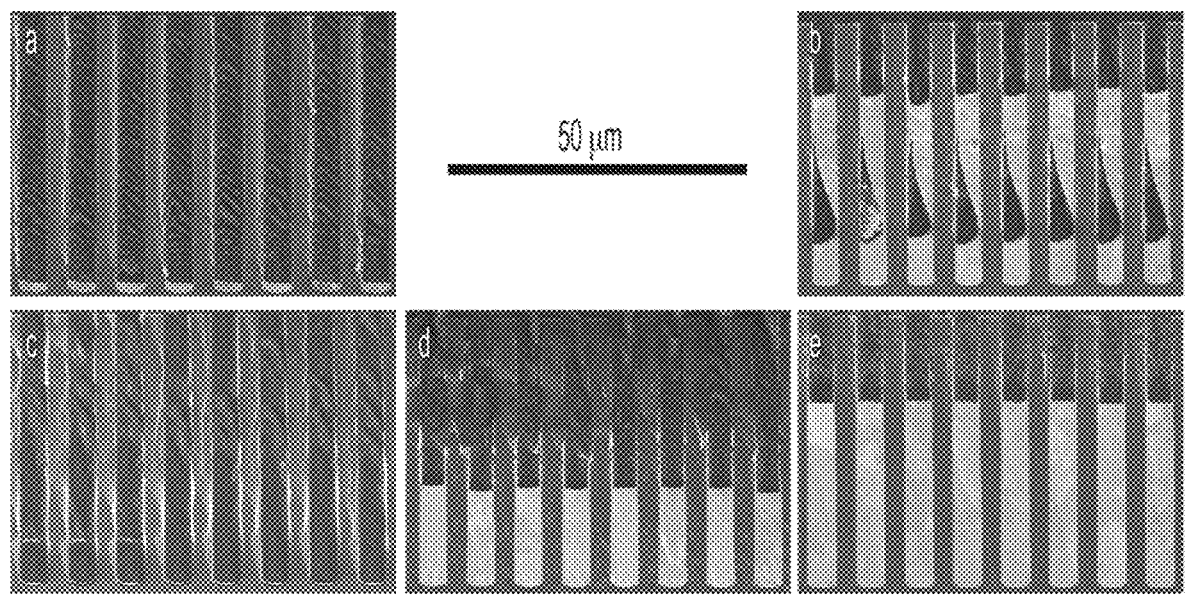
FIG. 40 shows SEM images of Au electrodeposits in 45 μm deep trenches filled for a) 60 min and b) 120 min at −0.80 V, c) 120 min and d) 240 min at −0.78 V and e) 60 min at −0.80 V then 180 min −0.78 V. All in 80 mmol/L Na$_3$Au(SO$_3$)$_2$+0.64 mol/L Na$_2$SO$_3$ electrolyte containing 24 μmol/L Bi$^{3+}$ at rotation rate of 400 RPM.

To reduce filling time, greater $Bi^{3+}$ concentration was used. Filling of 45 µm deep trenches in electrolyte containing 24 µmol/L $Bi^{3+}$ is shown in FIG. 40. The onset of bottom up deposition is evident by 60 min at −0.80 V (FIG. 40a), the incubation period being shorter than the extrapolated value determined for 4 µmol/L $Bi^{3+}$ at the same potential. However, in contrast to the nearly complete bottom-up filling obtained after 480 min with 4 µmol/L $Bi^{3+}$ (FIG. 38), truncated bottom-up filling occurs by 120 min with the higher $Bi^{3+}$ concentration (FIG. 40b). As with smaller, lower aspect ratio trenches, a modest shift to more positive potential (−0.78 V) brings the truncated bottom-up filling to entirely bottom-up filling. Unfortunately, the shift to more positive potential also increases the incubation period to beyond 120 min (FIG. 40c), so that filling after 240 min (FIG. 40d) is little advanced over that obtained at −0.80 V with 4 µmol/L $Bi^{3+}$ for the same time (FIG. 38a). However, pursuing earlier activation by starting with 60 min at −0.80 V and then depositing at −0.78 V for 180 min yields substantially greater filling (FIG. 40e) indicative of a shortened incubation time.

Figure 41:
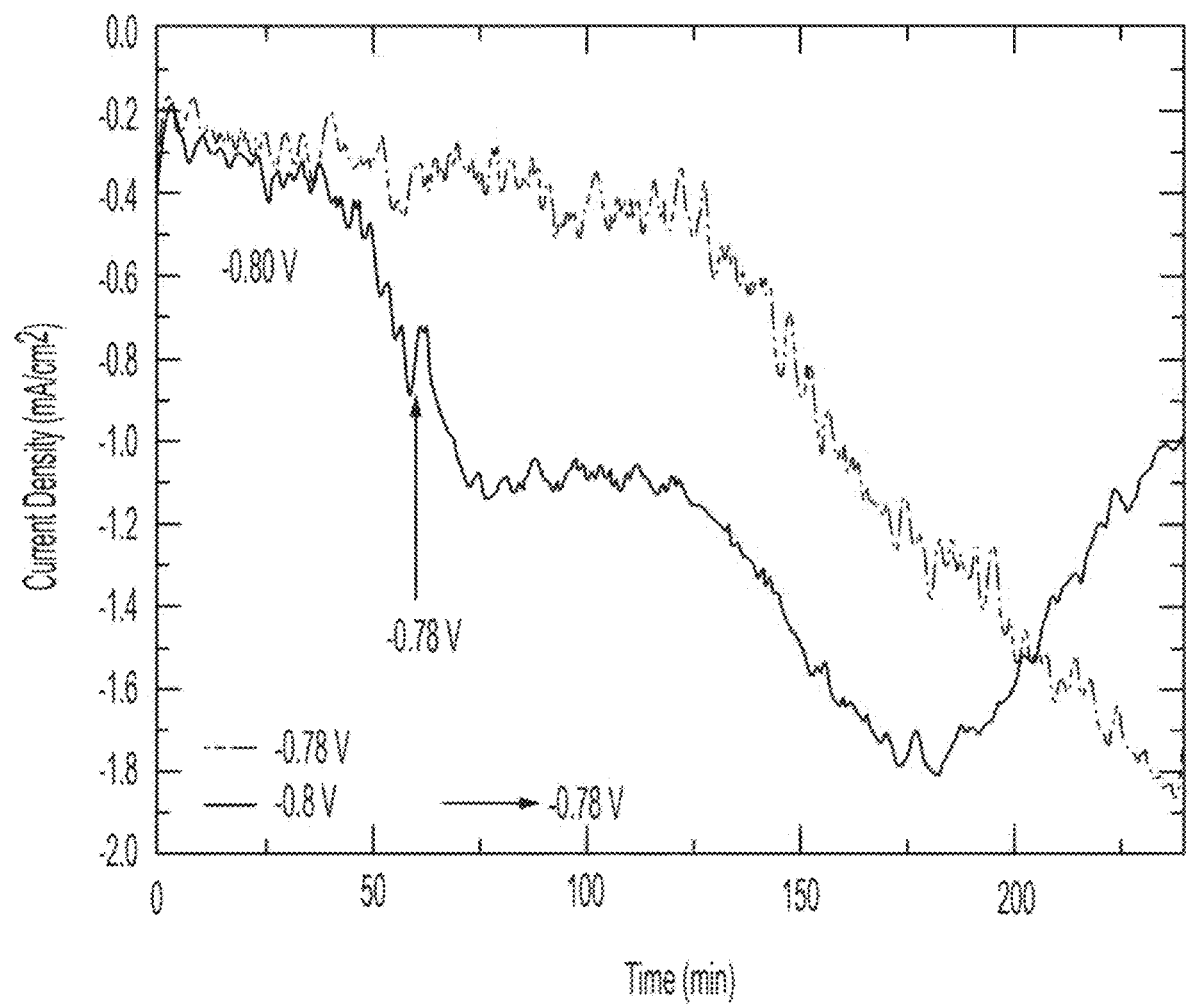
FIG. 41 shows current transients for Au deposition in 45 μm deep trenches: (i) 240 min at −0.78 V and (ii) 60 min at −0.80 V then for 180 min −0.78 V. Both in 80 mmol/L Na$_3$Au(SO$_3$)$_2$+0.64 mol/L Na$_2$SO$_3$ electrolyte containing 24 μmol/L Bi$^+$ at rotation rate of 400 RPM. Associated with specimens shown in FIG. 40d and FIG. 40e. Substrate areas accessible for deposition are estimated to be 0.25 cm$^2$ for conversion of measured currents to current densities.

The current transients Obtained during deposition of the specimens in FIGS. 40d and 40e are shown in FIG. 41. Deposition at −0.78 V exhibits an incubation period of ≈130 min before the deposition current begins to increase. The initial application of −0.80 V shortens the incubation period, the start of active deposition shifting ≈80 min forward in time.

Figure 42:
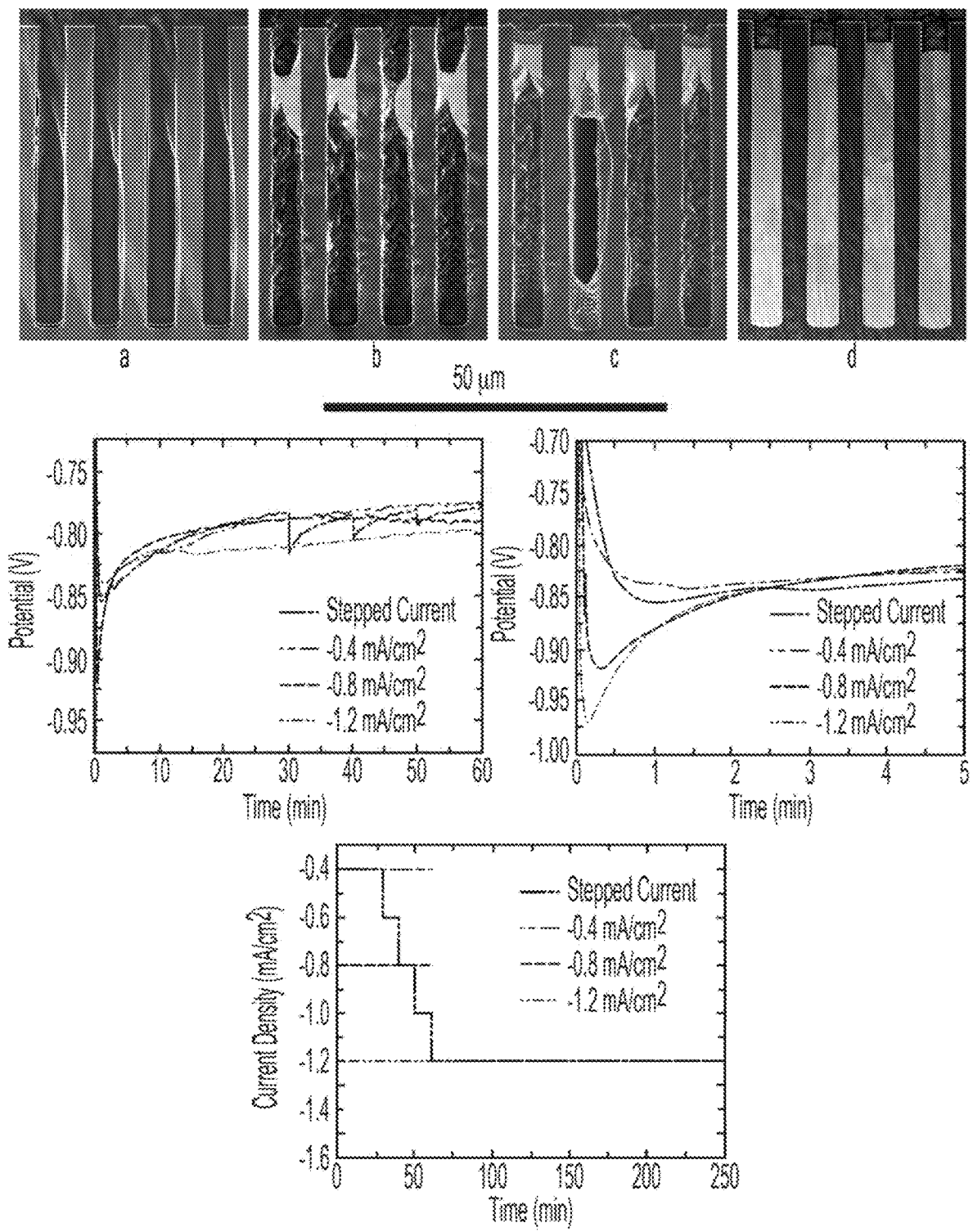
FIG. 42 shows SEM images of Au electrodeposits in 45 μm deep trenches filled for 60 min at: a) −0.4 mA/cm$^2$, b) −0.8 mA/cm$^2$ and c) −1.2 mA/cm$^2$ and d) 30 min at −0.4 mA/cm$^2$ followed by 10 min at (−0.6, −0.8 then −1.0) mA/cm$^2$ and finally 295 min at −1.2 mA/cm$^2$. Imposed and associated current densities and potentials associated with the imaged Au deposition are shown below; the imposed conditions are similarly color-coded for comparison. All in 80 mmol/L Na$_3$Au(SO$_3$)$_2$+0.64 mol/L Na$_2$SO$_3$ electrolyte containing 24 μmol/L Bi$^+$ at rotation rate of 400 RPM. Substrate areas accessible for deposition are estimated to be 0.25 cm$^2$ for conversion of measured currents to current densities.

Deposition in 45 µm deep trenches using galvanostatic and galvanodynamic control is shown in FIG. 42. The current densities were constant for the first three specimens (FIG. 42a-c). The values are drawn from the transient obtained during the stepped-potential filling recorded in FIG. 41 (specimen in FIG. 40e) and correspond to the current density during the incubation period (FIG. 42a), midway up the rise after the start of bottom-up filling at −0.80 V (FIG. 42b) and the plateau at −0.78 V (FIG. 42c). Deposition at the lowest current density exhibits absence of localization of Au deposition within the trenches. Deposition at both the intermediate and higher values is localized within the trenches but subconformal, the deposits located in the upper region of the trenches. In contrast, the specimen in FIG. 42d was filled using a stepped current density that simulates the full transient obtained during the two-potential process in FIG. 41, with the period of the plateau extended by 120 min to enable more complete bottom-up filling.

The applied current densities and corresponding potential transients for all four specimens pictured in FIG. 42 are shown in the same figure, including an expanded view of the potential response during the first 5 min of deposition. The filling results can be understood from the potential transients. The passivated surfaces for applied current of −0.4 mA/cm (FIG. 42a) are consistent with the known 60 min incubation period at −0.84 V, as the potential only reaches −0.84 V at the earliest times and is positive of −0.80 V within 20 min. The deposition current densities of −0.8 mA/cm² and −1.2 mA/cm², on the other hand, cause the potential to spike at early times negative of −0.90 V and −0.95 V, respectively. These potentials are applied at early times to maintain specified currents on the sulfite-suppressed surfaces in the absence of significant adsorbed Bi but are negative of values yielding truncated bottom-up deposition even in 5.5 µm deep trenches of similar aspect ratio after Bi adsorption has activated filling. Stepped current history keeps the potential positive of ≈−0.85 V at the earliest times. The potential oscillates around −0.8 V during the remainder of the first hour, consistent with a Shortened incubation period. It then remains near −0.78 V for the next several hours. The potential shifts negative to −0.80 V for the final hour due to slowing of deposition that occurs near the trench top at fixed potential (FIG. 38).

Figure 43:
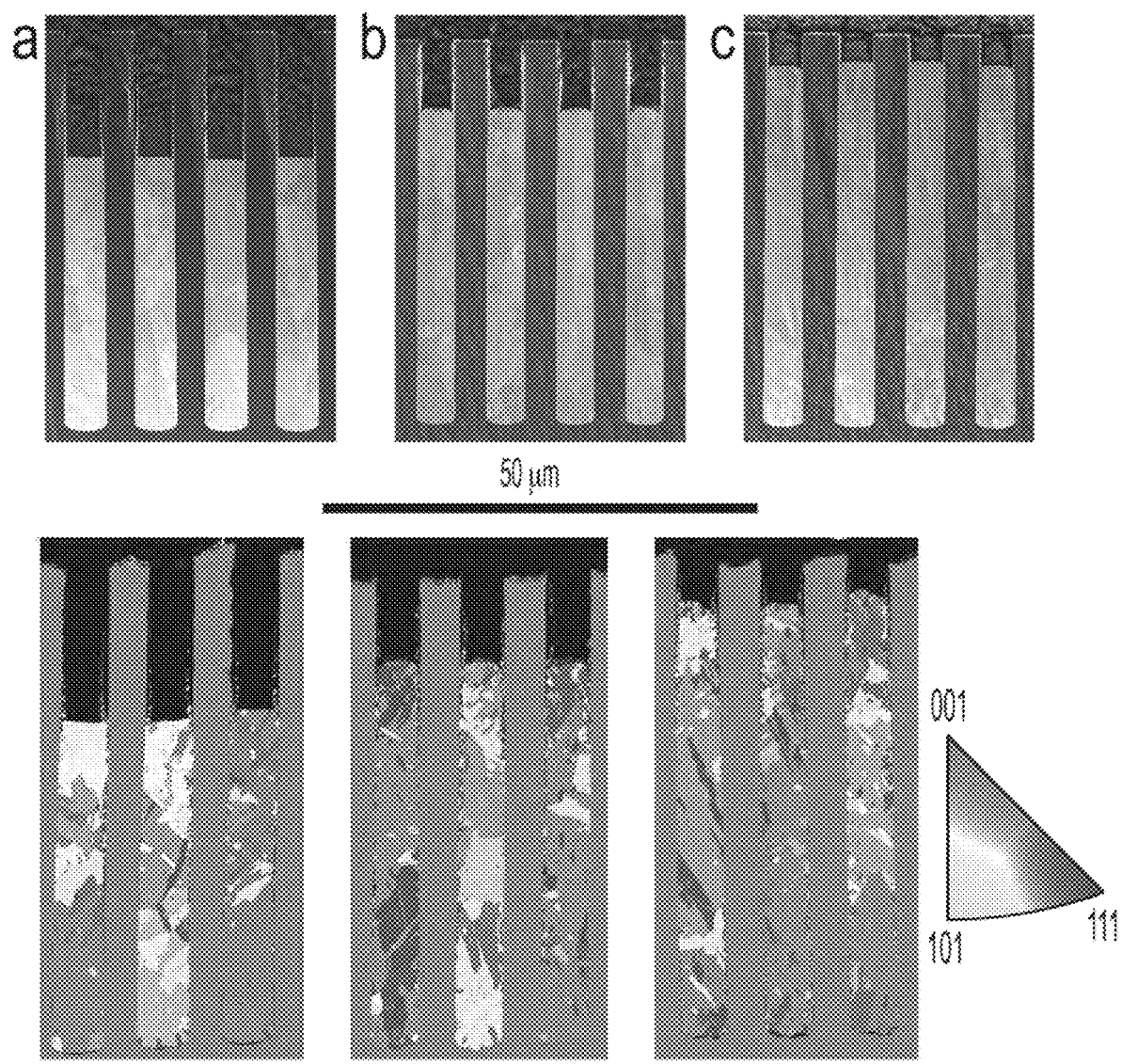
FIG. 43 shows SEM images of Au electrodeposits in 45 μm deep trenches and electron backscatter diffraction maps showing the z-direction grain orientation in 45 μm deep trenches with Au electrodeposited for a) 60 min at −0.80 V followed by 180 min at −0.78 V (image also in FIG. 40e), b) 10 min at (−0.05, −0.065, −0.08, −0.095, −0.11, −0.135, −0.16, −0.2, −0.25) mA followed by 330 min at −0.3 mA and c) 30 min at −0.1 mA followed by 10 min at (−0.15, −0.20 and −0.25) mA and then 300 min at −0.3 mA (image also in FIG. 42d). All in 80 mmol/L Na$_3$Au(SO$_3$)$_2$+0.64 mol/L Na$_2$SO$_3$ electrolyte containing 24 μmol/L Bi$^{3+}$ at rotation rate of 400 RPM. Curving of the upper surfaces in the EBSD maps arises from oblique imaging (70° from surface normal) of the nonplanar surface created during ion-polishing while vertical displacements of the adjacent trenches result from misalignment of the specimen in the holder. Charging and specimen drift during the 3.5 h acquisition of each map also induce distortion. Black pixels indicate failure to assign an orientation.

Three specimens with 45 µm deep trench that were filled in electrolyte containing 24 µmol/L $Bi^{3+}$ are imaged by SEM and their microstructures characterized by EBSD in FIG. 43. One was filled using the two-step potential control (FIG. 43a) while two were filled using different galvanodynamic processes that simulate it (FIGS. 43b and 43c). The grains are large, generally spanning the trench widths and a number extend tens of micrometers up the trench height (accounting for twins, indicated by straight boundaries and characteristic relative orientations, i.e., color combinations). As observed with the lower $Bi^{3+}$ concentration and more negative potential (FIG. 38) the grain size is smaller near the top of the nearly filled trenches.

Figure 44:
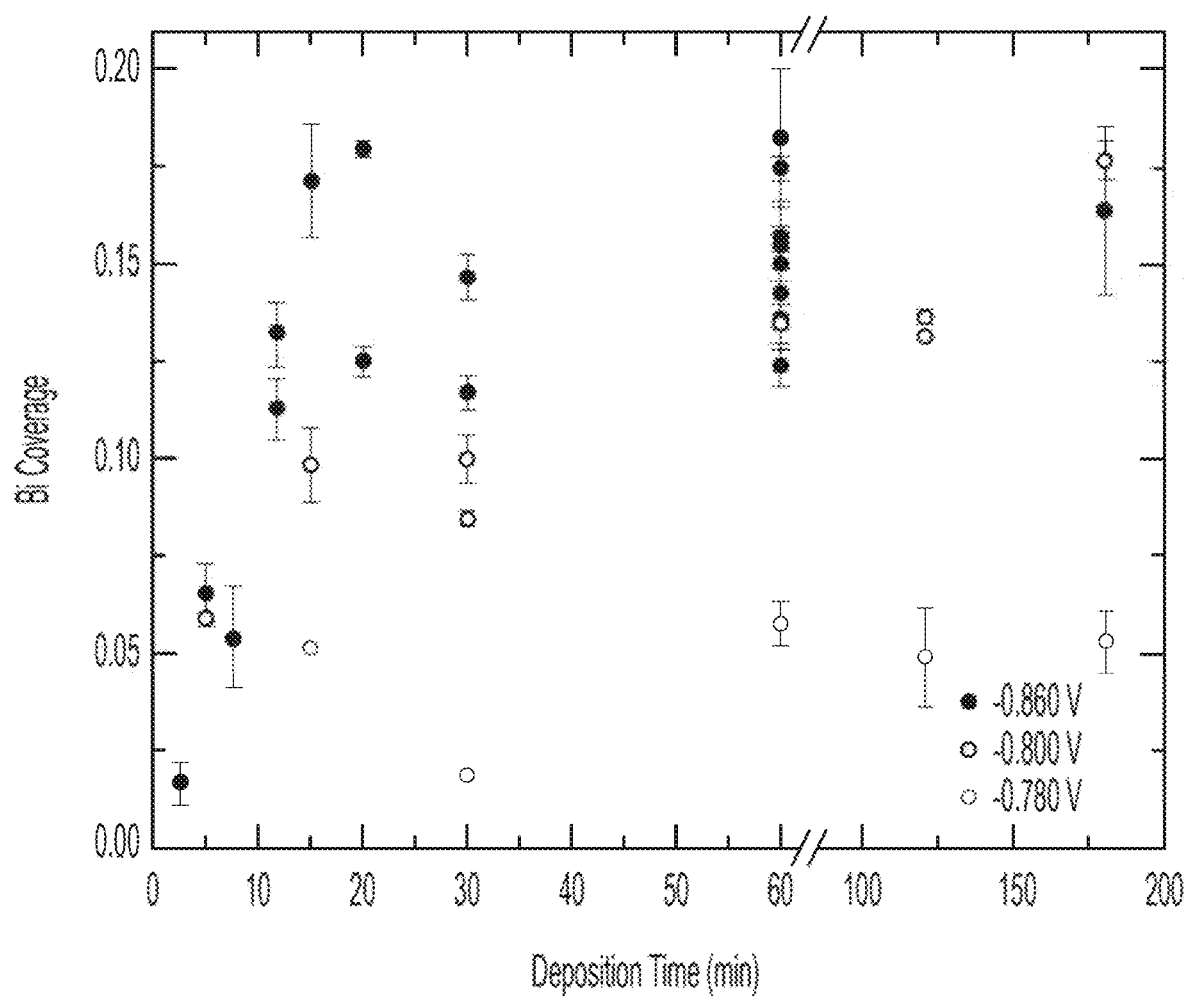
FIG. 44 shows Bismuth coverage on the surface of Au electrodeposited on (111) textured Au thin films. Bi coverage obtained by XPS plotted against deposition time at the applied potentials of −0.80 V and −0.78 V. Values include all oxidation states of Bi. Au deposition was in 80 mmol/L Na$_3$Au(SO$_3$)$_2$+0.64 mol/L Na$_2$SO$_3$ electrolyte containing 24 μmol/L Bi$^{3+}$ at rotation rate of 100 RPM. Error bars indicate the standard deviation (1σ) of the data at the multiple positions examined on each specimen.

Bottom-up filling of deeper trenches observed here visually resembles the evolution of bottom-up filling of TSV in suppressor containing electrolytes that manifest S-NDR through suppression breakdown. However, it is distinctly different from filling in the suppressor containing electrolytes in that there is an extended period of exclusively conformal deposition associated with the passivated surfaces prior to the inception of bottom-up filling. Incubation time increases at less negative potentials. The temporal evolution of Bi adsorbate coverage on planar Au thin films were measured and quantified using XPS and data is shown in FIG. 44. The 100 revolution per minute (RPM) (200π rad/min) rotation rate simulates reduced transport within trenches rotating at 400 RPM. The rate of Bi adsorption on the Au surface at −0.80 V appears modestly retarded as compared to data acquired at −0.86 V At −0.78 V, coverage reaches 0.05+/−0.03 after 180 minutes of deposition. The current transient during deposition on patterned specimens at the same −0.78 V potential (FIG. 41) and associated cross-sections (FIGS. 40c and 40d) indicate activation at the trench bottom occurs well inside this time frame. This suggests that even the modest 100 RPM rotation rate retards or reduces adsorption on the planar surface relative to that under stagnant conditions at such positive potential.

Reduction of Bi adsorption occurs at −0.78 V. The efficacy of the two-step process for filling the 45 µm deep trenches is clear; the accumulation that takes place over approximately 60 min at −0.80 V (FIG. 44) enables initiation of the bottom-up filling dynamic during the 60 min hold at this potential that is reflected in both the current during this period (FIG. 41) and the increased filling during the entire process (FIG. 40e). That adsorption on the planar substrate at −0.78 V remains minimal (FIG. 44) even beyond the 130 min incubation period in the 45 µm deep trenches (FIGS. 40 and 41) might indicate shearing that reduces Bi adsorption at higher rotation rates[2] has a significant impact at 100 RPM at less negative potentials; it is assumed that flow and associated shearing can be reduced at the trench bottoms on the patterned specimens.

Figure 45:
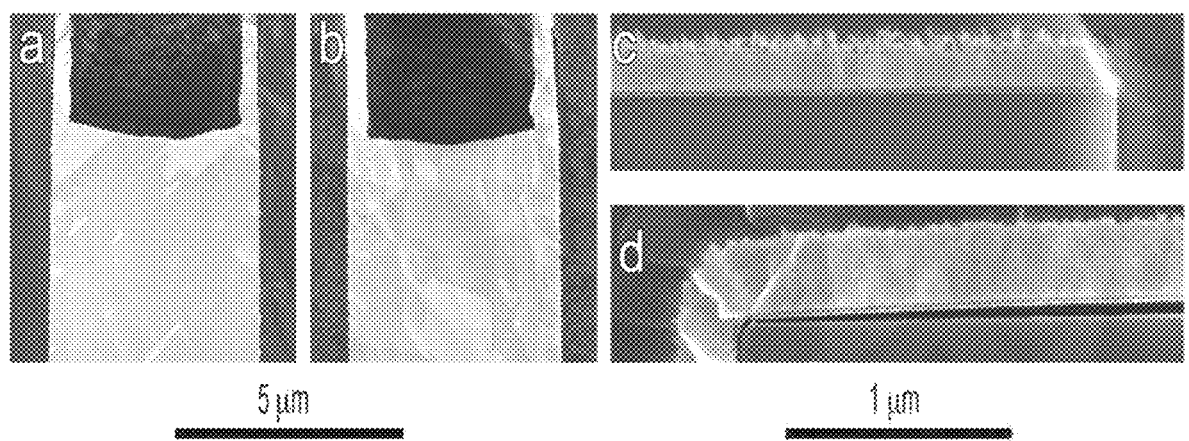
FIG. 45 shows Au electrodeposited within 45 μm deep trenches and on the immediately adjacent field in 80 mmol/L Na$_3$Au(SO$_3$)$_2$+0.64 mol/L Na$_2$SO$_3$ electrolyte containing a) 24 μmol/L Bi$^{3+}$ at −0.78 V for 240 min and 4 μmol/L Bi$^{3+}$ at −0.80 V for b) 240 min, c) 240 min and d) 480 min. Nanoscale porosity in the Au electrodeposits on passivated surfaces distinguishes them from the underlying seed layer. All at rotation rate of 400 RPM.

Failure of the potential step approach through sidewall activation in the 17 µm deep trenches (FIG. 36) was likely related to the relatively large increment of additional potential fir the initial step (40 mV). However, the ultimate failure to achieve fully bottom-up filling is understandable using a previous analysis of the impact of sidewall growth during the incubation period on the maximum aspect ratio of trenches that might be filled without sidewall-impingement. That result is $$\frac{h}{w} = \frac{v_b}{2v_s}\left(1 - \frac{2t_i v_s}{w}\right) \quad [2]$$

where the sidewall and bottom up growth rates are $v_s$ and $v_b$, respectively, the trench width and height are w and h, respectively, and the incubation period prior to the start of bottom-up filling is $t_i$. The bottom up growth rate $v_b \approx 7.5$ µm/h (2.1 m/s) at −0.82 V noted earlier is reasonably consistent with the value $V_b \approx 6.5$ µm/h (1.8 nm/s) obtained previously. Higher magnification images of specimens grown for 240 min at −0.8 V in electrolyte containing 4 µmol/L $Bi^{3+}$ as well as −0.78 V in electrolyte containing 24 µmol/L $Bi^{3+}$ show similarly thick sidewall deposits (≈0.5 µm) just above the bottom-up filled region (FIG. 45a,b) indicating $v_s \approx 0.13$ µm/h (0.035 nm/s); the active growth rate is more than 50× faster. Deposition on the field and the adjacent sidewalls is slower yet, with just 100 nm growth after 240 min (FIG. 45c) and 200 nm after 480 min (FIG. 45d), i.e., $v_s \approx 0.025$ µm/h (0.007 nm/s).

According to Eq. 2, with no incubation period the highest aspect ratio trench that can be bottom-up filled with $V_b \approx 7.5$ µm/h and $v_s \approx 0.13$ µm/h is nearly 29. Inclusion of 2 h incubation period for 4 µm wide trenches decreases the maximum finable aspect ratio by 13% to 25, suggesting that filling of even higher aspect ratios than demonstrated here is possible (even without a shorter incubation period). For a 1 µm wide trench the same parameters indicate a maximum tillable aspect ratio of only 14. This anticipates failure to obtain entirely bottom-up filling of these trenches even absent concentration gradients. It is only the increasing passive growth rate farther from the field, and resulting v-shaped growth geometry, that enable the nearly void-free filling that is obtained.

Deposition restricted to the bottom of the trench eliminates the possibility of keyhole void formation due to the metal ion gradient associated with transport down the trench. However, consideration of the rates in terms of the limit associated with diffusional transport is nonetheless worthwhile. Using the relationship $$v_L = \Omega D \frac{C}{\delta} \quad [3]$$

for the limiting deposition rate $v_L$, with molar volume $\Omega = 10.2$ cm$^3$/mol of Au already noted, estimated diffusion coefficient $D = 2 \times 10^{-6}$ cm$^2$/s, gold concentration $C = 80 \times 10^{-6}$ mol/cm$^3$, and diffusion length $\delta = 45 \times 10^{-4}$ cm defined by the full trench depth, a maximum (initial) growth rate of ≈3.5 nm/s is indicated; electromigration would increase this value. The bottom-up feature filling rates of 2 nm/s obtained here and previously are all fairly below this transport limited value. The bottom-up fill rates in trenches with depths from 5 µm to 45 µm may be kinetically constrained deposition at the potentials used, a conclusion supported by cyclic voltammetry. Nonetheless, one must observe that less negative potentials having slower deposition kinetics are required for successful bottom-up filling of taller features having decreased transport limited flux (Eq. 3). The impact of concentration gradient(s) on bottom-up filling as well as their role in sidewall activation, like the mechanism defining the bottom-up trench filling itself, remain to be ascertained.

A near-neutral pH 80 mmol/L $Na_3Au(SO_3)_2$+0.64 mol/L $Na_2SO_3$ electrolyte containing micromolar $Bi^{3+}$ concentrations has been used to obtain void-free, bottom-up filling of 45 µm deep trenches, more than twice the depth previously demonstrated, by both current and potential control. Truncated bottom-up Au deposition at more negative potentials changes to entirely bottom-up filling at less negative potentials. However, the corresponding incubation period of conformal deposition that precedes bottom-up filling increases. It is shown here that deposition initiated at more negative potential than that used for the principle portion of feature filling can substantially shorten the incubation period. While current control is also used for feature filling, the value must account for the area of the recessed features to be filled. Furthermore, it must be adjusted to account for the gradual accumulation of Bi from the electrolyte.

Example 3. Bottom-Up Gold Superconformal Filling of High Aspect Ratio Trenches

Electrochemical deposition enables the fabrication of interconnects, and devices across a wide range of length-scales. Through-mask deposition, where electrical contact to a common backplane and insulating side walls of the template ensure growth propagates the bottom of the features, is often used for fabrication of large and high aspect ratio vias and trenches. However, for applications that involve electrical isolation of individual features, the need to remove the common backplane at each level makes fabrication of complex multilevel structures difficult. In contrast, with Damascene processing, the entire templated surface can be metallized to provide electrical addressability for void-free filling of recessed surface features by either superconformal or bottom-up electrodeposition processes. Subsequent planarization of the surface achieves electrical isolation of the fabricated features where it is required. Repeated templating and filling enable production of intricate multilevel structures of arbitrary connectivity.

Some superconformal deposition processes used for void-free filling of features rely on additives that adsorb to the surface and accelerate metal deposition (accelerators). Being bound more strongly than deposition-inhibiting adsorbates (suppressors), mass conservation during growth on concave surfaces enhances local accelerator coverage, and thus deposition rates, inside filling features.

For Au electrodeposition in particular, near-neutral sulfite electrolytes that are environmentally less hazardous than cyanide, the use of additives or electrolyte modification enables operation to pH values as low as 4.0. Sulfite (as well as cyanide) plating baths exhibit slow metal deposition kinetics attributed to adsorption of ligands or metal complexes on the deposit surface. At dilute coverages, adsorbed p-block heavy metals, Pb, Tl, Bi and Hg, can lift this inhibition, yielding hysteresis in voltammetry and depolarization during chronopotentiometry, and are therefore classified as accelerators Au electrtodeposition. Their addition permits fabrication of smooth, bright films from both cyanide and sulfite electrolytes as well as the CEAC-derived superconformal filling of patterned features noted with Pb addition. At higher coverages of adsorbed Tl, behavior inverts and inhibition of deposition yields a Negative Differential Resistance (NDR) in voltammetry and a transition to nanowire growth.

Depletion gradients in tall features work against the CEAC mechanism because the superconformal growth mode initiates at the bottom concave corners of recessed surface segments that are farthest from the feature opening. Alternatively, void-free filling of high aspect ratio trenches and vias can be achieved using additives whose adsorption slows metal deposition (suppressors). Electrolyte-suppressor systems that exhibit additive derived S-shaped NDR in voltammetry, due to suppression breakdown, can achieve filling that is highly localized to the bottoms of features.

This Example describes an unexpected finding of almost exclusive bottom-up filling of trenches and vias during Au deposition at small overpotentials in an electrolyte that includes micromolar concentrations of Bi ions in $Na_3Au(SO_3)_2+Na_2SO_3$. As Bi unambiguously accelerates Au deposition in this system, filling exhibits bottom-up deposition with morphological filling of high aspect ratio trenches. To further explore the limits of this electrolyte-additive system and obtain additional insight into the unique aspects of its function, filling is explored in taller and higher aspect ratio trenches than previously detailed. Additionally, the evolution of Bi coverage through adsorption and its impact on the Au deposition rate are quantified as a function of the transport conditions and correlated with deposit evolution and morphology on planar substrates.

The Au deposition used a sodium gold sulfite source, Technic TG-25, $Na_3Au(SO_3)_2$, containing 2 troy ounces of Au per liter, equivalent to 0.32 mol/L, that was diluted to one-fourth its original concentration using 18 MΩ·cm water. Depositions and voltammetry were conducted in a cell containing 40 mL of 80 mmol/L $Na_3Au(SO_3)_2$+0.64 mol/L $Na_2SO_3$, the latter as supporting electrolyte, unless otherwise noted. A $Hg/Hg_2SO_4$/saturated $K_2SO_4$ reference electrode was connected to the working electrode compartment via a fritted bridge filled with saturated solution of $K_2SO_4$; all potentials are relative to this reference (SSE). A platinum counter electrode was held in a fit-separated cell immersed within the main cell.

Bismuth was introduced into the electrolyte by anodic dissolution of elemental Bi of 99.999% purity. Dosing was accomplished by scanning the Bi electrode potential positive from −0.59 V at 0.2 mV/s, never going beyond −0.4 V to avoid sulfite oxidation, while monitoring the cumulative charge passed. The stated concentrations are based on the dissolution charge and the assumption of 100% efficiency and 3 equivalents, i.e., $Bi^{3+}$. That said, greater acceleration, manifest as increased hysteresis in cyclic voltammetry, was obtained when the same dissolution charge was passed through Bi sources with larger surface area, suggesting unresolved partitioning between dissolution and oxide formation that is a function of potential and time. The stated Bi concentrations thereby represent an upper bound on the quantity of dissolved $Bi^{3+}$ species.

Gratings of 1.3 µm pitch were patterned on silicon wafers using an i-line projection lithography system. The patterned wafers were then etched to either 5.5 µm or 17 µm depth with a width of 0.65 µm using the Bosch process. The shallower trenches have an aspect ratio between 8 and 8.5 with nonvertical sidewalls. An electrically conductive seed layer of 55 nm Ti (for adhesion) and 390 nm Au was deposited from the respective metal sources using line-of sight electron beam evaporation in a high vacuum (HV) physical vapor deposition (PVD) system whose base pressure was $10^{-5}$ Pa ($10^{-7}$ torr). Controlled tilt of the substrates during seed layer deposition enabled the coverage on the trench sidewalls to be ≈10% of that on the field and trench bottoms. The sidewall deposits are electrically continuous albeit with nonuniform morphologies typical of glancing angle deposition. For the taller trenches, having an aspect ratio of ≈25, atomic layer deposition was used to conformally metallize the free and recessed surfaces of the workpiece. Specifically, a conformal 10 nm thick alumina film served as a nucleation layer for subsequent conformal deposition of a 50 nm Pt seed layer on all exposed surfaces. This was followed by deposition of 24 nm Ti and 120 nm Au by electron beam evaporation normal to the substrates to effectively coat the field and trench bottoms with a capping Au seed layer.

Feature filling experiments were performed using 3 mm×11 mm pieces of the patterned silicon wafers. The substrates were rotated about one end from a Pt spindle during deposition, like a helicopter blade, the patterned surface facing up, to give definition to the metal ion and additive transport. Specimens were immersed in the electrolyte at open circuit potential and rotated at >1000 RPM for several seconds to ensure electrolyte infiltration into the trenches before adjusting the specified rotation rate and applying the specified potential. Based on the ≈1 cm distance between the features and rotational axis for most of the imaged trenches, a 400 RPM (800π rad/min) rotation rate corresponds to an estimated ≈40 cm/s flow rate over the surface.

Following Au electrodeposition, the specimens were infiltrated with epoxy and capped with glass in preparation for cross-sectioning. The cross sections were prepared by mechanical polishing on lapping papers embedded with diamond grit down to 0.25 µm size grit. An ionized Ar source was used for oblique polishing to remove mechanically damaged material, thereby revealing any voids that were obscured by smearing of the soft Au. Imaging was accomplished using a field emission scanning electron microscope (FESEM).

The morphology and surface composition of electrodeposited planar Au films were examined by FESEM and X-ray photoelectron spectroscopy (XPS). For this purpose, electrodeposited films were grown on 150 nm thick (111) textured PVD Au films. These substrates were (100) Si wafers with a 50 nm thick Ti adhesion layer followed by 150 nm of Au that was grown at a rate of 0.1 nm/s by electron beam evaporation in the HV deposition system. Current densities for samples deposited on the PVD Au substrates were calculated from measured currents using the geometric area of the specimen. XPS was performed in a spectrometer maintained at typical ultra-high vacuum (UHV) working pressure below $3.6 \times 10^{-7}$ Pa ($2.7 \times 10^{-9}$ torr). The spectra were collected using a monochromatic Al Kα X-ray source with 20 eV analyzer pass energy and a 0.7 mm×0.3 mm spot size. To assess lateral homogeneity multiple positions were examined on each specimen, with attention focused on the regions farthest from the spindle of the rotator. Spectra were quantitatively evaluated using Casa XPS software. Bi Coverage was quantified using $$\frac{\phi_{Bi}\{1 - e^{[-a_{Bi}/\lambda_{Bi}(E_{Bi})\cos(\theta)]}\}}{1 - \phi_{Bi}\{1 - e^{[-a_{Bi}/\lambda_{Bi}(E_{Au})\cos(\theta)]}\}} = \frac{I_{Bi}/I_{Bi}^\infty}{I_{Au}/I_{Au}^\infty} \quad (1)$$

where $\varphi_{Bi}$ coverage, $\lambda_{Bi}(E_{Bi})$=2.00 nm and $\lambda_{Bi}(E_{Au})$=2.092 nm are the attenuation lengths Bi and Au 4f core-level electrons, respectively, in Bi, the expression accounting for at of the Au signal by the overlying Bi adlayer. A monolayer thickness corresponds to $a_{Bi}$=0.3 nm, the Bi (110) plane spacing, $\theta$=0 is the angle of emission, $I_M$ is the measured peak intensity of each metal, and $I_M^\infty$ are the relative sensitivity factors, 6.25 and 9.14 for Au and Bi 4f core level electrons for the spectrometer, respectively. Use of inelastic mean free path rather than attenuation length increases the obtained coverage values by 0.03. The specimens for XPS analysis were immersed at the deposition potential, rinsed with $H_2$ saturated water and dried with flowing Ar before storing in a glass vessel flooded with Ar for transfer to the UHV system. The samples were in HV within (10 to 15) min of emersion. The surface morphology of the Au fill as examined by FESEM.

Figure 46:
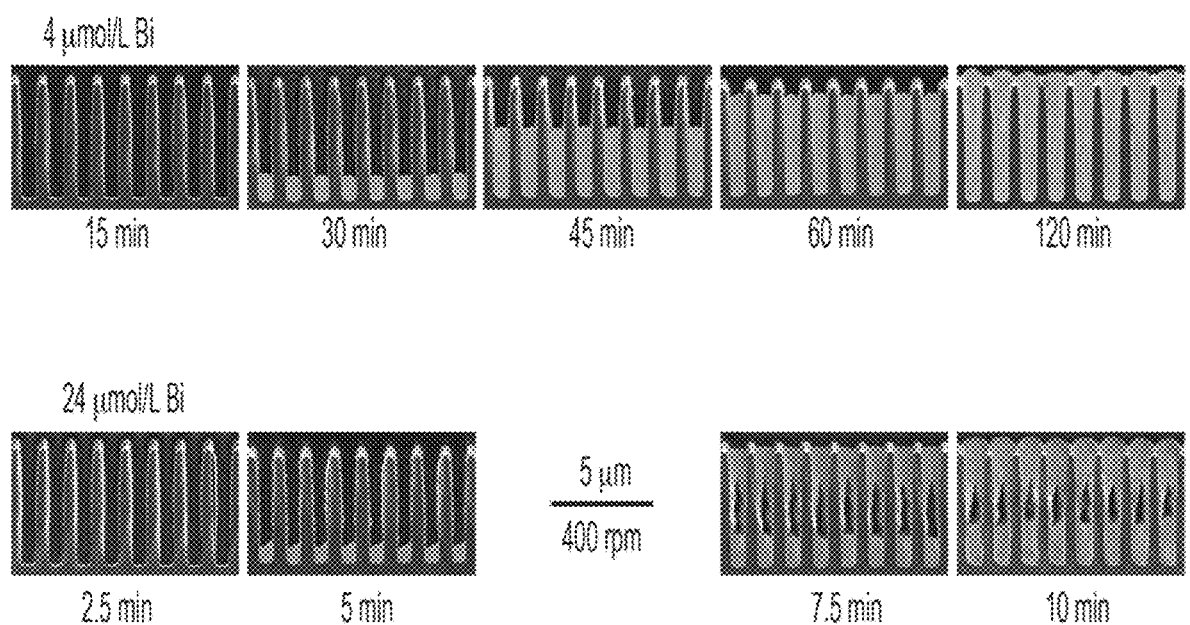
FIG. 46 shows Au filling in 5.5 μm deep, 0.65 μm wide trenches after the indicated Au deposition times at −0.86 V in 80 mmol/L Na$_3$Au(SO$_3$)$_2$+0.64 mol/L Na$_2$SO$_3$ electrolyte containing the two specified Bi$^{3+}$ concentrations. The patterned substrates were rotating at 400 RPM (800π rad/min) during deposition.

Regarding deposition on patterned substrates, superconformal, void-free filling of the 5.5 µm deep trenches at −0.86 V and 4 µmol/L $Bi^{3+}$ concentration is shown in FIG. 46. The sequence captures localization of active Au deposition to the trench bottoms despite a continuous Au seed layer being available for deposition across the entire work piece. The images also reveal the extended incubation period that precedes inception of active deposition at the bottom of the trench, more than 15 min in this case, followed by sustained multi-hour bottom-up deposition. With a solution containing a higher 24 µmol/L $Bi^{3+}$ concentration, filling still initiates at the trench bottoms, also shown FIG. 46, albeit with an incubation period of less 5 min. However, it this case deposition on the sidewalls activates higher in the trenches, plugging the entrances and yielding keyhole voids by 7.5 min. Regardless of the $Bi^{3+}$ concentration, the surrounding field remains passive throughout trench filling. This passive behavior persists even as the bottom-up growth front proceeds past the trench entrances, forming hemicylindrical protuberances. For the remainder of the feature filling experiments attention is focused on 4 µmol/L $Bi^{3+}$ and the bottom-up growth process.

Figure 47:
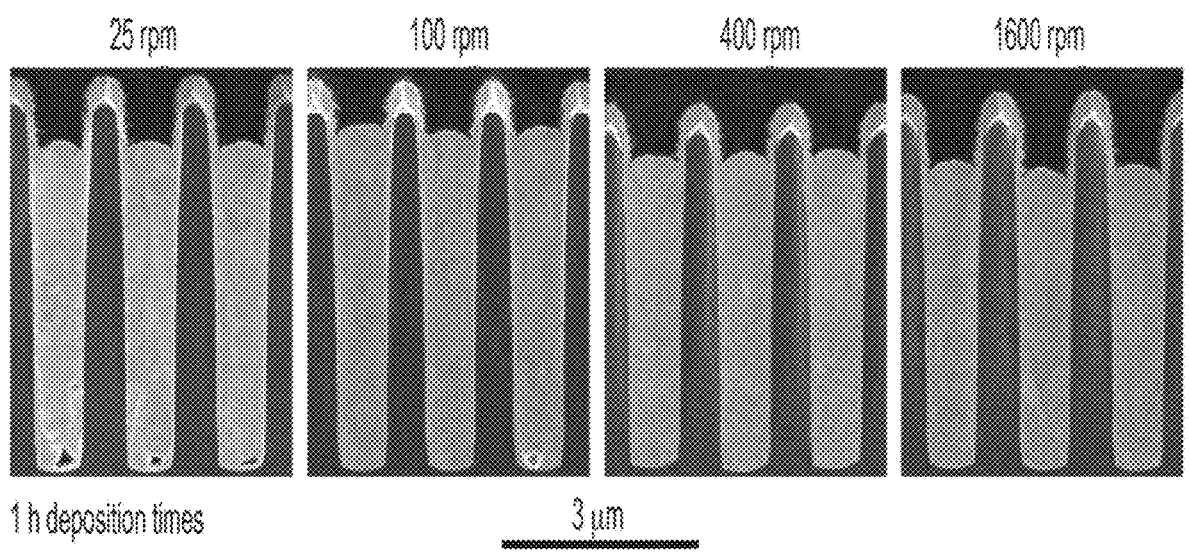
FIG. 47 shows Au filling in 5.5 μm deep trenches after Au deposition for 1 hour at −0.86 V in 80 mmol/L Na$_3$Au(SO$_3$)$_2$+0.64 mol/L Na$_2$SO$_3$ electrolyte containing 4 μmol/L Bi$^{3+}$ at the indicated rotation rates.

Cross sections of trench filling after 1 h deposition at −0.86 V and different transport conditions (spindle rotation rate) are shown FIG. 47. For the lowest rotation rate, 25 RPM, small voids are evident at the bottoms of the trenches, indicating inception of growth near the bottom of the sidewall rather than at the trench bottom itself. The deposit height in the trench arrays, which is uniform across the substrate at the higher rotation, rates, also decreases substantially farther from the leading edge of the rotating specimen at 25 RPM (not shown), suggesting either further delayed inception of filling or depletion of one or more constituents across the substrate width. Increasing the rotation rate from 100 RPM to 1600 RPM yields filling that is recessed a greater distance from the mouth of the trenches, suggesting slowing near the trench top consistent with the rotation-rate dependence of suppression on the field or, possibly, transport dependent delay of inception. The concave surface and the wetting angle on the sidewalls exceeding 90° suggest some difficulty in depositing on the suppressed sidewalls impedes the upward motion.

Figure 48:
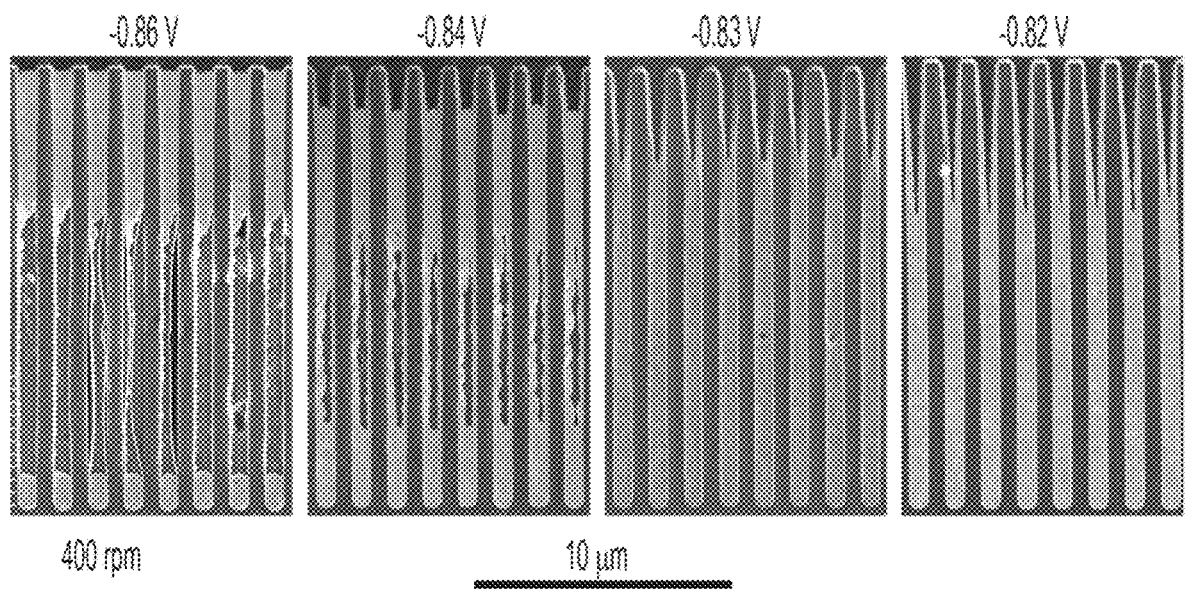
FIG. 48 shows Au deposition in 17 μm deep and 0.65 μm wide trenches at the indicated applied potentials in 80 mmol/L Na$_3$Au(SO$_3$)$_2$+0.64 mol/L Na$_2$SO$_3$ electrolyte containing 4 μmol/L Bi$^{3+}$ at rotation rate of 400 RPM. Deposition times were increased progressively from 120 min to 180 min, 215 min and 255 min at less negative potentials.

An analogous transition from truncated bottom-up filling to complete bottom-up filling is observed with the higher aspect ratio 17 µm deep trenches, albeit at somewhat more positive potentials, as captured in FIG. 48. The increased height of the deposit localized at the bottoms of the trenches at −0.84 V versus at −0.86 V (despite the expectation of slower kinetics at the lower overpotential) suggests later impingement of the sidewall deposits higher up; the thicker sidewall deposits along the central void indicate the same. Deposition at both −0.83 V and −0.82 V yields only small, discrete voids within the filled trenches, their size amplified by the ion-milling used to remove the damage from mechanical polishing. The deposit is also increasingly recessed from the field at the less negative potentials (despite substantially longer deposition times).

Figure 49:
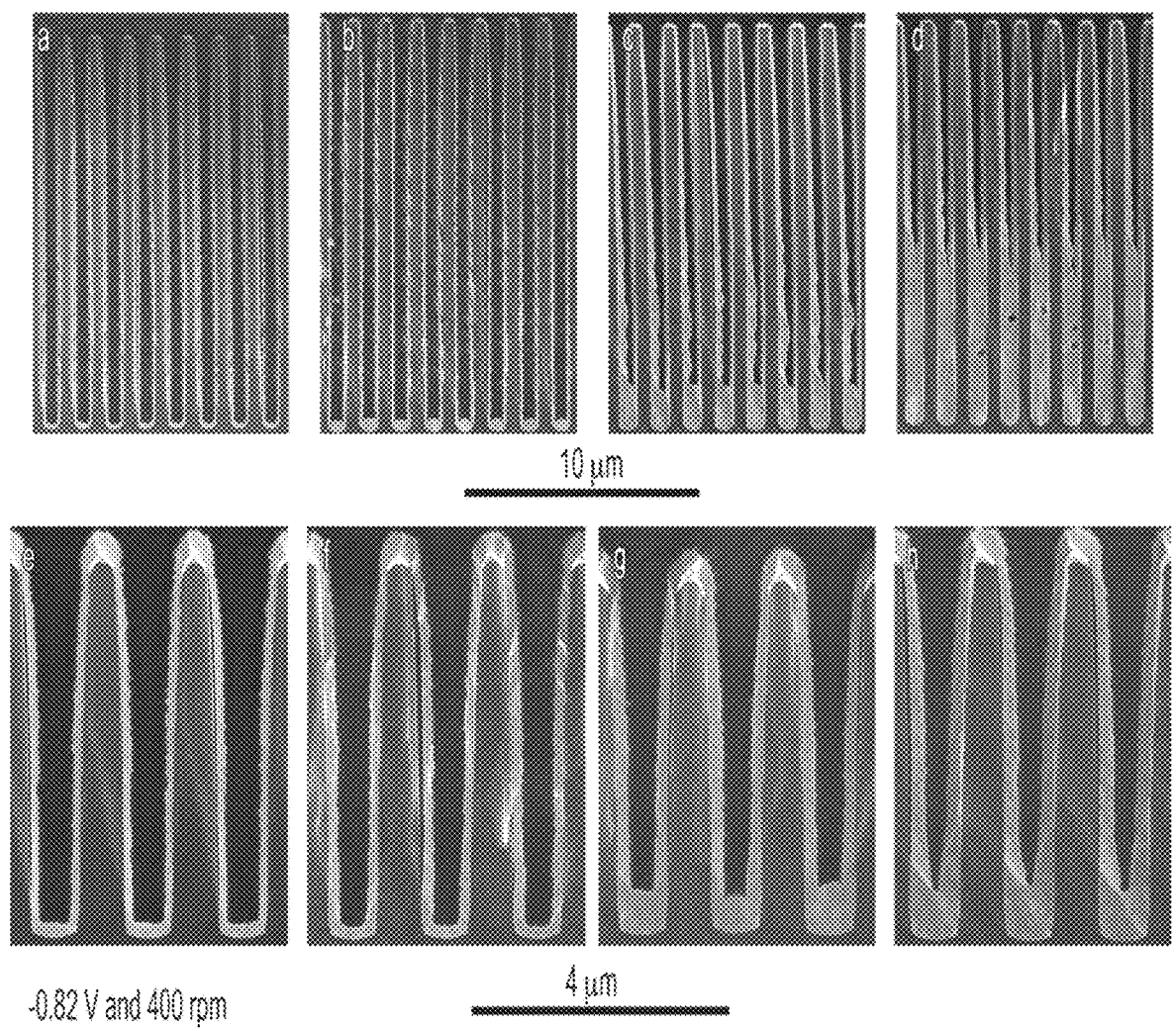
FIG. 49 shows Au deposition in 17 μm and 5 μm deep trenches at −0.82 V in 80 mmol/L Na$_3$Au(SO$_3$)$_2$+0.64 mol/L Na$_2$SO$_3$ electrolyte containing 4 μmol/L Bi$^{3+}$ at rotation rate of 400 Rpm and deposition times: a) and e) 120 min, b) and f): 150 min, c) and g) 180 min and, d) and h) 210 min.

Significantly, active deposition is obtained in higher aspect ratio features at potentials positive of −0.85 V. Experimental differences include the trench heights, only 3 µm, and the deposition times, the incubation period at −0.86 V and 4 µmol/L $Bi^{3+}$ (FIG. 46) exceeding 20 min deposition time. In fact, the incubation period increases substantially at less negative potentials, and there is some indication that it increases in shallower features. The extended incubation period is especially evident during deposition in both 17 µm and 5.5 µm deep trenches at −0.82 V; as shown in FIG. 49 only a very thin, conformal deposit forms after 120 min of deposition in both size features. Bottom-up filling is evident only at 150 min in the taller trenches (FIG. 49*b*) and 180 min in the shallower trenches (FIG. 49*g*).

The current transient associated with trench filling in 4 µmol/L $Bi^{3+}$ (FIG. 46) is shown in FIG. 50*a*. Comparison to the sequence of filling images indicates that the initially low current corresponds to the incubation period of conformal deposition, the leakage current yielding very slow conformal deposition on the passivated surfaces. The current increases by a factor of roughly four during a transition that starts at approximately 15 min (black arrow) and finishes by 20 min, corresponding to the transition from uniformly passive surfaces to active bottom-up deposition across the entire array of trenches. The relative increase of current on the substrate is ill-defined, the measured current being dominated at early times by active deposition within the recessed slot in the spindle where the specimen is mounted. The current overshoots modestly yielding a peak (first arrow), followed by a plateau that lasts until approximately 40 min, suggesting a constant growth velocity in the bottom-up feature filling observed during this period. This is followed by a meaningful, but fractional, decrease in current (second arrow) to a second plateau that lasts until approximately 70 min, consistent with a decreased deposition rate as the bottom-up growth front nears the top of the trenches. Finally, a rising transient is observed as the growth front reaches the trench mouth and expands the active area to eventually cover the adjacent field regions.

Behavior analogous to that detailed in FIG. 50a for filling of 5 μm deep trenches is seen in the current transients of FIG. 50b obtained during deposition in the 17 μm deep trenches of FIG. 48. This data also captures increased incubation period at less negative potentials. The rise of current that marks the end of the incubation period (black arrow) shifts from approximately 25 min to 50 min as the applied potential is increased from −0.86 V to −0.84 V, shifting timber at even the more positive potentials. The plateau, manifesting full activation of bottom-up filling in the shorter trenches (FIG. 50a), is reduced to an inflection or shoulder (arrow) during deposition in the taller trenches (FIG. 50b). The subsequent rise likely reflects the increasing sidewall growth, visible in the partially filled features, at these comparatively longer deposition times.

Figure 50:
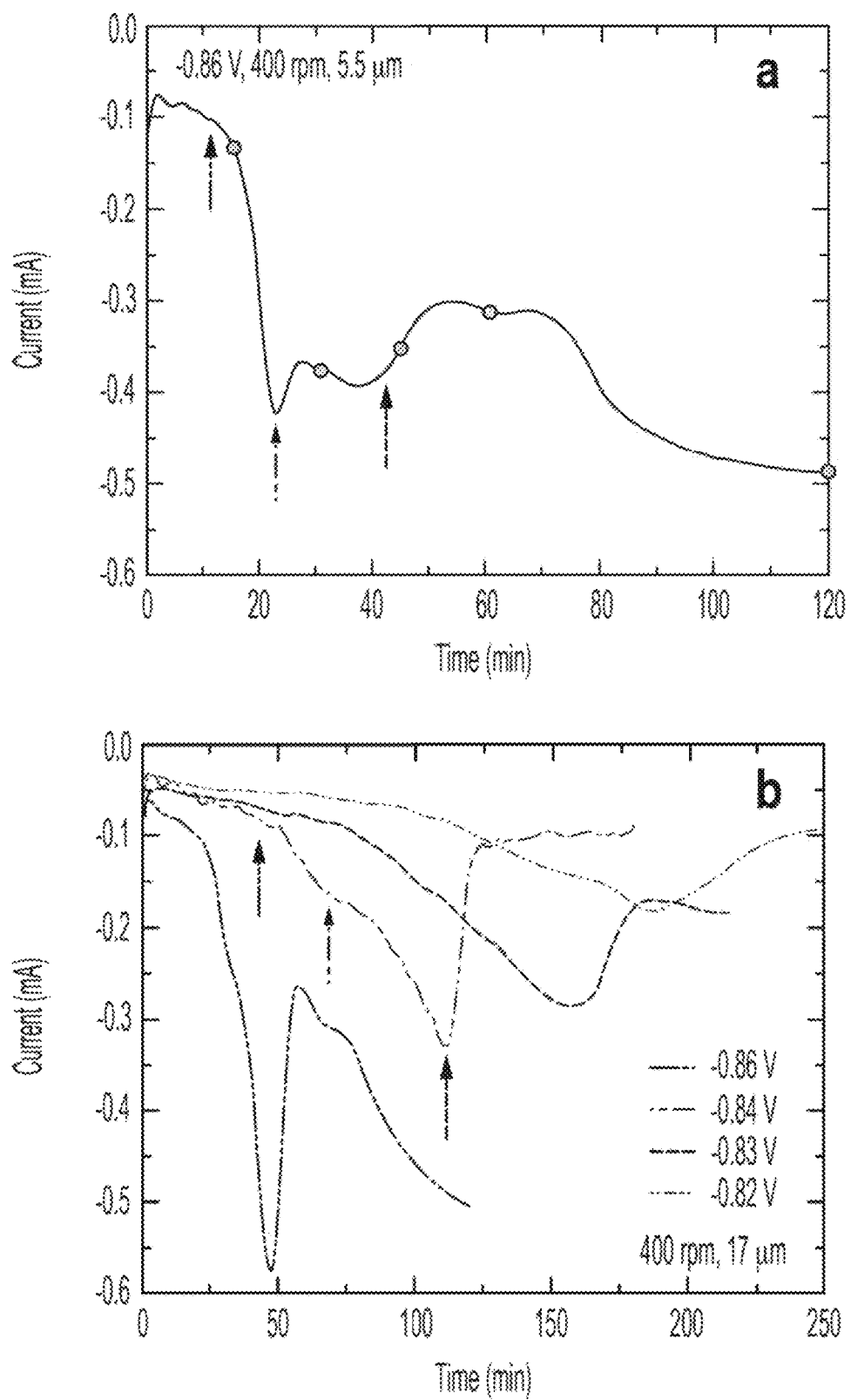
FIG. 50 shows current transients obtained during filling of a) the specimen in FIG. 46 over 120 min at −0.86 V (circles denote deposition times of the five imaged specimens) and b) the four specimens in FIG. 48 at the indicated potentials in 80 mmol/L Na$_3$Au(SO$_3$)$_2$+0.64 mol/L Na$_2$SO$_3$ electrolyte containing 4 μmol/L, Bi$^{3+}$ and rotation rate of 400 RPM. Characteristic features of the transients are indicated: black arrow—the change of slope indicating the end of the incubation period of passive deposition and start of bottom-up deposition; red arrow—the plateau or shoulder suggesting universal bottom-up deposition in the trenches with the rise beyond in panel b suggesting increasing sidewall deposition; blue arrow the decrease of current indicating slowing or passivation as the deposit approaches the field or active area decreases through sidewall impingement. The data reflects deposition on the specimens, approximately 8 mm×3 mm accounting for the portion clamped into the Pt spindle, as well as an ill-defined (visually occluded) area of (1 to 15) mm$^2$ within the slot in the spindle where the specimens are mounted.
Figure 51:
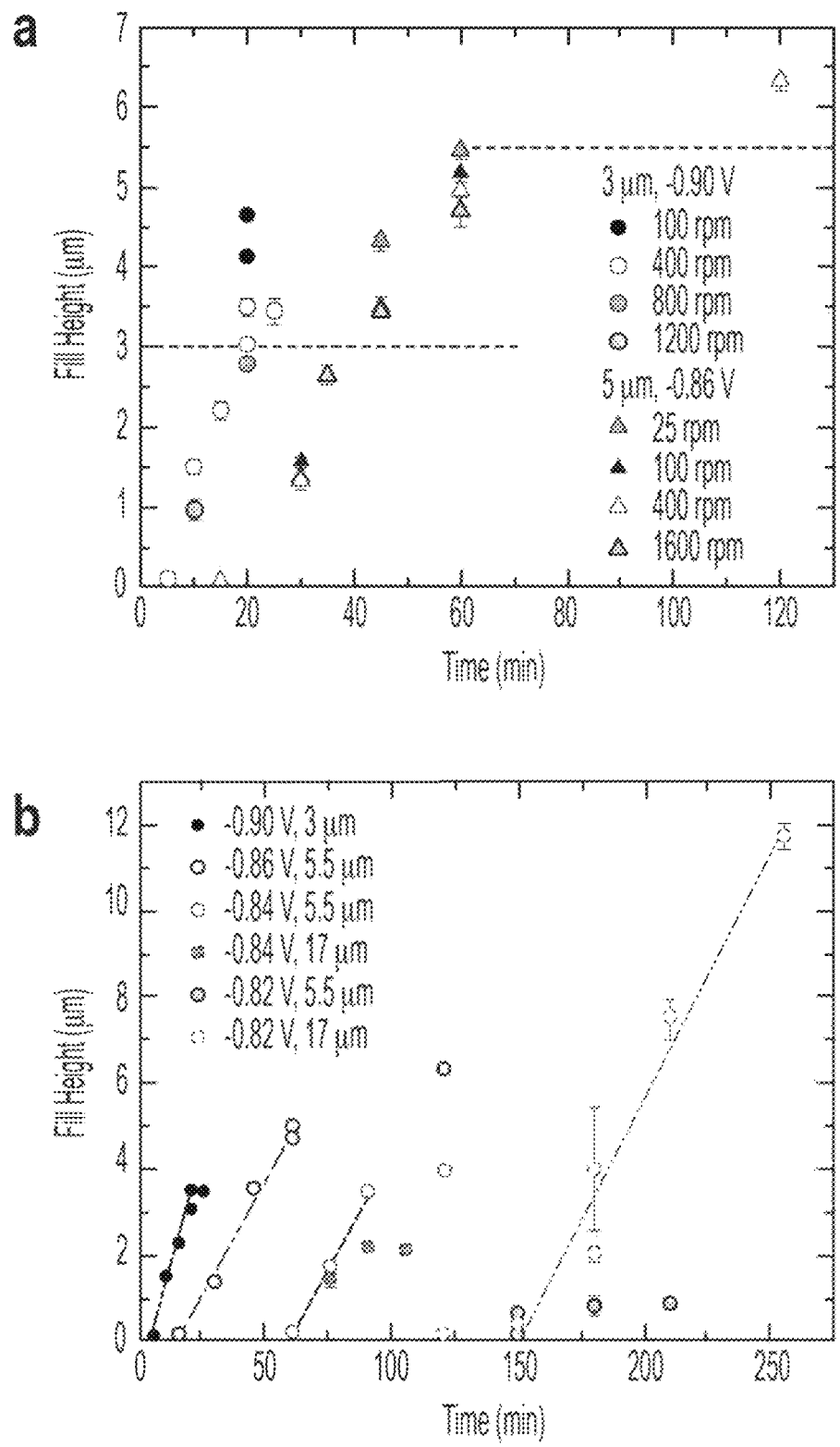
FIG. 51 shows bottom-up Au filling height as a function of deposition time in 80 mmol/L Na$_3$Au(SO$_3$)$_2$+0.64 mol/L Na$_2$SO$_3$ electrolyte containing 4 μmol/L Bi$^{3+}$ in a) 3 μm and 5.5 μm deep trenches at the indicated potentials and rotation rates (dashed lines indicate height of feature openings) and b) 3 μm, 5.5 μm and 17 μm deep trenches at the indicated potentials, all at 400 RPM. Only partially filled specimens that remained open at the top (i.e., not truncated bottom-up deposition) and nominally void-free fully filled features are included. Error bars indicate measured variation across each specimen, except for those deposited at 25 RPM where they are for only the highest deposits (near the leading edge of the workpiece). Linear least squares fits are to data points indicating active deposition and fill heights at last 1 μm below the field.

Measured fill height as a function of deposition time is plotted for various trenches at the indicated potentials and transport conditions in FIG. 51. Deposition in 3 μm deep trenches and 5.5 μm deep trenches is summarized for a variety of workpiece rotation rates in FIG. 51a. The linear rise of fill height with time in partially filled trenches and the negligible to minor impact of rotation rate at both potentials indicate growth is kinetically limited. Reduced deposition at higher rotation rates as filling approaches the trench tops (at 15 min with the 3 μm deep trenches and 60 min with the 5.5 μm deep trenches) is likely related to the passivation of the field seen in FIG. 46-49. It is also consistent with the previously noted transport-dependence of suppression of electrodeposition on the field. Deposit heights in 3 μm to 17 μm deep trenches at four different potentials and varied deposition times, all at rotation rate of 400 RPM, are summarized in FIG. 51b. Linear least-squares fits to the data points that indicate active bottom-up growth, where the growth front is at least 1 μm below the field are overlaid. The horizontal intercepts indicate incubation periods of 4 min, 20 min, 60 min and 150 min at −0.90 V, −0.86 V, −0.84 V and −0.82 V, respectively. Data for which the deposit is nearer the field are excluded from the linear fits to avoid the contribution of decelerating growth. This deceleration, in apparent accord with the suppression of deposition on the field and consistent with the decreasing current transients marked by the arrows in FIG. 50, is seen in the deposit height data in FIG. 51a after complete filling of both the 3 μm and 5.5 μm deep trenches. Such deceleration is also reflected in the data at −0.84 V in FIG. 51b where upward growth begins in both size trenches after an incubation period of ≈60 min but slows at ≈4 μm deposit height in the 5.5 μm deep trenches. In contrast, the slowing that occurs at only 2 μm deposit height near the bottom of the 17 μm deep trenches, far from the field and the feature opening, instead reflects the impact of metal ion depletion due to the inception, and ultimately the impingement, of active growth on the upper sidewalls (FIG. 48). Once bottom-up deposition commences, the growth rates, based on the linear fits, are 3.6 nm/s (13 μm/h) at −0.90 V, 2.4 nm/s (8.7 μm/h) at −0.86 V, 1.8 nm/s (6.5 μm/h) at −0.84 V and 1.9 nm/s (6.8 μm/h) at −0.82 V., respectively.

In comparing current transients (e.g., FIG. 50) to fill height measurements (e.g., FIG. 51) it has been noted that measured currents also include contributions from deposition near and within the slot in the Pt spindle into which the patterned specimens are inserted. Furthermore, while deposits were generally uniform across specimens, the rising current after ≈60 min of deposition at −0.86 V in FIG. 50b for the 17 μm deep trench of FIG. 48 is associated with non-uniform deposition on the field, with the region adjacent to the trailing edge near the spindle receiving significant deposition towards the end of the experiment.

Regarding bismuth accumulation and activation, to gain more insight into the chemistry related to the divergent nature of accelerated deposition on the trench bottoms compared to passivation of the surrounding field, a variety of surface and electroanalytical studies were initiated, including an examination of the morphology of the resulting deposits on planar electrodes. As indicated earlier in FIG. 47 hydrodynamics exert a minor influence on the rate of bottom-up feature filling until the deposit approaches the field, the latter consistent with the substantial impact of hydrodynamics upon deposition on the field over the features. Optimal bottom-up growth is typically obtained under conditions of significant flow, the surrounding field remaining passive towards metal deposition. The combination suggests interface friction, i.e. shear at the interface, is more important than the diffusional flux of the adsorbing $Bi^{3+}$ in determining the reactivity of the surface. Accordingly, the impact of transport conditions on $Bi^{3+}$ adsorption and its influence on Au deposition was examined in more detail on planar electrodes.

Figure 52:
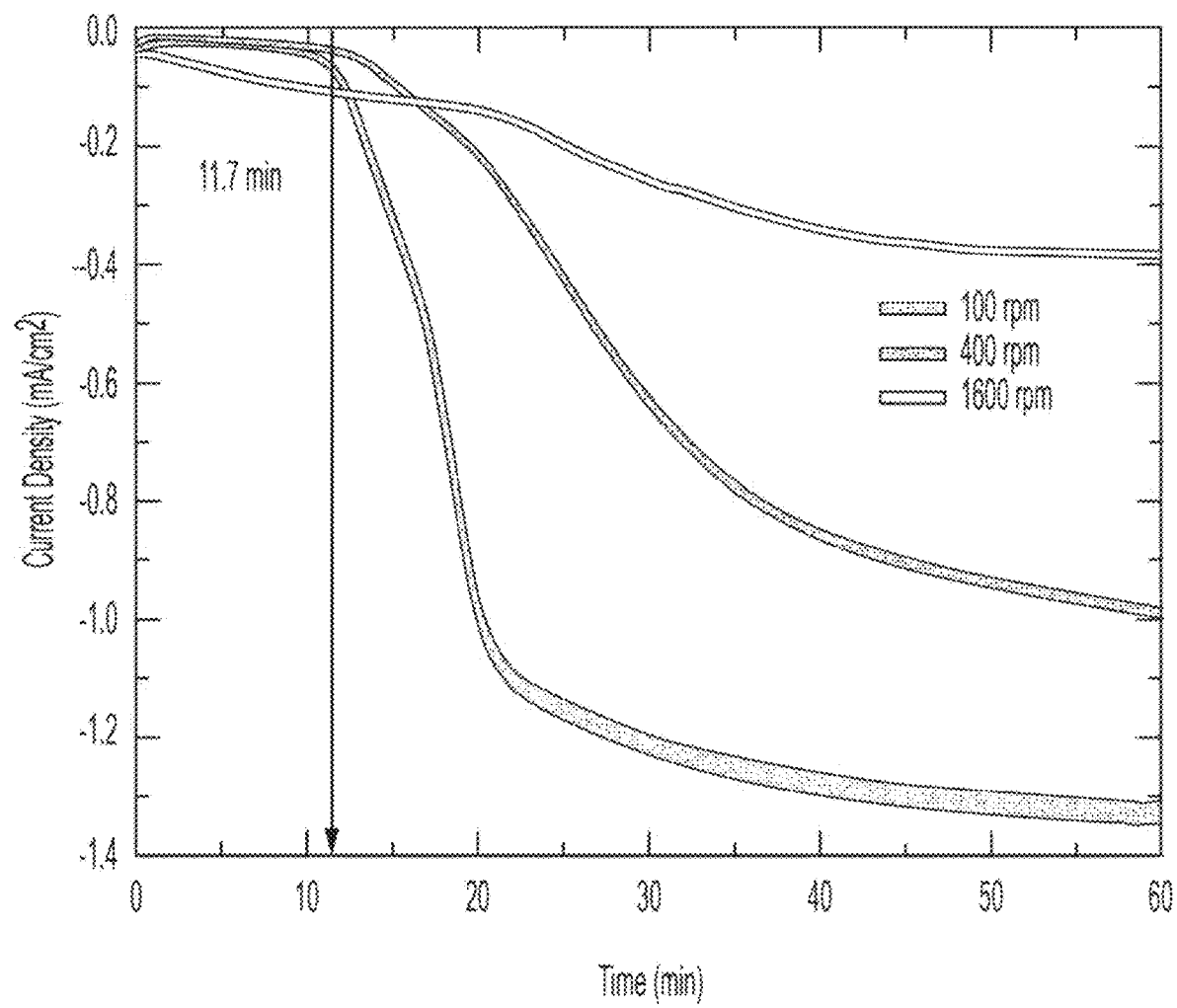
FIG. 52 shows Au deposition on (111) textured Au thin films. Current density transients for 60 min deposition at the specified rotation rates, based on the measured current normalized to the geometric substrate area. Au deposition was at −0.86 V, except where indicated otherwise, in 80 mmol/L Na$_3$Au(SO$_3$)$_2$+0.64 mol/L Na$_2$SO$_3$ electrolyte containing 24 μmol/L Bi$^{3+}$.

Chronoamperometry for Au deposition on Au coated Si wafer at −0.86 V in the presence of 24 μmol/L $Bi^{3+}$ are shown for different rotation rates in FIG. 52. At 100 RPM an incubation period with a low leakage current of approximately −0.02 $mA/cm^2$ persists for 10 min. This is followed by a similarly long activation transition to a steady-state deposition current density near −1.3 $mA/cm^2$. After 30 min the deposit was a uniform bright Au across the entirety of the workpiece. At 400 RPM a similar incubation period is evident but the transition to active deposition occurs more slowly and reaches an apparent current density near −1.0 $mA/cm^2$. In contrast to 100 RPM, the deposit was not uniformly distributed, with most of the deposit near the spindle mount where forced convection is weaker. At still higher rotation rate of 1600 RPM the leakage current at early times increases linearly with time followed by a subsequent increase in current density that saturates near −0.4 $mA/cm^2$. As with 400 RPM Au electrodeposition is localized around the spindle mount with very little growth apparent elsewhere on the specimens.

Figure 53:
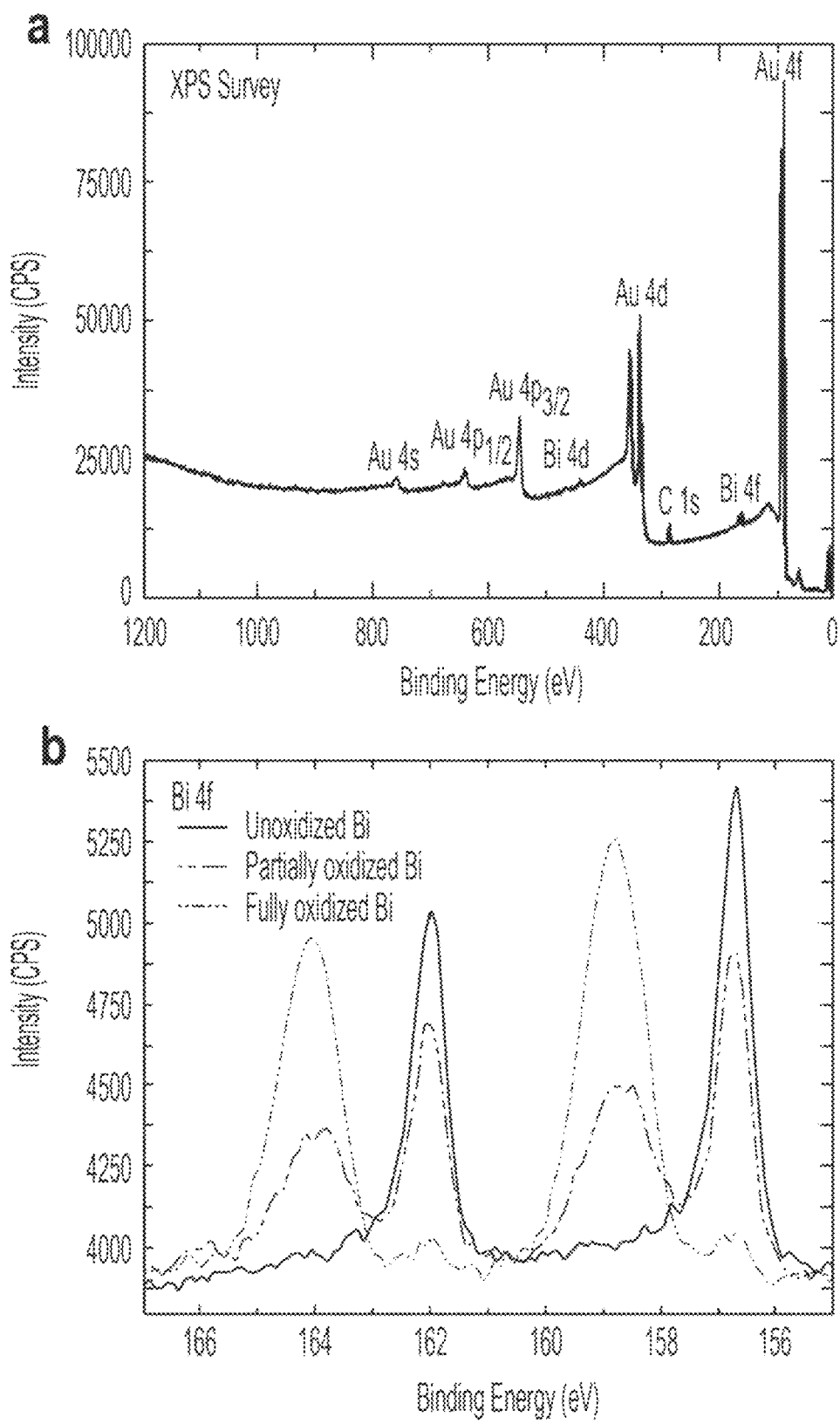
FIG. 53 shows Au deposition on (111) textured Au thin films, a.) XPS survey spectrum of the surface of the Au deposit and b) Bi 4f core-level spectra demonstrating the variable oxidized nature of adsorbed Bi arising from cell to vacuum transfer. All specimens deposited for 60 min at −0.86 V and 100 RPM in 80 mmol/L $Na_3Au(SO_3)_2$+0.64 mol/L $Na_2SO_3$ electrolyte containing 24 µmol/L $Bi^{3+}$. Signal in counts per second (CPS)
Figure 54:
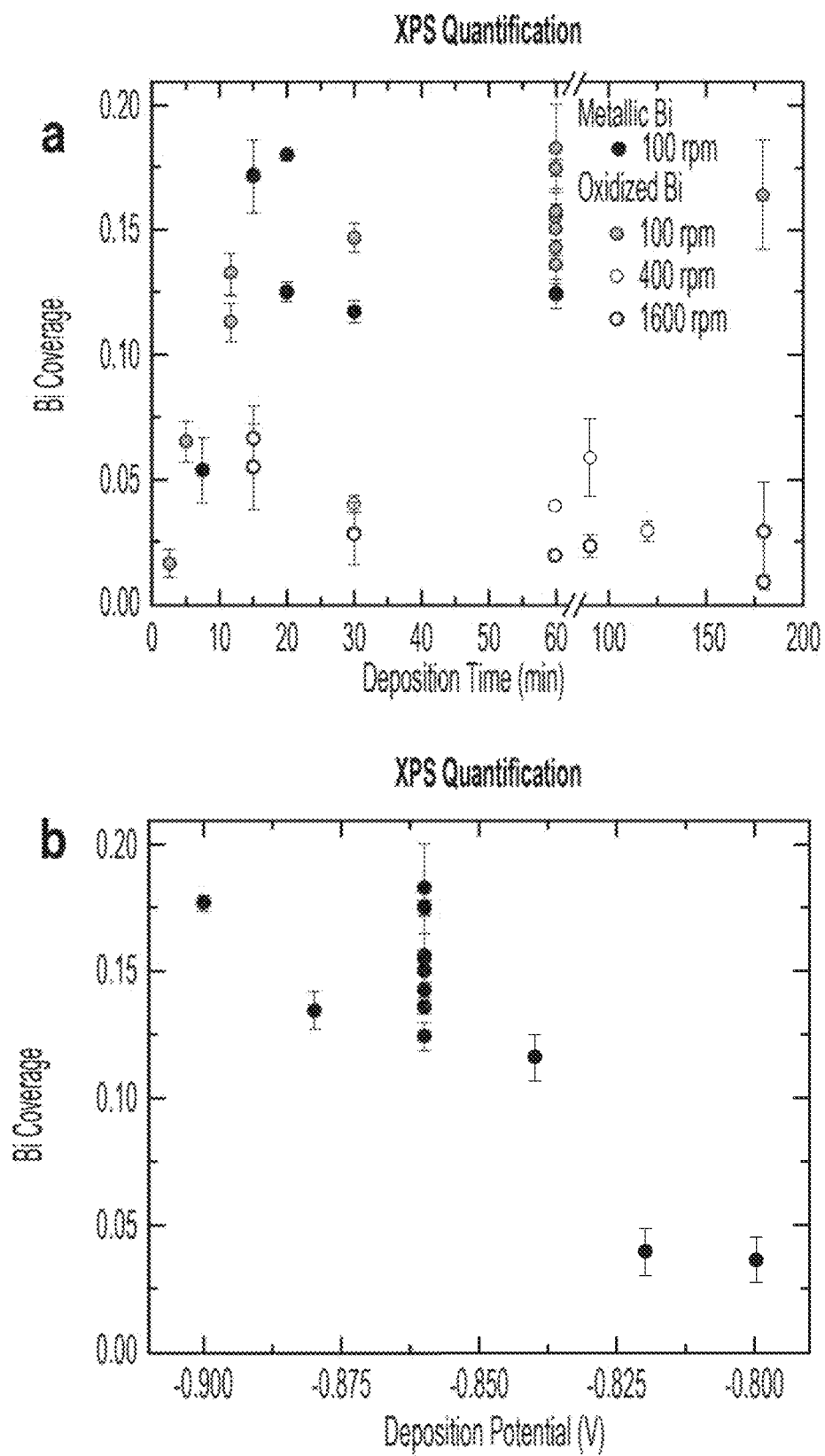
FIG. 54 shows: a) Bi coverage obtained by XPS plotted against deposition time at −0.86 V for the indicated substrate rotation rates. Solid symbols and open symbols represent the indicated states of the adsorbate; open symbols include both partially and completely oxidized Bi. b) Bi coverage obtained by XPS plotted against applied potential for films grown over 60 min at the indicated potentials and 100 RPM (oxidation stale not indicated) Au deposition was in 80 mmol/L $Na_3Au(SO_3)_2$+0.64 mol/L $Na_2SO_3$ electrolyte containing 24 µmol/L $Bi^{3+}$. Each point represents a separate specimen. Error bars indicate the standard deviation (1σ) of the data at the multiple positions examined on each specimen.

XPS was used to examine the surfaces following various deposition times at −0.86 V. A representative survey spectrum following Au deposition on an activated. Bi surface is shown in FIG. 53a. The Au 4f, Bi 4f, adventitious C 1s is core levels were evident for all samples while variations in the O 1s, Na 1s and Na KLL were noted between and across some specimens. No evidence of sulfite adsorption was observed on any samples. Variations in the chemical state of Bi ranging from completely metallic to fully oxidized were observed between different samples as shown in FIG. 53b. No obvious correlations with the electrochemical treatment were evident, rather, the observed dispersion in the state of the Bi is ascribed to variation in the emersion and transfer process. Importantly, for specimens deposited at 100 RPM, Bi was found in the metallic state over a wide range of sampling times. Assuming Bi adsorbs to form a simple overlayer, the fractional monolayer surface coverage was calculated from the observed Si 4f/Au 4f ratio using Eq. 1. The results for multiple experiments at 100 RPM are summarized in FIG. 54a where solid data points correspond to the metallic Bi spectra (i.e., as shown in FIG. 53b) while the hollow data points correspond to specimens where the Bi was oxidized to a varying extent. The experiments reveal that the actively growing Au surface at 100 RPM has a steady state fractional Bi surface coverage of $\approx 0.15 \pm 0.02$ (1σ).

The binding energies of the metallic Si 4f and Au 4f correspond to the bulk elemental forms although the ex-situ nature of the experiment and lack of information pertaining to the electronic structure of Au—Bi surface alloys prevents formation of a near surface alloy from being ruled out. The Bi core-level peaks disappear after sputter cleaning of the deposit surface with $Ar^+$, indicating that the accelerating Bi species is concentrated at or within the near surface of the growing deposit. Together, the chronoamperometric trace in FIG. 52 and the evolution of Bi coverage at 100 RPM in FIG. 54a indicate a non-linear relationship between activation of Au deposition rate and Bi coverage. The incubation period prior to activation of significant deposition is related to the time required to accumulate the critical Bi coverage $\approx 0.15$ and possibly a certain arrangement thereof. This coverage corresponds to Au deposition rate of $\approx -1.3$ mA/cm$^2$ (1.3 nm/s). Assuming the $\approx 3 \times 10^{-4}$ monolayers per second (ML/s) rate of Bi accumulation, deduced from the 10 min adsorption time, required to reach the fractional Bi coverage (FIG. 54), is maintained during active Au deposition at $\approx 10$ ML/s (i.e., $\approx 1$ nm/s), steady state incorporation would be less than 1 in $10^4$ of Bi in Au, which is below the sensitivity of the XPS analysis.

At higher rotation rates examination of the passive surface regions of the specimen revealed the Bi coverage was noticeably lower and tended to scatter about 0.04±0.02 fraction& coverage as indicated in FIG. 54a. For most, if not all, of these specimens the Bi was either partially or completely oxidized. The distribution between partial and complete oxidation across all specimens was similar to that of the specimens prepared at 100 RPM. The counter-intuitive, inverse dependence of Bi coverage on rotation rate demonstrates that its adsorption here is not defined by the concentration or flux of $Bi^{3+}$ but, rather, that increased shear at the interface leads to decreased adsorption. Consistent with the above, measurements on active deposits found only neat the spindle on a 400 RPM specimen yield a higher Bi coverage of $\approx 0.15$. This impact of shear on double-layer structure and reactivity makes the widely used Levich-Koutecky approximation where the interface reaction rate is isolated from mass transport conditions invalid under these conditions.

The dependence of Bi coverage on potential at 100 RPM was briefly examined. For deposition times fixed at 60 min a transition from low coverage of the passive state to $\approx 0.15$ associated with active deposition is seen between −0.84 V and −0.82 V in FIG. 54b. Based on the increased incubation time observed during trench filling at small overpotentials seen in FIG. 51b the potential dependent transition may reflect the limited time sampling, although convolution of the isotherm and related rate constants for Bi adsorption also likely plays a role.

Evolution of the Au growth morphology during deposition on Au thin films reveals remarkable change with Bi accumulation. Individual grains, estimated from the cross sections to average some 100 nm in diameter, are evident in the as deposited, 111 textured Au films underlying the electrodeposits in the cross sectioned specimens in FIG. 55. At the 100 RPM rotation rate used, a rough deposit initially develops during the incubation period. At 5 min of deposition, trigonal pyramidal structures with base lengths on the order of 25 nm are evident. The density of the pyramidal structures, numbering some 280 per μm$^2$ at 5 min is consistent with the underlying substrate grain density of approximately 230 per μm$^2$ at 0 min. This suggests that they might be associated with screw dislocation growth spirals combined with high step edge barrier to interlayer transport. After 11.7 min of deposition the pyramidal structures are seen in the plan view image to have grown preferentially along their surface normal while the cross-section image shows that many have also developed branching at their corners. The three-fold symmetry is consistent with epitaxial growth on the (111) textured Au thin film substrate and the branching is analogous to previous results in Tl mediated Au electrodeposition.

Figure 55:
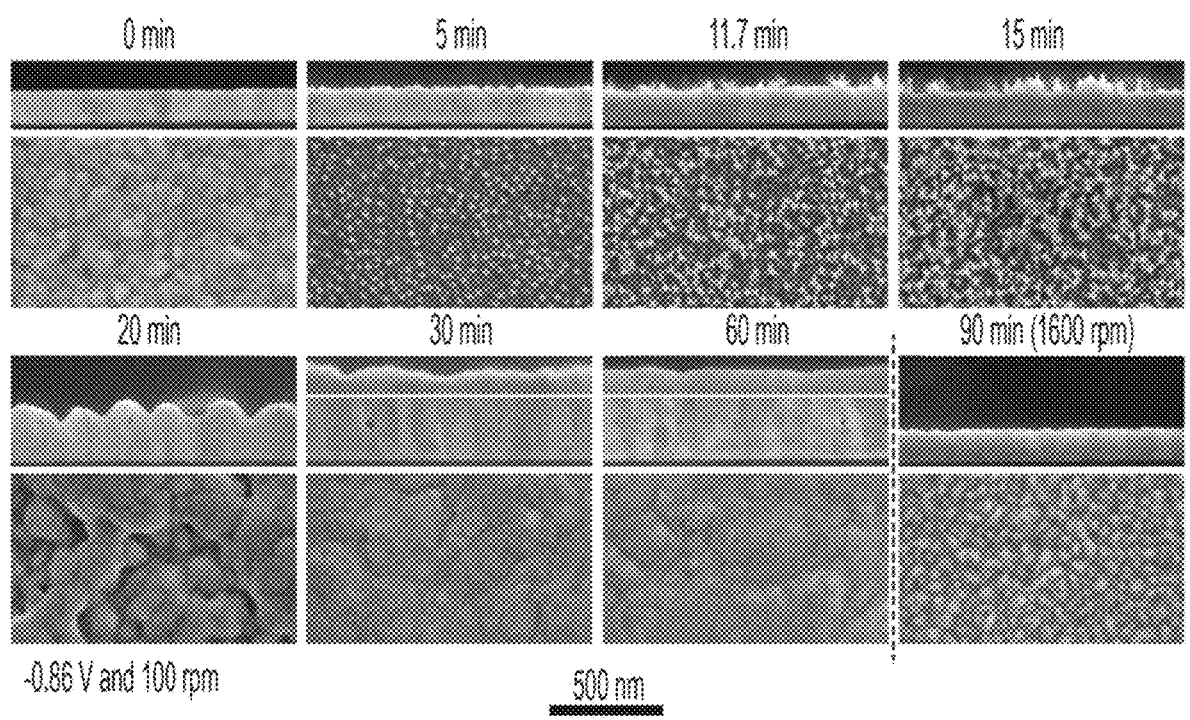
FIG. 55 shows SEM images of Au deposits grown on (111) textured Au thin films (cross-sections above plan views) for the indicated times at −0.86 V with the electrode rotating at 100 RPM (unless otherwise noted) in solution composed of 80 mmol/L $Na_3Au(SO_3)_2$+0.64 mol/L $Na_2SO_3$ with 24 µmol/L Bi. The morphological evolution associated with the transition is seen in both cross-section and plan view images. The deposit is planar and approximately 2 µm and 6.5 µm at 30 and 60 min, respectively. White space in the 30 min and 60 min cross-sections indicate a break in the image to allow for the interface between the deposit and the substrate, and the surface of the deposit to be viewed on the same scales as the other cross sections.

According to the XPS results, Bi accumulates monotonically during the first 10 min to reach 0.15 ML coverage. The corresponding transition to active deposition is evident in preferential lateral expansion of the pyramidal side walls that is present under inspection at 11.7 min and obvious at 15 min. The corresponding chronoamperometric transition tracks progressive activation of the surface as the lateral expansion of the pyramids eliminates the passive areas through coalescence by 20 min. The surface roughness at the point of coalescence reflects the distribution of the original three-fold anisotropic growth pyramids and the grain size of the substrate. The only remnants of the structures are nanometer sized voids near (less than 100 nm above) the original thin film surface, which are presumably occlusions arising from overgrowth and coalescence from adjacent wire-like projections during film consolidation. With continued deposition a smoother surface is seen to develop, as shown in FIG. 55, the deposit thickening rapidly to 2 μm at 30 min and 6.5 μm at 60 min. The grain structure, visible in the cross-sections due to electron channeling, confirms the epitaxial nature of the Au deposit on the substrate, including around the incorporated voids. X-ray diffraction results (not shown) indicate that the Au remains highly (111) textured even after 60 min of growth, although peaks {200}, {220} and {311} crystal planes, not observed with the underlying substrate, are observed at count rates that are <1% those of the (111) peak.

In contrast to films grown at 100 RPM, deposition at 1600 RPM results in minimal Au deposition even after 90 min, also shown in FIG. 55. The influence of hydrodynamics is unmistakable in comparison of just 10 nm of Au deposited during 90 min at 1600 RPM versus 6.5 μm deposited in 60 min at 100 RPM. The difference is greater than that seen in the chronoamperometry, where the higher current is an artifact of the localized break out of deposition near the spindle mount at high rotation speeds.

Electrodeposition in Au sulfite electrolyte containing Bi additive exhibits bottom-up filling behavior entirely unlike that previously described in other Au electrolyte+heavy metal p-block accelerator systems. The bottom-up growth observed in this study strongly resembles shape evolution during feature filling observed in suppressor containing electrolytes that manifest S-NDR through suppression breakdown. An important distinction for the present system is the extended incubation period, which can exceed two hours, prior to the onset of exclusive bottom-up filling. The transition time greatly exceeds that required to establish a steady-state hydrodynamic boundary layer. Similarly, suppression of deposition on the neighboring field is maintained for multiple hours at more positive potentials and/or higher convective transport rates.

The Bi surface coverage, acceleration of deposition and deposit morphology are correlated in this electrolyte additive system. The XPS results in FIG. 54a demonstrate Bi accumulation coincides with the incubation period that precedes active deposition on planar electrodes at 100 RPM. At 400 RPM and 1600 RPM, passive surfaces and minimal Bi accumulation are observed over the majority of the specimens. Together with the microstructural changes captured in FIG. 55, the XPS and chronoamperometric measurements indicate that the incubation period of passive deposition is related to the gradual accumulation of Bi adsorbate and its non-linear impact on the rate and morphology of Au deposition. The morphological transition that accompanies the acceleration of Au deposition, captured in the plan view and cross section SEM images of FIG. 55, is especially significant. The pyramidal deposits that dominate through 11.7 min indicate that adatom step-down diffusion is hindered by a significant Ehrlich-Schwoebel (ES) Barrier. Accumulation of sufficient Bi coverage, i.e., the saturation value at 100 RPM in FIG. 54a, is evidently required to overcome this barrier and transition the surface from passive to active deposition. Emanating from multiple locations, expansion of the activated regions is accompanied by a morphological change upon the filling of regions between adjacent pyramids that is already evident at 15 min. The actively growing surface entrains nanoscale voids presumably by overgrowth, even as it retains the grain structure of, and epitaxy with, the underlying substrate (FIG. 55, 20 min). This lateral expansion of the actively depositing regions is reflected in the rising current transient that marks the onset of the transition from passive incubation to fully active deposition (FIG. 52). The subsequent plateau indicates a fully active surface trending toward planarity and deposition at the kinetically limited value. Overshoot observed at the start of the plateau during trench filling experiments, as in FIG. 50a, reflects the roughness of the just-consolidated active surfaces.

Following complete surface activation and smoothing at 30 min, the deposit in FIG. 55 thickens at a rate of approximately 9 μm/h. This value is consistent with the bottom up trench fill rate of 8.7 μm/h determined from FIG. 51b at the same potential but lower $Bi^{3+}$ concentration. The similarity again indicates that activated Au deposition is kinetically limited. On the other hand, the incubation time in trench filling is clearly impacted by the $Bi^{3+}$ concentration, being less than 5 min with 24 μmol/L $Bi^{3+}$ versus more than 15 min with 4 μmol/L $Bi^{3+}$ in FIG. 46. The difference in incubation times is consistent with $Bi^{3+}$ accumulation defined by transport (specifically diffusion down the trenches) as well as the role of $Bi^{3+}$ accumulation in ending the incubation period.

The surface morphologies and morphological transition seen in FIG. 55 are also reflected in the feature filling. The nanoscale toughness is found on the conformal deposits both within and over passivated features as well as on surfaces remaining passivated even after bottom up filling commences (FIGS. 46-49). In contrast, smoother deposits are seen on actively growing surfaces (i.e., locally thicker deposits). These smooth, activated surfaces typically originate on the trench bottom, as in FIG. 49g. They subsequently propagate up the sidewall as in FIG. 49h, nucleate on the sidewall as in FIGS. 49c and d or remain localized to the trench bottom as FIGS. 46 and 47. Sidewall activation higher in the trenches can terminate (truncate) bottom-up deposition, yielding voided filling as observed with 24 μmol/L $Bi^{3+}$ in FIG. 46 and at the more negative potentials in FIG. 48.

Without wishing to be bound by theory, it is believed that structures formed on the passivated surfaces result from deposition at a small number of active sites, perhaps related to screw dislocations, while step-down diffusion of reduced Au adatoms is hindered by an asymmetric step edge barrier that results in the steep sloped needle-like pyramids seen in FIG. 55 at early times. Adsorption and alloying of Bi at the step edges over time, a relationship between adsorbed Bi and under-coordinated surface sites demonstrated in acid, catalyzes the $Au(SO_3)_2^{3-}$ ion transfer reduction reaction, reduces the barrier to interlayer transport of Au adatoms, and enhances lateral expansion of pyramids relative to further vertical growth. In addition to these local dynamics the influence of mesoscale change of surface area on the local enrichment (concave segments) and dilution (convex segments) of adsorbed Bi coverage through the CEAC mechanism are expected to further modulate growth. Following coalescence of the activated grains, change effects captured by CEAC models stabilize growth on planar surface segments consistent with the observed phenomenon of brightening and an example of surfactant mediated growth associated with a dilute adsorbate coverage.

The observation that rates of Bi adsorption and accumulation are diminished under high convection (specimen rotation rate) (FIG. 54a) despite enhanced flux of the additive speaks to the importance of shearing of the interface provided by the induced flow. The physical mechanisms underlying this important effect remain to be understood. However, the importance of hindered Bi accumulation at higher rotation rates, by keeping free surfaces subject to high shear rates passive while deposition occurs on recessed surfaces that are less subject to convection, is a key aspect to the bottom-up feature filling motif. The impact of shear on the Bi adsorbate coverage also explains why bottom-up deposition slows as the growth front nears the field at higher rotation rates (FIG. 51a). Moreover, this clarifies the previously noted dependence of surface passivation on rotation rate.

The potentials examined herein do not fix the most-positive voltage limit for localized, bottom-up deposition, although an increasingly long incubation period can occur at more positive potentials.

Additionally, the trench depths and aspect ratios examined here do not define the upper limits for void-free feature filling. Thickening of the Au deposits on the sidewalls associated with the leakage current in the passive state constrains the dimensions of features in which bottom-up filling might be anticipated. The maximum aspect ratio of trenches that might be filled without sidewall-impingement can be estimated assuming that the sidewall deposits (growth rate $v_s$) bridge the trench width w at the same time t (i.e., $w=2v_s t$) at which bottom-up filling (growth rate $v_b$) of the trench height h is completed (i.e. $h=v_b t$). Imposing this condition yields the upper limit on the aspect ratio $$\frac{h}{w} = \frac{v_b}{2v_s}. \qquad [2]$$

At −0.82 V the bottom up growth rate is $v_b \approx 6.5$ μm/h (FIG. 51). Deposition on the passivated sidewalls thickens at roughly $v_s \approx 0.1$ μm/h; the rate is faster near the active deposits and slower close to the field. The ratio of these growth rates is consistent with the ratio of 65 between the passive and active deposition currents in the chronoamperometry at 100 RPM in FIG. 52. Substituted in Eq. 2, void-free filling is predicted in trenches with aspect ratio up to 32. This upper limit relies on the linear fill rate, neglects concentration gradients down the narrowing trench, ignores the incubation period that delays activation of growth from the bottom surface but not passive side call deposition and assumes activation of deposition on the sidewalls can be avoided. Accounting for the incubation time $t_i$ prior to the start of bottom-up growth (but neglecting the relatively insignificant passive deposition on the bottom surface), bottom-up trench filling is complete when $h=v_b(t-t_i)$. In this case Eq. 2 is replaced by $$\frac{h}{w} = \frac{v_b}{2v_s}\left(1 - \frac{2t_i v_s}{w}\right). \quad [3]$$

The maximum fillable aspect ratio is thus reduced by the dimensionless ratio of sidewall deposition during the incubation period and trench width. Using the same growth rates with the incubation time $t_i \approx 20$ min incubation time observed at −0.86 V (FIG. 51) reduces the tillable aspect ratio of 0.65 μm wide trenches from the value predicted using Eq. 2 by only 10%, to a value of 29. This is consistent with the entirely bottom-up filling captured in both FIG. 46 and FIG. 47. In contrast, the substantially longer $t_i \approx 150$ min at −0.82 V reduces the fillable aspect ratio by 77%, to a value of just ≈7.5. Somewhat below the aspect ratio of even the shorter trenches, this upper bound is consistent with the failure to obtain strictly bottom-up filling in the taller trenches at this potential (FIG. 48d and FIG. 49). Bottom-up filling in the narrowing features is further degraded by concentration gradients, based on the noted slowing of the growth rate at −0.84 V in FIG. 51, compounded by partial activation of sidewall growth. Minimizing the incubation period, without additional impact on sidewall growth, should enable entirely bottom-up, void-free filling of features closer to the upper bound suggested by Eq. 2.

Electrolyte including $Na_3Au(SO_3)_2 + Na_2SO_3$ with micromolar $Bi^{3+}$ concentrations has been described for superconformally filling substantially deeper and higher aspect ratio trenches than hitherto demonstrated. For certain $Bi^{3+}$ concentrations, potentials, and feature aspect ratio, complete filling is obtained where the growth velocity is practically independent of the hydrodynamics. At more negative overpotentials or higher $Bi^{3+}$ concentrations or aspect ratios a transition from bottom-up filling to truncated bottom-up filling is observed as active deposition breaks out on the upper sidewall surfaces. In contrast to deposition on the bottom of the trenches, growth on the free surface is sensitive to the hydrodynamics. Au deposition on planar electrodes reveals that accelerated growth is associated with a Bi surface phase having surface coverage near 0.15. The deposition rate is non-monotonic with coverage such that there is a significant incubation period prior to the onset of bottom-up filling. The non-linear behavior is suggestive of critical behavior perhaps associated with formation of a catalytic surface alloy or jammed interface. The net accumulation of Bi on the surface is a sensitive function of the interface shear associated with rotation of the workpiece, where the active surface with 0.15 coverage of Bi develops at low rotation rates while a lower coverage that scatters about 0.04 is seen under high shear conditions. The impact of hydrodynamics on the surface coverage on planar surfaces relates to the observation of bottom-up trench filling where the conditions at the recessed, active surface segment is more quiescent than for the lower Bi coverage passive tree surface. In addition to accelerating the reduction of the $Au(SO_3)_2^{3-}$ to Au the Bi adsorbate has a profound influence on roughness evolution that is ascribed to its adsorption and dynamics at step edges that alters the barrier to interlayer mass exchange. The combination of feature filling and surface analytical results demonstrate an expanded range of effectiveness of the electrolyte-additive system for void-free feature filling and provides new insights into the mechanisms at play. Further work will be required to understand the exclusive localization of active deposition to the most recessed surfaces and to find new strategies to block sidewall deposition to enable filling of even larger, higher aspect ratio features.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context "Or" means "and/or." Further, the conjunction "or" is used to link objects of a list or alternatives and is not disjunctive;

rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A metallic grating comprising:
    a substrate;
    a plurality of high aspect ratio trenches disposed in the substrate such that the high aspect ratio trenches are spaced apart from one another by a field surface of the substrate;
    a metallic superconformal filling formed and disposed in the high aspect ratio trenches; and
    a grating comprising a spatial arrangement of the high aspect ratio trenches that are filled with the metallic superconformal filling such that the metallic superconformal filling is void-free, and the high aspect ratio trenches are bottom-up filled with the metallic superconformal filling,
    wherein an aspect ratio of the high aspect ratio trenches is from 0.5 to 200, and a height of the high aspect ratio trenches is from 50 nm to 5 mm, and a height of the metallic superconformal filling is less than or equal to the height of the high aspect ratio trenches.

2. The metallic grating of claim 1, wherein the substrate is electrically conductive.

3. The metallic grating of claim 1, wherein the substrate comprises silicon and a dopant that provides electrical conductivity to the substrate.

4. The metallic grating of claim 1, wherein a width of the metallic superconformal filling is from 10 nm to 100 μm.

5. The metallic grating of claim 1, wherein a length of the metallic superconformal filling is from 0.5 μm to 1 m.

6. The metallic grating of claim 1, wherein the height of the metallic superconformal filling is from 50 nm to 5 mm.

7. The metallic grating of claim 1, wherein the metallic superconformal filling consists essentially of gold and bismuth.

* * * * *